US012224500B2

(12) United States Patent
Wang et al.

(10) Patent No.: US 12,224,500 B2
(45) Date of Patent: Feb. 11, 2025

(54) ELECTRONIC DEVICE

(71) Applicant: Huawei Technologies Co., Ltd., Shenzhen (CN)

(72) Inventors: Hanyang Wang, Reading (GB); Meng Hou, Shanghai (CN); Dong Yu, Shanghai (CN); Pengfei Wu, Shanghai (CN); Xiaowei Zhang, Shenzhen (CN); Chuanbo Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 17/921,273

(22) PCT Filed: Apr. 23, 2021

(86) PCT No.: PCT/CN2021/089245

§ 371 (c)(1),
(2) Date: Oct. 25, 2022

(87) PCT Pub. No.: WO2021/218800

PCT Pub. Date: Nov. 4, 2021

(65) Prior Publication Data

US 2023/0170609 A1 Jun. 1, 2023

(30) Foreign Application Priority Data

Apr. 27, 2020 (CN) ........................ 202010346611.7

(51) Int. Cl.
*H01Q 5/385* (2015.01)
*H01Q 1/24* (2006.01)
(Continued)

(52) U.S. Cl.
CPC ............ *H01Q 5/385* (2015.01); *H01Q 1/243* (2013.01); *H01Q 1/245* (2013.01); *H01Q 1/38* (2013.01);
(Continued)

(58) Field of Classification Search
CPC ...... H01Q 1/2258; H01Q 1/2266; H01Q 1/36; H01Q 1/38; H01Q 1/50; H01Q 1/52;
(Continued)

(56) References Cited

U.S. PATENT DOCUMENTS 8,830,131 B1 9/2014 Doane et al.
11,967,780 B2 4/2024 Li et al.
(Continued)

FOREIGN PATENT DOCUMENTS

CN 109638455 A 4/2019
CN 111009722 A 4/2020
(Continued)

*Primary Examiner* — Robert Karacsony
(74) *Attorney, Agent, or Firm* — Slater Matsil, LLP

(57) ABSTRACT

The electronic device includes a composite antenna including a slot antenna and a wire antenna. A first strip-shaped conductor of the slot antenna includes a first ground part, a second ground part, and a feeding part. The first ground part and the second ground part are respectively two ends of the first strip-shaped conductor. The feeding part is located between the first ground part and the second ground part. A second strip-shaped conductor of the wire antenna includes a first end and a second end. The first end of the second strip-shaped conductor is electrically connected to the first ground part. The second end of the second strip-shaped conductor is an open end.

19 Claims, 37 Drawing Sheets

(51) Int. Cl.

| | |
|---|---|
| ***H01Q 1/38*** | (2006.01) |
| ***H01Q 1/48*** | (2006.01) |
| ***H01Q 1/52*** | (2006.01) |
| ***H01Q 5/307*** | (2015.01) |
| ***H01Q 5/371*** | (2015.01) |
| ***H01Q 13/10*** | (2006.01) |
| ***H01Q 21/00*** | (2006.01) |

(52) U.S. Cl.
CPC ................. *H01Q 1/48* (2013.01); *H01Q 1/52* (2013.01); *H01Q 5/307* (2015.01); *H01Q 5/371* (2015.01); *H01Q 13/10* (2013.01); *H01Q 21/00* (2013.01)

(58) Field of Classification Search
CPC ........ H01Q 1/242; H01Q 1/243; H01Q 1/245; H01Q 1/48; H01Q 5/30; H01Q 5/307; H01Q 5/342; H01Q 5/357; H01Q 5/364; H01Q 5/371; H01Q 5/378; H01Q 5/385; H01Q 5/392; H01Q 5/40; H01Q 9/42; H01Q 9/44; H01Q 9/46; H01Q 13/10; H01Q 21/00; H01Q 21/30
See application file for complete search history.

(56) References Cited

U.S. PATENT DOCUMENTS

| | | | | |
|---|---|---|---|---|
| 2005/0153756 A1* | 7/2005 | Sato | ....................... | H01Q 5/371 455/575.1 |
| 2017/0279185 A1* | 9/2017 | Hung | ..................... | H01Q 1/243 |

FOREIGN PATENT DOCUMENTS

| | | | |
|---|---|---|---|
| CN | 110741506 | B | 2/2021 |
| EP | 1146589 | A1 | 10/2001 |
| EP | 1555715 | A1 | 7/2005 |

* cited by examiner

ELECTRONIC DEVICE

CROSS-REFERENCE TO RELATED APPLICATIONS

This application is a National Stage of International Patent Application No. PCT/CN2021/089245, filed on Apr. 23, 2021, which claims priority to Chinese Patent Application No. 202010346611.7, filed on Apr. 27, 2020, both of which are hereby incorporated by reference in their entireties.

TECHNICAL FIELD

This application relates to the field of antenna technologies, and in particular, to an electronic device.

BACKGROUND

With rapid development of key technologies such as a bezel-less screen, lightness and thinness, and an ultimate screen-to-body ratio of an electronic device have become a trend. This design greatly reduces antenna arrangement space. In such an environment in which antennas are tightly arranged, it is difficult for a conventional antenna to meet a performance requirement of a plurality of communication frequency bands. In addition, in an antenna design of a mobile phone, attention is paid to impact of electromagnetic radiation on a human body. Electromagnetic wave energy absorbed by the human body is quantified by a specific absorption ratio (specific absorption ratio, SAR) of electromagnetic waves. A small SAR value indicates that electromagnetic radiation has little impact on the human body. Therefore, how to implement a plurality of resonance modes on the mobile phone while meeting a requirement of a low SAR value becomes an urgent task.

SUMMARY

An antenna of an electronic device provided in technical solutions of this application may excite a plurality of resonance modes, and each resonance mode can meet a requirement of a low SAR value.

This application provides an electronic device. The electronic device includes a rear cover, a circuit board, a support, a radio frequency transceiver circuit, a first antenna, and a second antenna. The circuit board and the radio frequency transceiver circuit are located on a same side of the rear cover, and the support is fastened between the circuit board and the rear cover. It may be understood that the support may be fastened on the circuit board, or may be fastened on the rear cover.

The first antenna includes a first strip-shaped conductor. The first strip-shaped conductor is fastened on the support. It may be understood that the first strip-shaped conductor may be fastened on a surface of the support, or may be embedded into the support.

In addition, the first strip-shaped conductor includes a first ground part, a second ground part, and a feeding part. The first ground part and the second ground part are respectively two ends of the first strip-shaped conductor. Both the first ground part and the second ground part are grounded by using the circuit board. The feeding part is located between the first ground part and the second ground part, and is electrically connected to the radio frequency transceiver circuit. A clearance area of the first antenna is formed between the first strip-shaped conductor and a board surface that is of the circuit board and that faces the rear cover.

The second antenna includes a second strip-shaped conductor. The second strip-shaped conductor is fastened on the rear cover or support. It may be understood that the second strip-shaped conductor may be fastened on a surface of the rear cover, or may be embedded into the rear cover. The second strip-shaped conductor may be fastened on the surface of the support, or may be embedded into the support.

In addition, the second strip-shaped conductor includes a first end and a second end disposed away from the first end. The first end of the second strip-shaped conductor is electrically connected to the first ground part of the first strip-shaped conductor. The second end of the second strip-shaped conductor is not grounded, that is, the second end of the second strip-shaped conductor is an open end. A clearance area of the second antenna is formed between the second strip-shaped conductor and the board surface that is of the circuit board and that faces the rear cover.

It may be understood that the first antenna can excite an antenna mode in a differential mode. A current in the differential mode excited by the first antenna is mainly distributed as follows: a first current flowing from the first ground part to the feeding part and a second current flowing from the second ground part to the feeding part on the first strip-shaped conductor. A direction of the first current and a direction of the second current on the first strip-shaped conductor are opposite, and current intensity of the first current and current intensity of the second current can be approximately the same. In this case, phases of magnetic fields at the feeding part are opposite, and amplitudes of the magnetic fields can be approximately offset. In this way, the magnetic fields are mainly distributed on two sides of the feeding part, and two SAR hotspots are formed on the two sides of the feeding part. In this case, energy of radiated electromagnetic waves is dispersed, and an SAR value of the differential mode excited by the first antenna is low.

In addition, the second antenna can excite an antenna mode in a common mode. A current in the common mode excited by the second antenna is mainly distributed as follows: a third current flowing from the second end of the second strip-shaped conductor to the first end of the second strip-shaped conductor on the second strip-shaped conductor. It may be understood that the third current on the second strip-shaped conductor can flow into the circuit board through the first ground part. In this way, current intensity on the second strip-shaped conductor can be reduced to a large extent. In this case, strength of a magnetic field generated by the second strip-shaped conductor is also small, and an SAR value of the common mode excited by the second antenna is low.

In addition, in this implementation, a composite antenna of the first antenna and the second antenna is designed, so that the composite antenna can excite two resonance modes under feeding. Therefore, while implementing wide-band coverage, SAR values of the two modes can be low, and two SAR hotspots can be generated in a resonance mode of the first antenna.

In an implementation, the first end of the second strip-shaped conductor and the first ground part of the first strip-shaped conductor are directly fed. It may be understood that direct feeding means that the first end of the second strip-shaped conductor is connected to the first ground part of the first strip-shaped conductor, and a radio frequency signal is directly fed to the second strip-shaped conductor through the first ground part.

In an implementation, the first end of the second strip-shaped conductor and the first ground part of the first strip-shaped conductor are indirectly fed through coupling.

In an implementation, a distance between the first ground part and an end face of the first strip-shaped conductor is within a range from 0 millimeters to 5 millimeters.

In an implementation, a distance between the first ground part and an end face of the first strip-shaped conductor is within a range from 0 millimeters to 2.5 millimeters.

In an implementation, a distance between the first ground part and an end face of the first strip-shaped conductor ranges from 0 to 0.12λ. λ is a wavelength of a signal radiated by the antenna.

In an implementation, a distance between the first ground part and an end face of the first strip-shaped conductor ranges from 0 to 0.06λ. λ is a wavelength of a signal radiated by the antenna.

In an implementation, a distance between the second ground part and an end face of the first strip-shaped conductor is within a range from 0 millimeters to 5 millimeters.

In an implementation, a distance between the second ground part and an end face of the first strip-shaped conductor is within a range from 0 millimeters to 2.5 millimeters.

In an implementation, a distance between the second ground part and an end face of the first strip-shaped conductor ranges from 0 to 0.12λ. λ is a wavelength of a signal radiated by the antenna.

In an implementation, a distance between the second ground part and an end face of the first strip-shaped conductor ranges from 0 to 0.06λ. λ is a wavelength of a signal radiated by the antenna.

In an implementation, a center distance between the feeding part and the first ground part is a first value. A center distance between the feeding part and the second ground part is a second value. A ratio of the first value to the second value is within a range from 0.8 to 1.2.

It may be understood that, when the ratio of the first value to the second value is within the range from 0.8 to 1.2, overall symmetry of the first strip-shaped conductor is good. In this case, for a current distribution in the differential mode excited by the first antenna, current intensity of the first current on the first strip-shaped conductor is approximately the same as current intensity of the second current. In this way, phases of magnetic fields at the feeding part are opposite, and amplitudes of the magnetic fields are approximately offset. The magnetic fields are mainly distributed on both sides of the feeding part. An SAR value of the differential mode excited by the first antenna is low.

In another possible implementation, the ratio of the first value to the second value may alternatively be outside a range from 0.8 to 1.2. Overall symmetry of the first strip-shaped conductor is poor. In this case, asymmetry in structure may be compensated by using a matching circuit of the first antenna, so that for a current distribution in the differential mode excited by the first antenna, current intensity of the first current on the first strip-shaped conductor can be approximately the same as current intensity of the second current. This ensures that the SAR value in the differential mode excited by the first antenna is low.

In an implementation, a projection of the first strip-shaped conductor on the board surface of the circuit board is a first projection. A projection of the second strip-shaped conductor on the board surface of the circuit board is a second projection. An area of an overlapping region between the first projection and the second projection is within a range from 0 square millimeters to 16 square millimeters. It may be understood that, under this size, stability of an electrical connection between the first end of the second strip-shaped conductor and the first ground part of the first strip-shaped conductor is good. In this case, a third current on the second strip-shaped conductor can well flow into the circuit board through the first ground part, so that the SAR value of the common mode excited by the second antenna is low.

In an implementation, the second antenna further includes a third strip-shaped conductor. The third strip-shaped conductor is fastened on the rear cover or support. It may be understood that the third strip-shaped conductor may be fastened on the surface of the rear cover, or may be embedded into the rear cover. The third strip-shaped conductor may be fastened on the surface of the support, or may be embedded into the support.

The third strip-shaped conductor includes a first end and a second end disposed away from the first end. The first end of the third strip-shaped conductor is electrically connected to the second ground part of the first strip-shaped conductor. The second end of the third strip-shaped conductor is not grounded, that is, the second end of the third strip-shaped conductor is an open end. A clearance area of the second antenna is formed between the third strip-shaped conductor and the board surface that is of the circuit board and that faces the rear cover.

It may be understood that, the third strip-shaped conductor is disposed, and is electrically connected to the second ground part through the first end of the third strip-shaped conductor, so that the third strip-shaped conductor also excites an antenna mode in a common mode. A current in the common mode is mainly distributed as follows: a fourth current flowing from the second end of the third strip-shaped conductor to the first end of the third strip-shaped conductor on the third strip-shaped conductor.

In one case, when a resonance frequency of a common mode excited by the third strip-shaped conductor is not equal to a resonance frequency of the common mode excited by the second strip-shaped conductor, the second antenna can excite an antenna mode in the two common modes: the common mode excited by the second strip-shaped conductor and the common mode excited by the third strip-shaped conductor. Therefore, in this implementation, the first antenna and the second antenna can excite three resonance modes. This helps the antenna implement wide-band coverage setting.

In addition, for a current distribution in the common mode excited by the third strip-shaped conductor, the fourth current on the third strip-shaped conductor can flow into the circuit board through the second ground part. In this way, current intensity on the third strip-shaped conductor is greatly reduced. Strength of a magnetic field generated by the third strip-shaped conductor is also small, and the SAR value of the common mode excited by the second antenna is also low.

In another case, when a resonance frequency of a common mode excited by the third strip-shaped conductor is equal to a resonance frequency of the common mode excited by the second strip-shaped conductor, the second antenna excites an antenna mode in a common mode: The second strip-shaped conductor and the third strip-shaped conductor jointly excite the common mode. Therefore, in this implementation, the first antenna and the second antenna can excite two resonance modes. This helps the antenna implement wide-band coverage setting.

In addition, for a current in the common mode jointly excited by the second strip-shaped conductor and the third strip-shaped conductor, a direction of the third current on the second strip-shaped conductor is opposite to a direction of the fourth current on the third strip-shaped conductor, and current intensity can be approximately the same. In this case, phases of magnetic fields at the feeding part are opposite, and amplitudes of the magnetic fields are approximately offset. In this way, the magnetic fields are mainly distributed on two sides of the feeding part, and two SAR hotspots are formed on the two sides of the feeding part. In this case, energy of radiated electromagnetic waves is dispersed, and an SAR value of the common mode is low.

In addition, for a current distribution in the common mode jointly excited by the second strip-shaped conductor and the third strip-shaped conductor, the third current on the second strip-shaped conductor can flow into the circuit board through the first ground part, and the fourth current on the third strip-shaped conductor can flow into the circuit board through the second ground part. In this way, current intensity on the second strip-shaped conductor and the third strip-shaped conductor is greatly reduced. Strength of magnetic fields generated by the second strip-shaped conductor and the third strip-shaped conductor is also small, and the SAR value of the common mode excited by the second antenna is also low.

In an implementation, the first end of the third strip-shaped conductor and the second ground part of the first strip-shaped conductor are directly fed. It may be understood that direct feeding means that the first end of the third strip-shaped conductor is connected to the second ground part of the first strip-shaped conductor, and a radio frequency signal is directly fed to the second strip-shaped conductor through the second ground part.

In an implementation, the first end of the third strip-shaped conductor and the second ground part of the first strip-shaped conductor are indirectly fed through coupling.

In an implementation, a projection of the first strip-shaped conductor on the board surface of the circuit board is a first projection. A projection of the third strip-shaped conductor on the board surface of the circuit board is a third projection. An area of an overlapping region between the first projection and the third projection is within a range from 0 square millimeters to 16 square millimeters. It may be understood that, under this size, stability of an electrical connection between the first end of the third strip-shaped conductor and the second ground part of the first strip-shaped conductor is good. In this case, the fourth current on the third strip-shaped conductor can well flow into the circuit board through the second ground part, so that the SAR value of the common mode excited by the second antenna is low.

In an implementation, a projection of the first strip-shaped conductor on the board surface of the circuit board is a first projection. A projection of the second strip-shaped conductor on the board surface of the circuit board is a second projection. An included angle between the second projection and the first projection is a first angle. The first angle is within a range from 900 to 270°. A projection of the third strip-shaped conductor on the board surface of the circuit board is a third projection. An included angle between the third projection and the first projection is a second angle. The second angle is within the range from 900 to 270°.

It may be understood that, when the first angle is within the range from 900 to 270°, the second end of the second strip-shaped conductor is disposed in a direction away from the first strip-shaped conductor. In this case, when the first strip-shaped conductor and the second strip-shaped conductor receive and send electromagnetic wave signals, the first strip-shaped conductor and the second strip-shaped conductor do not easily interfere with each other and affect each other. This ensures that the first antenna and the second antenna have good radiation performance.

In addition, when the second angle is within the range from 900 to 270°, the second end of the third strip-shaped conductor is disposed in a direction away from the first strip-shaped conductor. In this case, when the first strip-shaped conductor and the third strip-shaped conductor receive and send electromagnetic wave signals, the first strip-shaped conductor and the third strip-shaped conductor do not easily interfere with each other and affect each other. This ensures that the first antenna and the second antenna have good radiation performance.

In an implementation, both the first angle and the second angle are equal to 180°. A length of the second strip-shaped conductor is equal to a length of the third strip-shaped conductor.

It may be understood that, when both the first angle and the second angle are equal to 180°, and the length of the second strip-shaped conductor is equal to the length of the third strip-shaped conductor, the second strip-shaped conductor and the third strip-shaped conductor are symmetrical with respect to the feeding part. In this case, a resonance frequency of the common mode excited by the third strip-shaped conductor is equal to a resonance frequency of the common mode excited by the second strip-shaped conductor. The second antenna can excite a resonance mode in a common mode: The second strip-shaped conductor and the third strip-shaped conductor jointly excite the common mode. Therefore, in this implementation, the first antenna and the second antenna excite two antenna modes. This helps the antenna implement wide-band coverage setting.

In addition, for a current in the common mode jointly excited by the second strip-shaped conductor and the third strip-shaped conductor, a direction of the third current on the second strip-shaped conductor is opposite to a direction of the fourth current on the third strip-shaped conductor, and current intensity is approximately the same. In this case, phases of magnetic fields at the feeding part are opposite, and amplitudes of the magnetic fields are approximately offset. In this way, the magnetic fields are mainly distributed on two sides of the feeding part, and two SAR hotspots are formed on the two sides of the feeding part. In this case, energy of radiated electromagnetic waves is dispersed, and an SAR value of the common mode is low.

In an implementation, both the first angle and the second angle are equal to 180°. A length of the second strip-shaped conductor is less than a length of the third strip-shaped conductor.

It may be understood that, when both the first angle and the second angle are equal to 180°, and the length of the second strip-shaped conductor is less than the length of the third strip-shaped conductor, the second strip-shaped conductor and the third strip-shaped conductor are not symmetrical with respect to the feeding part. In this case, a resonance frequency of the common mode excited by the third strip-shaped conductor is not equal to a resonance frequency of the common mode excited by the second strip-shaped conductor. The second antenna can excite a resonance mode in two common modes: the common mode excited by the second strip-shaped conductor and the common mode excited by the third strip-shaped conductor. Therefore, in this implementation, the first antenna and the second antenna can excite three resonance modes. This helps the antenna implement wide-band coverage setting.

In addition, for a current distribution in the common mode excited by the third strip-shaped conductor, the fourth current on the third strip-shaped conductor flows into the circuit board through the second ground part. In this way, current intensity on the third strip-shaped conductor is greatly reduced. Strength of a magnetic field generated by the third strip-shaped conductor is also small, and an SAR value of the common mode excited by the second antenna is low.

In an implementation, the second antenna further includes a third strip-shaped conductor. The third strip-shaped conductor is fastened on the rear cover or support. It may be understood that the third strip-shaped conductor may be fastened on the surface of the rear cover, or may be embedded into the rear cover. The third strip-shaped conductor may be fastened on the surface of the support, or may be embedded into the support.

The third strip-shaped conductor includes a first end and a second end disposed away from the first end. The first end of the third strip-shaped conductor is connected to the first end of the second strip-shaped conductor. The first end of the third strip-shaped conductor is electrically connected to the first ground part. The second end of the third strip-shaped conductor is not grounded, that is, the second end of the third strip-shaped conductor is an open end. A clearance area of the second antenna is formed between the third strip-shaped conductor and the board surface that is of the circuit board and that faces the rear cover.

It may be understood that, the first end of the third strip-shaped conductor is connected to the first end of the second strip-shaped conductor, and is electrically connected to the first ground part through the first end of the third strip-shaped conductor, so that the second antenna excites an antenna mode in a common mode: The second strip-shaped conductor and the third strip-shaped conductor jointly excite the antenna mode in the common mode. Therefore, in this implementation, the first antenna and the second antenna can excite two resonance modes. This helps the antenna implement wide-band coverage setting.

In addition, a current in the common mode jointly excited by the second strip-shaped conductor and the third strip-shaped conductor is mainly distributed as follows: a third current flowing from the second end of the second strip-shaped conductor to the first end of the second strip-shaped conductor on the second strip-shaped conductor, and a fourth current flowing from the second end of the third strip-shaped conductor to the first end of the third strip-shaped conductor on the third strip-shaped conductor. In this case, a direction of the fourth current on the third strip-shaped conductor can be opposite to a direction of the third current on the second strip-shaped conductor, and current intensity can be approximately the same. In this case, amplitudes of magnetic fields between the third strip-shaped conductor and the second strip-shaped conductor can be offset, energy of radiated electromagnetic waves is dispersed, and the SAR value of the common mode excited by the second antenna is low.

In addition, the third current on the second strip-shaped conductor flows into the circuit board through the first ground part, and the current on the third strip-shaped conductor flows into the circuit board through the second ground part. Therefore, current intensity on the second strip-shaped conductor and the third strip-shaped conductor is greatly reduced. In this case, strength of magnetic fields generated by the second strip-shaped conductor and the third strip-shaped conductor is also small, and the SAR value of the common mode of the second antenna is further reduced.

In an implementation, the first end of the third strip-shaped conductor and the first ground part of the first strip-shaped conductor are directly fed. It may be understood that direct feeding means that the first end of the third strip-shaped conductor is connected to the first ground part of the first strip-shaped conductor, and a radio frequency signal is directly fed to the second strip-shaped conductor through the first ground part.

In an implementation, the first end of the third strip-shaped conductor and the first ground part of the first strip-shaped conductor are indirectly fed through coupling.

In an implementation, a projection of the first strip-shaped conductor on the board surface of the circuit board is a first projection. A projection of the second strip-shaped conductor on the board surface of the circuit board is a second projection. A projection of the third strip-shaped conductor on the board surface of the circuit board is a third projection. An area of an overlapping region among the first projection, the second projection, and the third projection is within a range from 0 square millimeters to 16 square millimeters. It may be understood that, under this size, stability of an electrical connection between the first end of the second strip-shaped conductor and the first ground part of the first strip-shaped conductor is good. Stability of an electrical connection between the first end of the third strip-shaped conductor and the first ground part of the first strip-shaped conductor is good. In this case, the third current on the second strip-shaped conductor can flow well into the circuit board through the first ground part, and the fourth current on the third strip-shaped conductor can flow well into the circuit board through the first ground part, so that the SAR value of the common mode excited by the second antenna is low.

In an implementation, a projection of the first strip-shaped conductor on the board surface of the circuit board is a first projection. A projection of the second strip-shaped conductor on the board surface of the circuit board is a second projection. An included angle between the second projection and the first projection is a first angle. A projection of the third strip-shaped conductor on the board surface of the circuit board is a third projection. An included angle between the third projection and the first projection is a second angle. Both the first angle and the second angle are equal to 90°.

It may be understood that, when the first angle is equal to 90°, the second end of the second strip-shaped conductor is disposed in a direction away from the first strip-shaped conductor. In this case, when the first strip-shaped conductor and the second strip-shaped conductor receive and send electromagnetic wave signals, the first strip-shaped conductor and the second strip-shaped conductor do not easily interfere with each other and affect each other. This ensures that the first antenna and the second antenna have good radiation performance.

In addition, when the second angle is equal to 90°, the second end of the third strip-shaped conductor is disposed in a direction away from the first strip-shaped conductor. In this case, when the first strip-shaped conductor and the third strip-shaped conductor receive and send electromagnetic wave signals, the first strip-shaped conductor and the third strip-shaped conductor do not easily interfere with each other and affect each other. This ensures that the first antenna and the second antenna have good radiation performance.

In addition, when the first angle and the second angle are equal to 90°, for currents in the common mode jointly excited by the second strip-shaped conductor and the third strip-shaped conductor, directions of the currents on the first strip-shaped conductor and the third strip-shaped conductor are opposite. In this case, amplitudes of magnetic fields between the third strip-shaped conductor and the second strip-shaped conductor can be offset, energy of radiated electromagnetic waves is dispersed, and the SAR value of the common mode excited by the second antenna is low.

In an implementation, a length of the second strip-shaped conductor is equal to a length of the third strip-shaped conductor. In this case, the second strip-shaped conductor and the third strip-shaped conductor are symmetrical with respect to the first ground part. In this case, for currents in the common mode jointly excited by the second strip-shaped conductor and the third strip-shaped conductor, current intensity on the first strip-shaped conductor is the same as current intensity on the third strip-shaped conductor. In this case, amplitudes of magnetic fields between the third strip-shaped conductor and the second strip-shaped conductor are offset, energy of radiated electromagnetic waves is dispersed, and the SAR value of the common mode excited by the second antenna is low.

In an implementation, the second antenna further includes a fourth strip-shaped conductor and a fifth strip-shaped conductor. Both the fourth strip-shaped conductor and the fifth strip-shaped conductor are fastened on the rear cover or the support. It may be understood that the fourth strip-shaped conductor and the fifth strip-shaped conductor may be fastened on a surface of the rear cover, or may be embedded into the rear cover. The fourth strip-shaped conductor and the fifth strip-shaped conductor may be fastened on a surface of the support, or may be embedded into the support.

In addition, a clearance area of the second antenna is formed between the fourth strip-shaped conductor and the board surface that is of the circuit board and that faces the rear cover. A clearance area of the second antenna is formed between the fifth strip-shaped conductor and the board surface that is of the circuit board and that faces the rear cover.

An end of the fourth strip-shaped conductor is connected to an end of the fifth strip-shaped conductor. The connected ends of the fourth strip-shaped conductor and the fifth strip-shaped conductor are both electrically connected to the second ground part. Neither an end that is of the fourth strip-shaped conductor and that is away from the fifth strip-shaped conductor nor an end that is of the fifth strip-shaped conductor and that is away from the fourth strip-shaped conductor is grounded, that is, both the end that is of the fourth strip-shaped conductor and that is away from the fifth strip-shaped conductor and the end that is of the fifth strip-shaped conductor and that is away from the fourth strip-shaped conductor are open ends.

It may be understood that, the fourth strip-shaped conductor and the fifth strip-shaped conductor are disposed, and the connected ends of fourth strip-shaped conductor and the fifth strip-shaped conductor are electrically connected to the second ground part, so that the fourth strip-shaped conductor and the fifth strip-shaped conductor jointly excite an antenna mode in a common mode. A current in the common mode is mainly distributed as follows: a fifth current flowing from the second end of the fourth strip-shaped conductor to the first end of the fourth strip-shaped conductor on the fourth strip-shaped conductor, and a sixth current flowing from the second end of the fifth strip-shaped conductor to the first end of the fifth strip-shaped conductor on the fifth strip-shaped conductor.

In one case, when a resonance frequency of a common mode jointly excited by the fourth strip-shaped conductor and the fifth strip-shaped conductor is not equal to a resonance frequency of the common mode jointly excited by the second strip-shaped conductor and the third strip-shaped conductor, the second antenna can excite a resonance mode in the two common modes: the common mode jointly excited by the second strip-shaped conductor and the third strip-shaped conductor, and the common mode jointly excited by the fourth strip-shaped conductor and the fifth strip-shaped conductor. Therefore, in this implementation, the first antenna and the second antenna can excite three resonance modes. This helps the antenna implement wide-band coverage setting.

In addition, for a current distribution in the common mode jointly excited by the fourth strip-shaped conductor and the fifth strip-shaped conductor, the fifth current on the fourth strip-shaped conductor flows into the circuit board through the second ground part, and the sixth current on the sixth strip-shaped conductor flows into the circuit board through the second ground part. In this way, current intensity on the fourth strip-shaped conductor and the fifth strip-shaped conductor is greatly reduced. Strength of magnetic fields generated by the fourth strip-shaped conductor and the fifth strip-shaped conductor is also small, and the SAR value of the common mode excited by the second antenna is also low.

In another case, when a resonance frequency of a common mode jointly excited by the fourth strip-shaped conductor and the fifth strip-shaped conductor is not equal to a resonance frequency of a common mode jointly excited by the second strip-shaped conductor and the third strip-shaped conductor, the second antenna can excite a resonance mode in a common mode: The second strip-shaped conductor, the third strip-shaped conductor, the fourth strip-shaped conductor and the fifth strip-shaped conductor jointly excite the common mode. Therefore, in this implementation, the first antenna and the second antenna can excite two resonance modes. This helps the antenna implement wide-band coverage setting.

In addition, for a current in the common mode jointly excited by the second strip-shaped conductor, the third strip-shaped conductor, the fourth strip-shaped conductor, and the fifth strip-shaped conductor, a direction of the third current on the second strip-shaped conductor can be opposite to a direction of the fourth current on the third strip-shaped conductor, and current intensity can be approximately the same. A direction of the fifth current on the fourth strip-shaped conductor can be opposite to a direction of the sixth current on the fifth strip-shaped conductor, and current intensity can be approximately the same. In this case, phases of magnetic fields at the feeding part are opposite, and amplitudes of the magnetic fields are approximately offset. In this way, the magnetic fields are mainly distributed on two sides of the feeding part, and two SAR hotspots are formed on the two sides of the feeding part. In this case, energy of radiated electromagnetic waves is dispersed, and an SAR value of the common mode is low.

In an implementation, the connected ends of the fourth strip-shaped conductor and the fifth strip-shaped conductor, and the second ground part are directly fed.

In an implementation, the connected ends of the fourth strip-shaped conductor and the fifth strip-shaped conductor, and the second ground part are indirectly fed through coupling.

In an implementation, a projection of the first strip-shaped conductor on the board surface of the circuit board is a first projection. A projection of the fourth strip-shaped conductor on the board surface of the circuit board is a fourth projection. A projection of the fifth strip-shaped conductor on the board surface of the circuit board is a fifth projection. An area of an overlapping region among the first projection, the fourth projection, and the fifth projection is within a range from 0 square millimeters to 16 square millimeters. It may be understood that, under this size, stability of an electrical connection between the first end of the fourth strip-shaped conductor and the second ground part of the first strip-shaped conductor is good. Stability of an electrical connection between the first end of the fifth strip-shaped conductor and the second ground part of the first strip-shaped conductor is good. In this case, the fifth current on the fourth strip-shaped conductor can flow well into the circuit board through the second ground part, and the sixth current on the fifth strip-shaped conductor can flow well into the circuit board through the second ground part, so that the SAR value of the common mode excited by the second antenna is low.

In an implementation, a projection of the fourth strip-shaped conductor on the board surface of the circuit board is a fourth projection. An included angle between the fourth projection and the first projection is equal to 90°. A projection of the fifth strip-shaped conductor on the board surface of the circuit board is a fifth projection. An included angle between the fifth projection and the first projection is equal to 90°.

It may be understood that, when the included angle between the fourth projection and the first projection is equal to 90°, the second end of the fourth strip-shaped conductor is disposed in a direction away from the first strip-shaped conductor. In this case, when the fourth strip-shaped conductor receives and sends an electromagnetic wave signal, the fourth strip-shaped conductor and the first strip-shaped conductor do not easily interfere with each other and affect each other. This ensures that the first antenna and the second antenna have good radiation performance.

In addition, when the included angle between the fifth projection and the first projection is equal to 90°, the second end of the fifth strip-shaped conductor is disposed in a direction away from the first strip-shaped conductor. In this case, when the fifth strip-shaped conductor receives and sends an electromagnetic wave signal, the fifth strip-shaped conductor and the first strip-shaped conductor do not easily interfere with each other and affect each other. This ensures that the first antenna and the second antenna have good radiation performance.

In addition, when both the included angle between the fourth projection and the first projection and the included angle between the fifth projection and the first projection are equal to 90°, for a current distribution in the common mode jointly excited by the fourth strip-shaped conductor and the fifth strip-shaped conductor, directions of currents on the fourth strip-shaped conductor and the fifth strip-shaped conductor are opposite. In this case, amplitudes of magnetic fields between the fourth strip-shaped conductor and the fifth strip-shaped conductor can be offset, energy of radiated electromagnetic waves is dispersed, and the SAR value of the common mode excited by the second antenna is low.

In an implementation, a sum of a length of the fourth strip-shaped conductor and a length of the fifth strip-shaped conductor is equal to a sum of a length of the second strip-shaped conductor and a length of the third strip-shaped conductor.

It may be understood that, when the sum of the length of the fourth strip-shaped conductor and the length of the fifth strip-shaped conductor is equal to the sum of the length of the second strip-shaped conductor and the length of the third strip-shaped conductor, the second strip-shaped conductor and the third strip-shaped conductor can be symmetrical with respect to the feeding part, the fourth strip-shaped conductor, and the fifth strip-shaped conductor. In this case, a resonance frequency of a common mode jointly excited by the fourth strip-shaped conductor and the fifth strip-shaped conductor is not equal to a resonance frequency of the common mode jointly excited by the second strip-shaped conductor and the third strip-shaped conductor, the second antenna can excite a resonance mode in a common mode: The second strip-shaped conductor, the third strip-shaped conductor, the fourth strip-shaped conductor and the fifth strip-shaped conductor jointly excite the common mode. Therefore, in this implementation, the first antenna and the second antenna can excite two resonance modes. This helps the antenna implement wide-band coverage setting.

In addition, for a current in the common mode jointly excited by the second strip-shaped conductor, the third strip-shaped conductor, the fourth strip-shaped conductor, and the fifth strip-shaped conductor, current intensity of the third current on the second strip-shaped conductor is same as current intensity of the fourth current on the third strip-shaped conductor, and current intensity of the fifth current on the fourth strip-shaped conductor is the same as current intensity of the sixth current on the fifth strip-shaped conductor. In this case, phases of magnetic fields at the feeding part are opposite, and amplitudes of the magnetic fields are approximately offset. In this way, the magnetic fields are mainly distributed on two sides of the feeding part, and two SAR hotspots are formed on the two sides of the feeding part. In this case, energy of radiated electromagnetic waves is dispersed, and an SAR value of the common mode is low.

In an implementation, a sum of a length of the fourth strip-shaped conductor and a length of the fifth strip-shaped conductor is less than a sum of a length of the second strip-shaped conductor and a length of the third strip-shaped conductor.

It may be understood that the second strip-shaped conductor and the third strip-shaped conductor are not symmetrical with respect to the feeding part, the fourth strip-shaped conductor, and the fifth strip-shaped conductor. A resonance frequency of the common mode jointly excited by the fourth strip-shaped conductor and the fifth strip-shaped conductor is not equal to a resonance frequency of the common mode jointly excited by the second strip-shaped conductor and the third strip-shaped conductor, the second antenna can excite a resonance mode in the two common modes: the common mode jointly excited by the second strip-shaped conductor and the third strip-shaped conductor, and the common mode jointly excited by the fourth strip-shaped conductor and the fifth strip-shaped conductor. Therefore, in this implementation, the first antenna and the second antenna can excite three resonance modes. This helps the antenna implement wide-band coverage setting.

In addition, for a current distribution in the common mode jointly excited by the fourth strip-shaped conductor and the fifth strip-shaped conductor, the fifth current on the fourth strip-shaped conductor flows into the circuit board through the second ground part, and the sixth current on the sixth strip-shaped conductor flows into the circuit board through the second ground part. In this way, current intensity on the fourth strip-shaped conductor and the fifth strip-shaped conductor is greatly reduced. Strength of magnetic fields generated by the fourth strip-shaped conductor and the fifth strip-shaped conductor is also small, and the SAR value of the common mode excited by the second antenna is also low.

In an implementation, the first antenna and the second antenna generate a plurality of resonance modes, and the resonance mode of the first antenna generates two SAR hotspots.

In an implementation, an SAR value of the resonance mode of the first antenna is less than 0.5.

In an implementation, the first antenna and the second antenna generate a plurality of resonance modes, and an SAR value of each resonance mode is less than 1.

In an implementation, currents excited by the first strip-shaped conductor include a first current flowing from the first ground part to the feeding part, and a second current flowing from the second ground part to the feeding part.

In an implementation, a current excited by the second strip-shaped conductor includes a current flowing from the second end of the second strip-shaped conductor to the first end of the second strip-shaped conductor.

DETAILED DESCRIPTION OF ILLUSTRATIVE EMBODIMENTS

Figure 1:
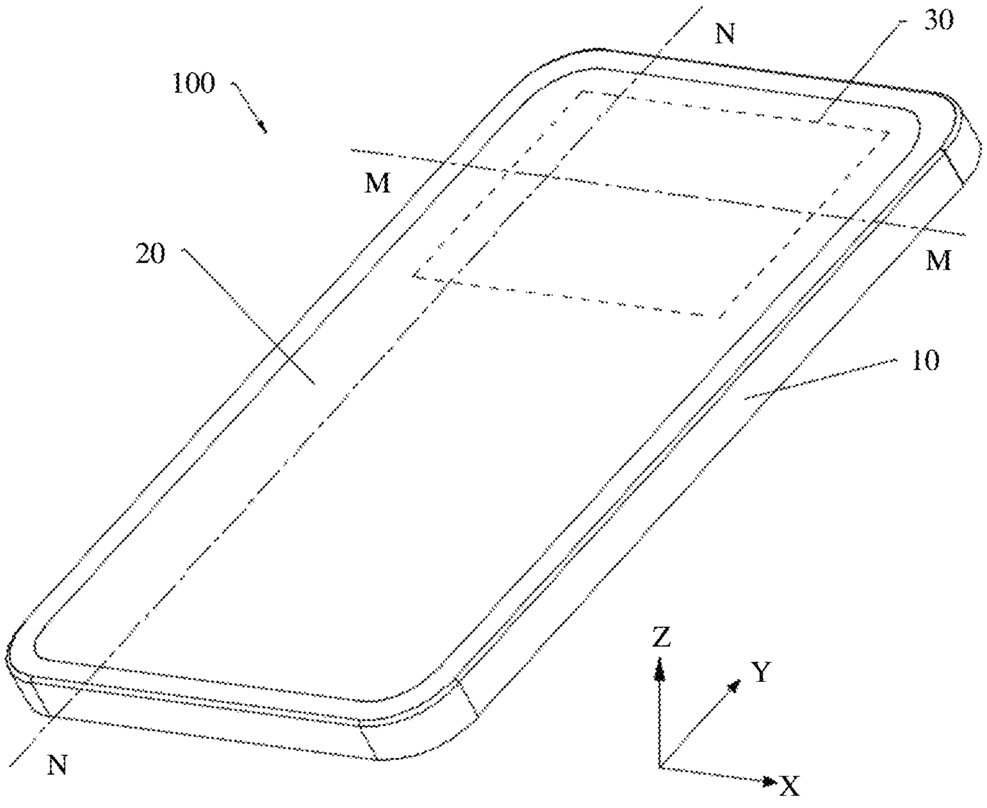
FIG. 1 is a schematic diagram of a structure of an implementation of an electronic device according to an embodiment of this application.

FIG. 1 is a schematic diagram of a structure of an implementation of an electronic device according to an embodiment of this application. The electronic device 100 may be a mobile phone, a watch, a tablet personal computer (tablet personal computer), a laptop computer (laptop computer), a personal digital assistant (personal digital assistant, PDA), a camera, a personal computer, a notebook computer, an in-vehicle device, a wearable device, augmented reality (augmented reality, AR) glasses, an AR helmet, virtual reality (virtual reality, VR) glasses, a VR helmet, or a device in another form that can receive and transmit an electromagnetic wave. In the embodiment shown in FIG. 1, a description is provided by using an example in which the electronic device 100 is a mobile phone. For ease of description, a width direction of the electronic device 100 is defined as an X axis. A length direction of the electronic device 100 is a Y axis. A thickness direction of the electronic device 100 is a Z axis.

Figure 2:
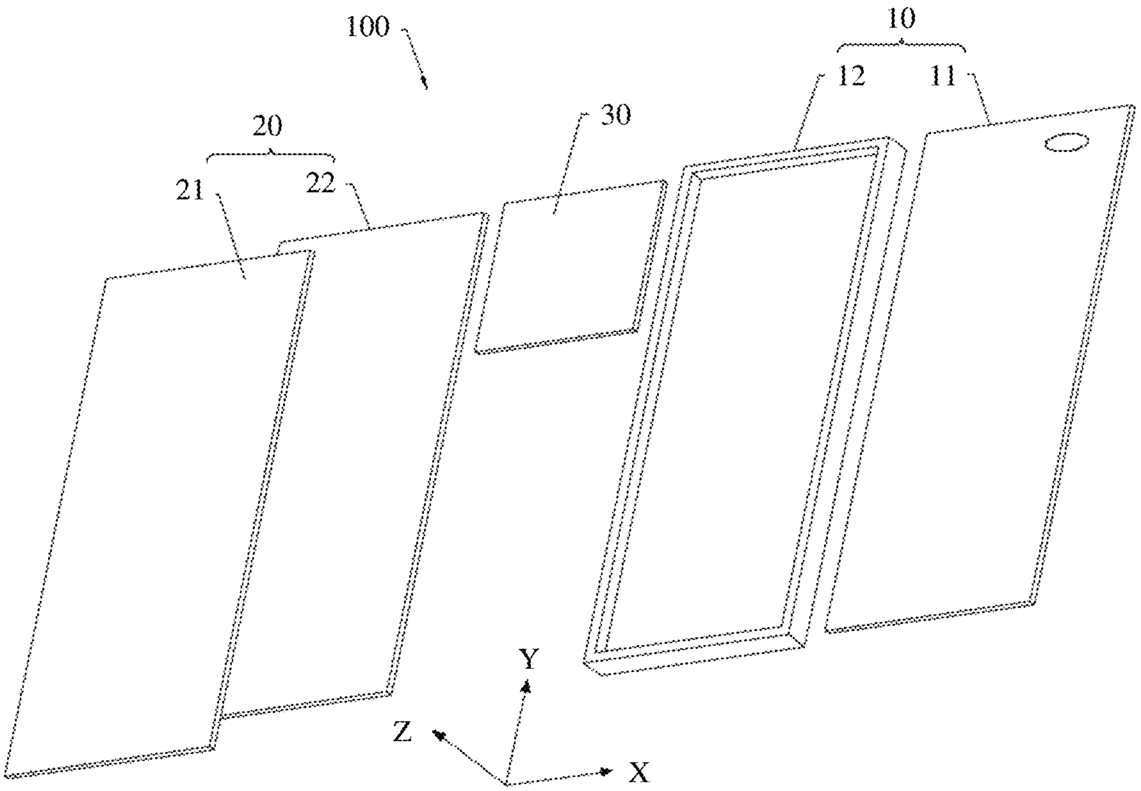
FIG. 2 is a partial schematic exploded view of the electronic device shown in FIG. 1.

With reference to FIG. 1, FIG. 2 is a partial schematic exploded view of the electronic device shown in FIG. 1. The electronic device 100 includes a housing 10, a screen 20, and a circuit board 30. It may be understood that, FIG. 1 and FIG. 2 merely show examples of some components included in the electronic device 100. Actual shapes, actual sizes, and actual structures of these components are not limited by FIG. 1 and FIG. 2.

The housing 10 may be configured to support the screen 20 and a related component in the electronic device 100. The housing 10 includes a rear cover 11 and a bezel 12. The rear cover 11 is disposed opposite to the screen 20. The rear cover 11 and the screen 20 are mounted on two opposite sides of the bezel 12. In this case, the rear cover 11, the bezel 12, and the screen 20 jointly enclose the interior of the electronic device 100. An electronic component of the electronic device 100, for example, a battery, a loudspeaker, a microphone, or an earpiece, may be placed on the interior of the electronic device 100.

In an implementation, the rear cover 11 may be fixedly connected to the bezel 12 by using adhesive.

In another implementation, the rear cover 11 and the bezel 12 are an integrated structure, that is, the rear cover 11 and the bezel 12 are integrated.

The screen 20 is mounted on the housing 10. FIG. 1 shows a roughly cuboid structure that is enclosed by the screen 20 and the housing 10. In addition, the screen 20 may be configured to display an image, a text, and the like.

In this implementation, the screen 20 includes a protection cover 21 and a display 22. The protection cover 21 is stacked on the display 22. The protection cover 21 may be disposed close to the display 22, and may be mainly configured to protect the display 22 against dust. A material of the protection cover 21 may be but is not limited to glass. The display 22 may be an organic light-emitting diode (organic light-emitting diode, OLED) display, an active-matrix organic light-emitting diode (active-matrix organic light-emitting diode, AMOLED) display, a mini light-emitting diode (mini organic light-emitting diode) display, a micro light-emitting diode (micro light-emitting diode) display, a micro organic light-emitting diode (micro organic light-emitting diode) display, or a quantum dot light-emitting diode (quantum dot light-emitting diode, QLED) display.

Figure 3:
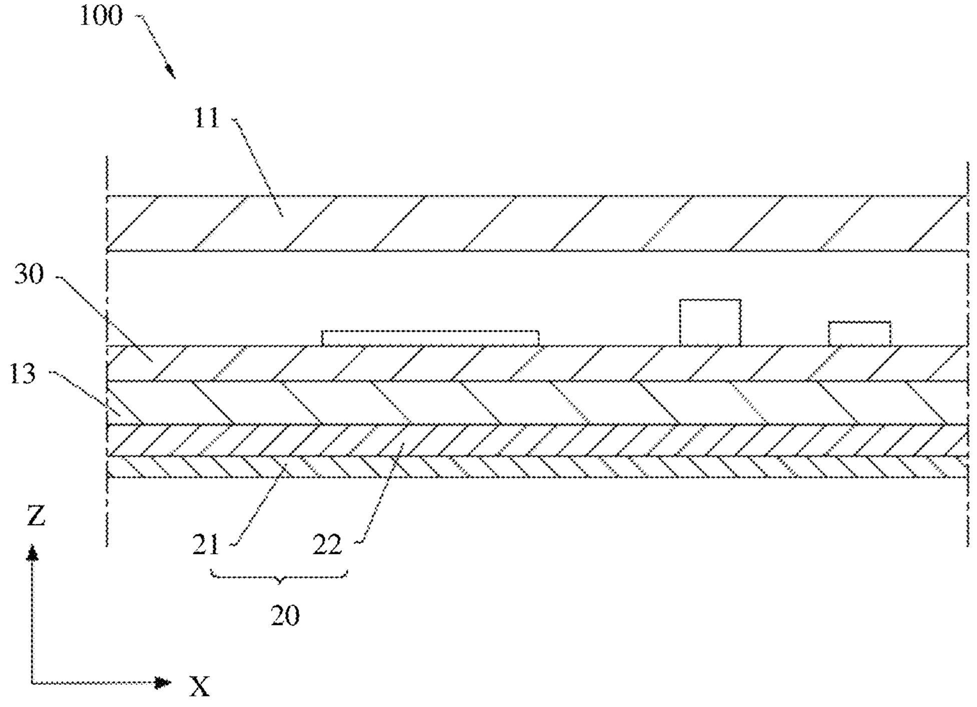
FIG. 3 is a partial sectional view of the electronic device shown in FIG. 1 at line M-M.

With reference to FIG. 2, FIG. 3 is a partial sectional view of the electronic device shown in FIG. 1 at line M-M. The circuit board 30 is mounted on the interior of the electronic device 100, and the circuit board 30 and the rear cover 11 are disposed at intervals, that is, there is space between the circuit board 30 and the rear cover 11.

In this implementation, the housing 10 further includes a middle board 13. The middle board 13 is located on the interior of the electronic device 100, and the middle board 13 is connected to an inner side of the bezel 12. The circuit board 30 and the display 22 of the screen 20 are respectively fastened on two sides opposite to each other of the middle board 13. The circuit board 30 faces the rear cover 11. In this case, the middle board 13 can be configured to carry the screen 20, and can further be configured to carry the circuit board 30.

In another implementation, the housing 10 may not include the middle board 13. In this case, the circuit board 30 may be directly fastened to the screen 20.

In addition, the circuit board 30 may be configured to mount an electronic component of the electronic device 100. For example, the electronic component may be a central processing unit (central processing unit, CPU), a battery management unit, or a baseband processing unit. In addition, the circuit board 30 may be a rigid circuit board, or may be a flexible circuit board, or may be a combination of a rigid circuit board and a flexible circuit board. In addition, the circuit board 30 may be an FR-4 dielectric board, or may be a Rogers (Rogers) dielectric board, or may be a hybrid dielectric board of Rogers and FR-4, or the like. Herein, FR-4 is a grade designation for a flame-resistant material, and the Rogers dielectric board is a high frequency board.

In addition, the electronic device 100 further includes a plurality of antennas. In this application, "a plurality of" means at least two. The antenna is configured to transmit and receive an electromagnetic wave signal. It may be understood that the electronic device 100 may communicate with a network or another device through an antenna by using one or more of the following communication technologies. The communication technology includes a Bluetooth (Bluetooth, BT) communication technology, a global positioning system (global positioning system, GPS) communication technology, a wireless fidelity (wireless fidelity, Wi-Fi) communication technology, a global system for mobile communications (global system for mobile communications, GSM) communication technology, a wideband code division multiple access (wideband code division multiple access, WCDMA) communication technology, a long term evolution (long term evolution, LTE) communication technology, a 5G communication technology, a SUB-6G communication technology, another future communication technology, and the like.

In addition, the electronic device 100 may implement mobile data sharing or wireless network sharing with another device (for example, a mobile phone, a watch, a tablet computer, or a device in another form that can transmit and receive an electromagnetic wave signal) by using an antenna. For example, when another device enables a mobile data sharing network, the electronic device 100 can access the mobile data sharing network of the another device by receiving an antenna signal of the another device. In this way, user experience of the electronic device 100 is not affected by insufficient mobile data of the electronic device 100 or disabling of mobile data of the electronic device 100.

In addition, to bring more comfortable visual experience to a user, the electronic device 100 may use a bezel-less screen industrial design (industrial design, ID). The bezel-less screen means a large screen-to-body ratio (usually over 90%). A width of the bezel 12 of the bezel-less screen is greatly reduced, and internal components of the electronic device 100, such as a front-facing camera, a phone receiver, a fingerprint sensor, and an antenna, need to be rearranged. Especially for an antenna design, a clearance area is reduced and antenna space is further reduced. However, a size, a bandwidth, and efficiency of the antenna are correlated and affect each other. If the antenna size (space) is reduced, an efficiency-bandwidth product (efficiency-bandwidth product) of the antenna is definitely reduced. In addition, in an antenna design of a mobile phone, attention is paid to impact of electromagnetic radiation on a human body. When more electromagnetic wave energy is absorbed by the human body, the impact of electromagnetic radiation on the human body is greater.

In this application, a composite antenna including a slot antenna and a wire antenna is disposed, so that in an environment in which antennas are tightly arranged, the composite antenna of the electronic device 100 can not only generate a plurality of resonance modes, to implement wide-band coverage, but also ensure that all the plurality of resonance modes meet a requirement of a low SAR value, to reduce the impact of electromagnetic radiation on the human body.

First, two antenna modes in this application are described.

Differential mode (differential mode, DM) slot antenna code

Figure 4A:
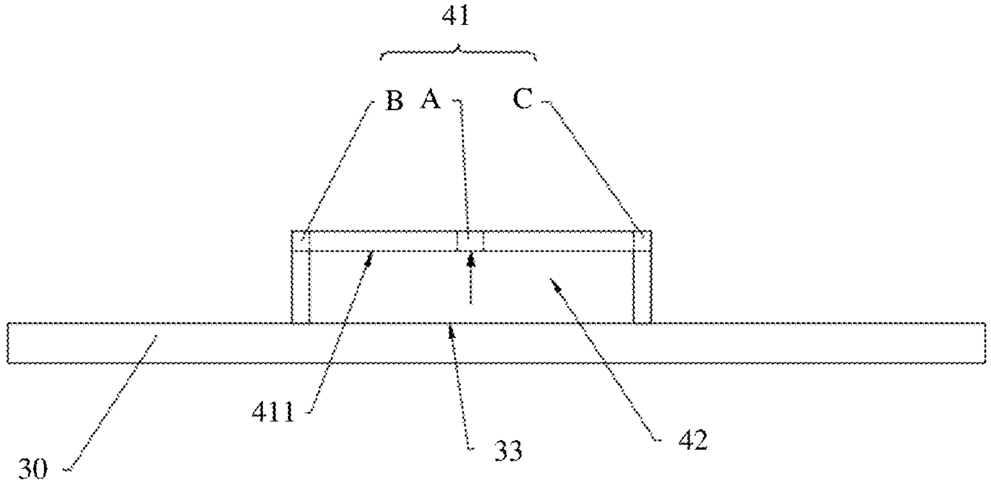
FIG. 4*a* is a schematic diagram of a structure of a slot antenna according to this application.

As shown in FIG. 4*a*, FIG. 4*a* is a schematic diagram of a structure of a slot antenna according to this application. The slot antenna may include a first strip-shaped conductor 41 and a circuit board 30. The first strip-shaped conductor 41 and the circuit board 30 are disposed at intervals. A first gap 42 is formed between a board surface 33 of the circuit board 30 and a surface 411 that is of the first strip-shaped conductor 41 and that faces the circuit board 30. Two ends of the first strip-shaped conductor 41 are electrically connected to a ground plane of the circuit board 30, and the two ends of the first strip-shaped conductor 41 form a first ground part B and a second ground part C respectively. The first strip-shaped conductor 41 includes a feeding part A. The feeding part A is located between the first ground part B and the second ground part C. The feeding part A is a signal feed—in part in the first strip-shaped conductor 41. FIG. 4*a* shows, by using an arrow, a location at which a radio frequency signal is fed.

Figure 4B:
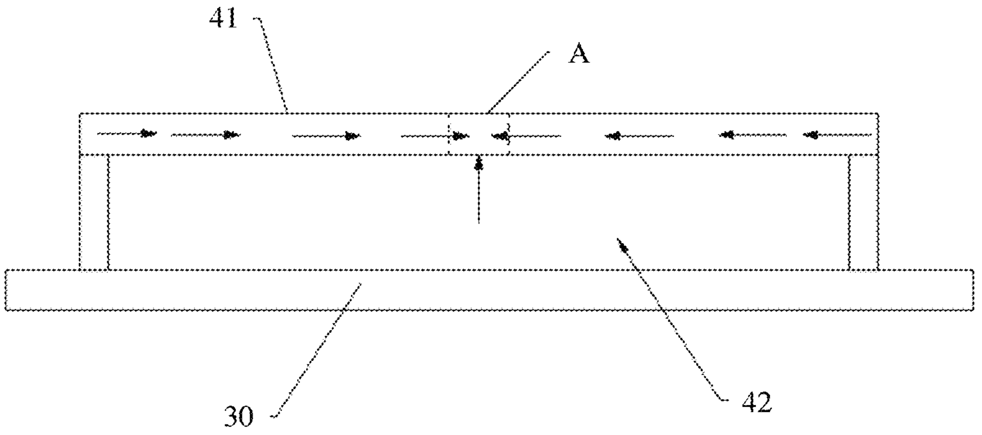
FIG. 4*b* is a current distribution diagram in a differential mode slot antenna mode according to this application.

FIG. 4*b* is a current distribution diagram in a differential mode slot antenna mode according to this application. FIG. 4*b* shows current distribution of a slot antenna. As shown in FIG. 4*b*, currents are reversely distributed on two sides of the feeding part A of the first strip-shaped conductor 41. The feeding structure shown in FIG. 4*a* may be referred to as a symmetric feeding structure. The slot antenna mode shown in FIG. 4*b* may be referred to as the differential mode slot antenna mode. Current distribution shown in FIG. 4*b* is referred to as a current in the differential mode slot antenna mode.

Common Mode (Common Mode, CM) Wire Antenna Mode

Figure 5A:
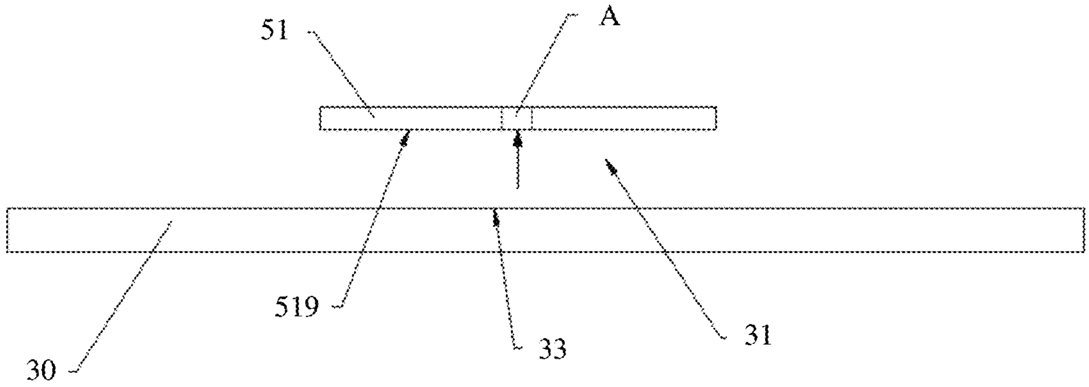
FIG. 5*a* is a schematic diagram of a structure of a wire antenna according to this application.

FIG. 5*a* is a schematic diagram of a structure of a wire antenna according to this application. The wire antenna may include a second strip-shaped conductor 51 and a circuit board 30. The second strip-shaped conductor 42 and the circuit board 30 are disposed at intervals. A second gap 31 is formed between the board surface 33 of the circuit board 30 and a surface 519 that is of the second strip-shaped conductor 51 and that faces the circuit board 30. A feeding part A is formed in the middle of the second strip-shaped conductor 51. The feeding part A is a part that feeds a radio frequency signal in the second strip-shaped conductor 51. FIG. 5*a* shows, by using an arrow, a location at which a radio frequency signal is fed. In addition, two ends of the second strip-shaped conductor 51 are open ends, that is, the two ends of the second strip-shaped conductor 51 are not grounded.

Figure 5B:
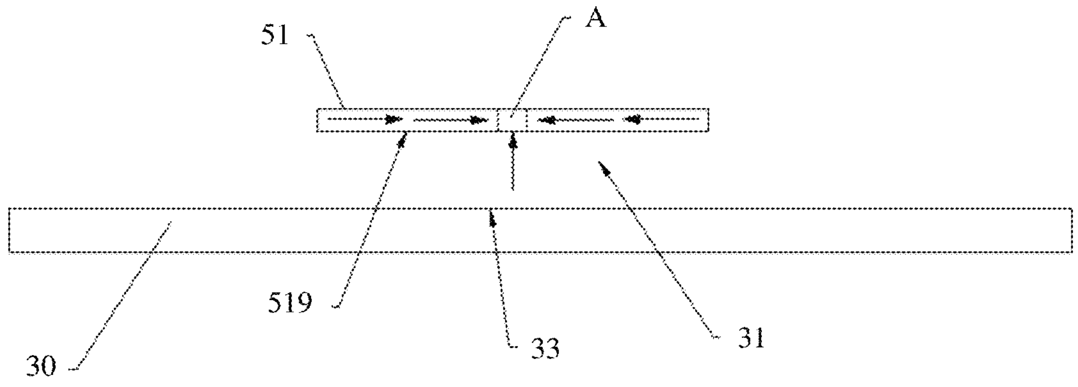
FIG. 5*b* is a current distribution diagram in a common mode wire antenna mode according to this application.

FIG. 5*b* is a current distribution diagram in a common mode wire antenna mode according to this application. Currents are reversely distributed on two sides of the feeding part A of the second strip-shaped conductor 51. The feeding structure shown in FIG. 5*a* may be referred to as a symmetric feeding structure. The wire antenna mode shown in FIG. 5*b* may be referred to as the common mode wire antenna mode. Current distribution shown in FIG. 5*b* is referred to as a current in the common mode wire antenna mode.

It may be understood that the composite antenna including the slot antenna and the wire antenna may be disposed in a plurality of manners. The following specifically describes, with reference to related accompanying drawings, several disposing manners of the composite antenna including the slot antenna and the wire antenna.

In a first implementation, a specific structure of the slot antenna is first described with reference to related accompanying drawings.

Figure 6:
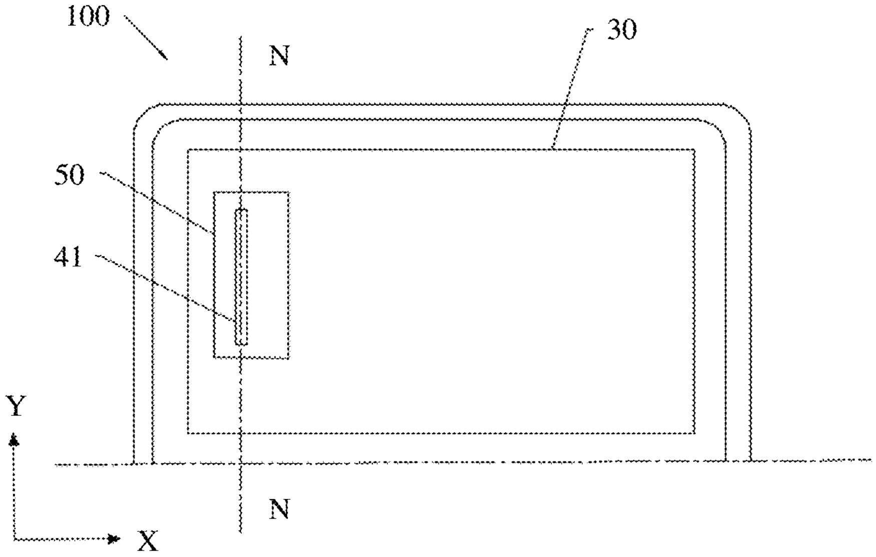
FIG. 6 is a schematic diagram of a partial structure of the electronic device shown in FIG. 1.
Figure 7:
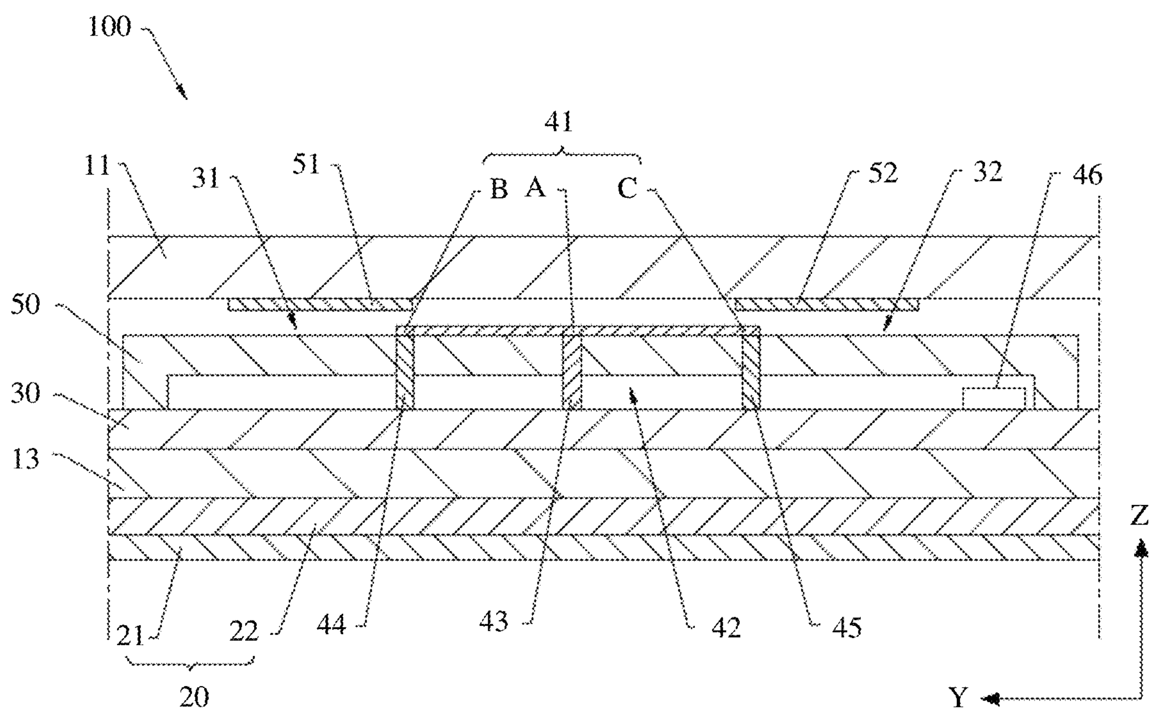
FIG. 7 is a partial schematic cross-sectional view of an implementation of the electronic device shown in FIG. 1 at line N-N.

Refer to FIG. 6 and FIG. 7. FIG. 6 is a schematic diagram of a partial structure of the electronic device shown in FIG. 1. FIG. 7 is a partial schematic cross-sectional view of an implementation of the electronic device shown in FIG. 1 at line N-N. FIG. 6 also shows a location of the line N-N shown in FIG. 1, that is, a location of the cross-sectional view in FIG. 7. The electronic device 100 includes the first strip-shaped conductor 41. A material of the first strip-shaped conductor 41 may be but is not limited to copper, gold, silver, or graphene. The first strip-shaped conductor 41 is a radiator of the slot antenna, that is, the first strip-shaped conductor 41 can radiate an electromagnetic wave signal based on a radio frequency signal. In addition, the first strip-shaped conductor 41 can receive an electromagnetic wave signal, and convert the electromagnetic wave signal into a radio frequency signal. FIG. 6 and FIG. 7 show that the first strip-shaped conductor 41 extends in a direction of a Y axis. In another implementation, the first strip-shaped conductor 41 may alternatively extend in the direction of the X axis. Specifically, this is not limited in this implementation.

In addition, the first strip-shaped conductor 41 is located between the rear cover 11 and the circuit board 30, or is fastened on the rear cover 11. FIG. 7 shows that the first strip-shaped conductor 41 is located between the rear cover 11 and the circuit board 30. In this case, in a Z-axis direction, there is a height difference between the first strip-shaped conductor 41 and the circuit board 30. In the Z-axis direction, the first gap 42 is formed between the first strip-shaped conductor 41 and the circuit board 30. The first gap 42 is a clearance area of the slot antenna. In addition, FIG. 7 also shows that the circuit board 30 is fastened on a side that is of the middle board 13 and that is away from the display 22 of the screen 20.

It may be understood that the first strip-shaped conductor 41 is formed and disposed in a plurality of manners.

Refer to FIG. 6 and FIG. 7 again. The electronic device 100 further includes a support 50. A material of the support 50 is an insulation material. The support 50 is of a frame structure. The support 50 is fastened on a side that is of the circuit board 30 and that faces the rear cover 11, and a hollow-out region is enclosed by the support 50 and the circuit board 30. In this case, the first strip-shaped conductor 41 is formed on a surface that is of the support 50 and that faces the rear cover 11 by using a laser-direct-structuring (laser-direct-structuring, LDS) technology. In this case, the first strip-shaped conductor 41 is located between the support 50 and the rear cover 11. In subsequent implementations, this implementation is used as an example for description.

In another implementation, the first strip-shaped conductor 41 is formed on the surface that is of the support 50 and that faces the rear cover 11 by using a printing direct structuring technology.

In another implementation, the first strip-shaped conductor 41 is formed on a surface that is of the support 50 and that faces the circuit board 30 by using an LDS or printing direct structuring technology. In this case, the first strip-shaped conductor 41 is located in a hollow-out region enclosed by the support 50 and the circuit board 30.

In another implementation, the first strip-shaped conductor 41 is injected inside the support 50 by using an in-mold decoration technology.

In another implementation, a material of the support 50 may alternatively be partially an insulation material and partially a metal material. The part of insulation material forms an insulation part. The part of metal material forms a metal part. In this case, the first strip-shaped conductor 41 is formed on the insulation part of the support 50. For a specific forming manner, refer to the foregoing implementations.

In an implementation, the support 50 may alternatively be plate-shaped or block-shaped. In this case, the support 50 and the circuit board 30 no longer enclose a hollow-out region. A material of the support 50 is an insulation material. The first strip-shaped conductor 41 is fastened on a surface that is of the support 50 and that faces the rear cover 11.

In an implementation, the electronic device 100 may alternatively not include the support 50. In this case, the first strip-shaped conductor 41 may be fastened to the rear cover 11. For example, the first strip-shaped conductor 41 is fastened on a surface that is of the rear cover 11 and that faces the circuit board 30, or the first strip-shaped conductor 41 is embedded into the rear cover 11, or is fastened on a surface that is of the rear cover 11 and that is away from the circuit board 30.

Refer to FIG. 7 again. The first strip-shaped conductor 41 includes the feeding part A. It may be understood that the feeding part A refers to a part into which a radio frequency signal is fed in the first strip-shaped conductor 41. The electronic device 100 further includes a first spring plate 43. The first spring plate is fastened to the circuit board 30, and the first spring plate is in elastic contact with the first strip-shaped conductor 41. A part that is of the first strip-shaped conductor 41 and that is in contact with the first spring plate 43 is the feeding part A. It may be understood that FIG. 7 merely schematically shows the feeding part A. However, an actual shape, an actual size, and an actual structure of the feeding part A are not limited by FIG. 7 and the following figures.

In addition, the electronic device 100 further includes a radio frequency transceiver circuit 46. It may be understood that FIG. 7 merely schematically shows the radio frequency transceiver circuit 46, and an actual shape, an actual size, and an actual structure of the radio frequency transceiver circuit 46 are not limited in FIG. 7. The radio frequency transceiver circuit 46 is mounted on the circuit board 30. The radio frequency transceiver circuit 46 is electrically connected to the first spring plate 43. In this way, when the radio frequency transceiver circuit 46 transmits a radio frequency signal, the radio frequency signal is transmitted to the first strip-shaped conductor 41 through the first spring plate 43. The first strip-shaped conductor 41 radiates an electromagnetic wave signal based on the radio frequency signal. In addition, after the first strip-shaped conductor 41 converts a received electromagnetic wave signal into a radio frequency signal, the radio frequency signal is transmitted to the radio frequency transceiver circuit 46 by using the first spring plate 43.

In an implementation, the radio frequency transceiver circuit 46 includes a radio frequency transceiver chip (not shown in the figure) and a first matching circuit (not shown in the figure). The radio frequency transceiver chip, the first matching circuit, and the first spring plate 43 are electrically connected in sequence. In other words, the first matching circuit is electrically connected between the radio frequency transceiver chip and the first spring plate 43. The radio frequency transceiver chip is configured to transmit and receive a radio frequency signal. The first matching circuit may be configured to adjust a frequency band at which the slot antenna receives and transmits an electromagnetic wave, or configured to perform impedance matching on the slot antenna. The first matching circuit includes electronic components such as an antenna switch, a capacitor, an inductor, or a resistor.

In another implementation, the radio frequency transceiver circuit 46 may alternatively be electrically connected to the first strip-shaped conductor 41 by using a first electrical connector, that is, the first spring plate 43 is replaced with the first electrical connector. In this case, a part that is of the first strip-shaped conductor 41 and that is in contact with the first electrical connector is the feeding part A.

Refer to FIG. 7 again. The first strip-shaped conductor 41 includes the first ground part B and the second ground part C. The first ground part B and the second ground part C are respectively located on two sides of the feeding part A, and the first ground part B and the second ground part C are respectively two ends of the first strip-shaped conductor 41. The first ground part B and the second ground part C refer to the ground parts of the first strip-shaped conductor 41. It may be understood that the first ground part B and the second ground part C may also be exchanged. In other words, the first ground part B may alternatively be located on a right side of the feeding part A. The second ground part C may alternatively be located on a left side of the feeding part A. It may be understood that FIG. 7 merely schematically shows the first ground part B and the second ground part C. However, actual shapes, actual sizes, and actual structures of the first ground part B and the second ground part C are not limited by FIG. 7 and the following figures.

Refer to FIG. 7 again. The electronic device 100 further includes a second spring plate 44 and a third spring plate 45. Both the second spring plate 44 and the third spring plate 45 are fastened to the circuit board 30. Both the second spring plate 44 and the third spring plate 45 are in elastic contact with the first strip-shaped conductor 41. In addition, both the second spring plate 44 and the third spring plate 45 are electrically connected to a ground plane of the circuit board 30. In this case, a part that is of the first strip-shaped conductor 41 and that is in contact with the second spring plate 44 is the first ground part B. A part that is of the first strip-shaped conductor 41 and that is in contact with the third spring plate 45 is the second ground part C.

In another implementation, the electronic device 100 further includes a second matching circuit (not shown in the figure). The second matching circuit is electrically connected between the second spring plate 44 and the ground plane of the circuit board 30. The second matching circuit includes an inductor, a capacitor, a resistor, or an antenna switch. The second matching circuit is configured to tune a frequency band at which the slot antenna receives and transmits an electromagnetic wave signal. The second matching circuit may be further configured to perform impedance matching on the antenna.

In addition, the circuit board 30 further includes a third matching circuit. The third matching circuit is electrically connected between the third spring plate 45 and the ground plane of the circuit board 30. The third matching circuit includes an inductor, a capacitor, a resistor, or an antenna switch. The third matching circuit is configured to tune a frequency band at which the slot antenna receives and transmits an electromagnetic wave signal. The third matching circuit may be further configured to perform impedance matching on the antenna.

In another implementation, the first strip-shaped conductor 41 may alternatively be grounded by using the second electrical connector and the third electrical connector respectively. In this case, a part that is of the first strip-shaped conductor 41 and that is in contact with the second electrical connector is the first ground part B. A part that is of the first strip-shaped conductor 41 and that is in contact with the third electrical connector is the second ground part C.

Figure 8:
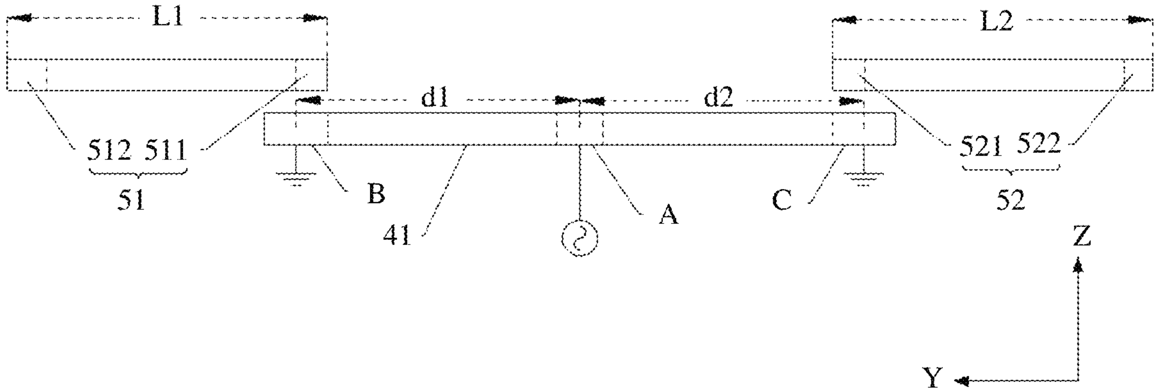
FIG. 8 is a schematic diagram of a partial structure of an implementation of a composite antenna of the electronic device shown in FIG. 1.

FIG. 8 is a schematic diagram of a partial structure of an implementation of a composite antenna of the electronic device shown in FIG. 1. A center distance between the first ground part B and the feeding part A is a first value d1. It may be understood that the center distance between the first ground part B and the feeding part A is a distance between a center of the first ground part B and a center of the feeding part A.

In addition, a center distance between the second ground part C and the feeding part A is a second value d2. A ratio of the first value d1 to the second value d2 is within a range from 0.8 to 1.2. The ratio of the first value d1 to the second value d2 in this implementation is 1. In this way, the first strip-shaped conductor 41 in this implementation is in a symmetric pattern shape with respect to the feeding part A. In another implementation, the ratio of the first value d1 to the second value d2 may alternatively be 0.8, 0.88, 0.9, 1.1, or 1.2.

In another possible implementation, the ratio of the first value d1 to the second value d2 may alternatively be outside the range from 0.8 to 1.2. In this case, overall symmetry of the first strip-shaped conductor 41 is relatively low, and the first matching circuit and the like may be adjusted to compensate for imbalance in this structure.

Figure 9A:
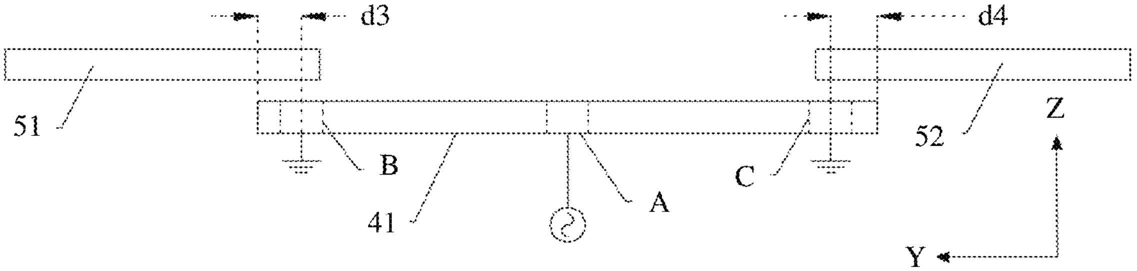
FIG. 9*a* is a schematic diagram of a partial structure of another implementation of a composite antenna of the electronic device shown in FIG. 1.

In this implementation, the first ground part B and the second ground part C are respectively even with two end faces of the first strip-shaped conductor 41. In another implementation, the first ground part B may alternatively not be even with an end face of the first strip-shaped conductor 41. The second ground part C may not be even with an end face of the first strip-shaped conductor 41 either. FIG. 9*a* is a schematic diagram of a partial structure of another implementation of a composite antenna of the electronic device shown in FIG. 1. A distance d3 between the first ground part B and an end face of the first strip-shaped conductor 41 is within a range from 0 millimeters to 5 millimeters. For example, d3 is equal to 0.1 millimeter, 0.8 millimeter, 1.9 millimeters, 3.8 millimeters, 4.1 millimeters, or 5 millimeters. A distance d4 between the second ground part C and an end face of the first strip-shaped conductor 41 is within a range from 0 millimeters to 5 millimeters. For example, d3 is equal to 0.1 millimeter, 0.8 millimeter, 1.9 millimeters, 3.8 millimeters, 4.1 millimeters, or 5 millimeters.

In an implementation, the distance d3 between the first ground part B and the end face of the first strip-shaped conductor 41 is within a range from 0 millimeters to 2.5 millimeters. For example, d3 is equal to 0.5 millimeter, 0.8 millimeter, 1.6 millimeters, 1.8 millimeters, 2.1 millimeters, or 2.5 millimeters. The distance d4 between the second ground part C and the end face of the first strip-shaped conductor 41 is within a range from 0 millimeters to 2.5 millimeters. For example, d4 is equal to 0.5 millimeter, 0.8 millimeter, 1.6 millimeters, 1.8 millimeters, 2.1 millimeters, or 2.5 millimeters.

In another implementation, the distance d3 between the first ground part B and the end face of the first strip-shaped conductor 41 ranges from 0 to 0.12λ. The distance d4 between the second ground part C and the end face of the first strip-shaped conductor 41 ranges from 0 to 0.12λ. λ is a wavelength of a signal radiated by the antenna. For example, the antenna may generate a resonance at a 3.0 GHz frequency, where a wavelength λ refers to a wavelength of a signal radiated by the antenna at the 3.0 GHz frequency. It should be understood that a wavelength of a radiated signal in the air may be calculated as follows: wavelength=speed of light/frequency, where the frequency is a frequency of the radiated signal. A wavelength of the radiated signal in a medium may be calculated as follows:

Wavelength=(speed of light/$\sqrt{\varepsilon}$)/frequency, where ε is a relative dielectric constant of the medium, and the frequency is a frequency of the radiated signal.

In another implementation, the distance d3 between the first ground part B and the end face of the first strip-shaped conductor 41 ranges from 0 to 0.06λ. The distance d4 between the second ground part C and the end face of the first strip-shaped conductor 41 ranges from 0 to 0.06λ.

The following describes a structure of a wire antenna with reference to related accompanying drawings.

Figure 9B:
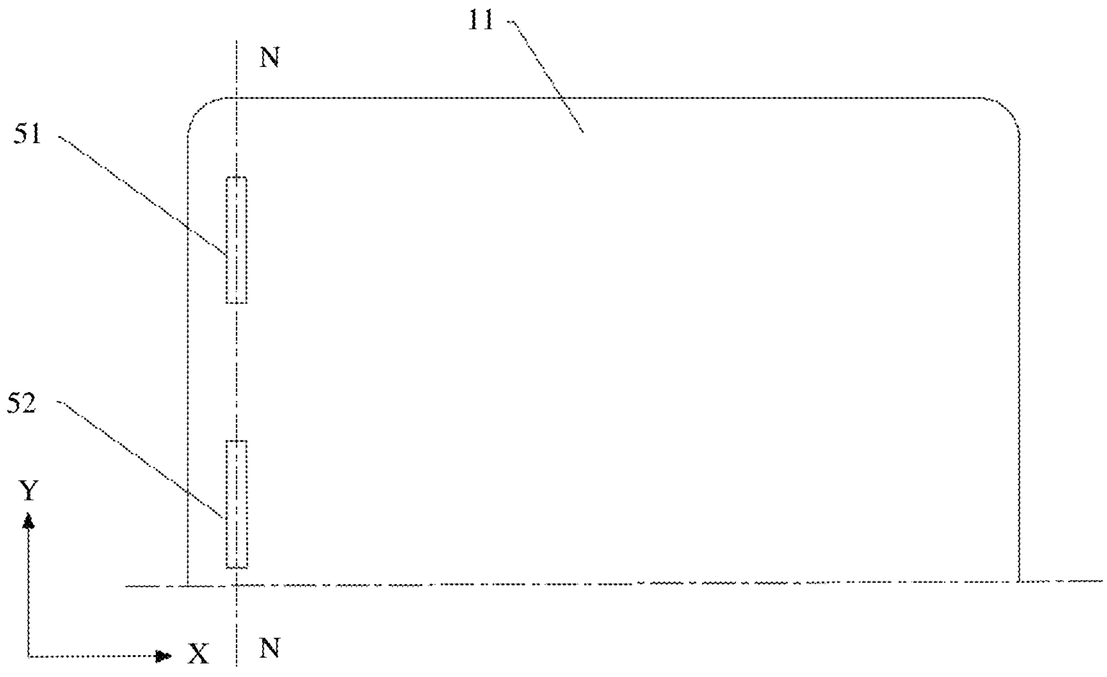
FIG. 9*b* is a schematic diagram of a structure of a rear cover, a second strip-shaped conductor, and a third strip-shaped conductor of the electronic device shown in FIG. 1.

With reference to FIG. 7, FIG. 9*b* is a schematic diagram of a structure of a rear cover, a second strip-shaped conductor, and a third strip-shaped conductor of the electronic device shown in FIG. 1. FIG. 9*b* also shows a location of the line N-N shown in FIG. 1, that is, the cross-sectional view in FIG. 7. The electronic device 100 further includes the second strip-shaped conductor 51 and a third strip-shaped conductor 52. A material of the second strip-shaped conductor 51 and the third strip-shaped conductor 52 may be but is not limited to copper, gold, silver, or graphene. The second strip-shaped conductor 51 and the third strip-shaped conductor 52 are radiators of the wire antenna, that is, both the second strip-shaped conductor 51 and the third strip-shaped conductor 52 can radiate an electromagnetic wave signal based on a radio frequency signal. In addition, the second strip-shaped conductor 51 and the third strip-shaped conductor 52 can also receive an electromagnetic wave signal, convert the electromagnetic wave signal into a radio frequency signal, and transmit the radio frequency signal to the radio frequency transceiver circuit 46.

In addition, the second strip-shaped conductor 51 and the third strip-shaped conductor 52 are fastened on the rear cover 11. Specifically, both the second strip-shaped conductor 51 and the third strip-shaped conductor 52 are fastened on a surface that is of the rear cover 11 and that faces the circuit board 30. In this case, both the second strip-shaped conductor 51 and the third strip-shaped conductor 52 are located on a side that is of the first strip-shaped conductor 41 and that is away from the circuit board 30, that is, in a Z-axis direction, there is a height difference between each of the second strip-shaped conductor 51 and the third strip-shaped conductor 52, and the first strip-shaped conductor 41. In addition, in the Z-axis direction, the second gap 31 is formed between the second strip-shaped conductor 51 and the circuit board 30. A third gap 32 is formed between the third strip-shaped conductor 52 and the circuit board 30. The second gap 31 and the third gap 32 form a clearance area of the wire antenna.

In another implementation, both the second strip-shaped conductor 51 and the third strip-shaped conductor 52 may be embedded into the rear cover 11, or both are fixedly connected to a surface that is of the rear cover 11 and that is away from the circuit board 30.

In another implementation, the first strip-shaped conductor 41 is fastened on a surface that is of the support 50 and that faces the circuit board 30. In this case, both the second strip-shaped conductor 51 and the third strip-shaped conductor 52 may alternatively be all fastened on a surface that is of the support 50 and that faces the rear cover 11, or both are embedded into the support 50, or both are fastened on a surface that is of the rear cover 11 and that faces the circuit board 30, or both are embedded into the rear cover 11, or both are fastened on a surface that is of the rear cover 11 and that is away from the circuit board 30.

In another implementation, when the first strip-shaped conductor 41 is fastened on the surface that is of the rear cover 11 and that faces the circuit board 30, both the second strip-shaped conductor 51 and the third strip-shaped conductor 52 may alternatively be embedded into the rear cover 11, or both are fastened on the surface that is of the rear cover 11 and that is away from the circuit board 30.

In another implementation, the second strip-shaped conductor 51 and the third strip-shaped conductor 52 may alternatively be disposed on a same layer as the first strip-shaped conductor 41. In this case, in the Z-axis direction, there is no height difference between each of the second strip-shaped conductor 51 and the third strip-shaped conductor 52, and the first strip-shaped conductor 41.

Refer to FIG. 8 again. The second strip-shaped conductor 51 includes a first end 511 and a second end 512 disposed away from the first end 511. The first end 511 of the second strip-shaped conductor 51 is electrically connected to the first ground part B of the first strip-shaped conductor 41. It may be understood that, that the first end 5*n* of the second strip-shaped conductor 51 is electrically connected to the first ground part B of the first strip-shaped conductor 41 includes two implementations. In a first implementation, the second strip-shaped conductor 51 and the first strip-shaped conductor 41 are disposed at intervals, that is, in a Z-axis direction, there is a height difference between the second strip-shaped conductor 51 and the first strip-shaped conductor 41. In this case, a radio frequency signal can be fed to the first end 511 of the second strip-shaped conductor 51 at the first ground part B of the first strip-shaped conductor 41 through magnetic field coupling. In a second implementation, the second strip-shaped conductor 51 and the first strip-shaped conductor 41 are disposed on a same layer, and the first end 511 of the second strip-shaped conductor 51 is connected to the first ground part B of the first strip-shaped conductor 41. In this case, a radio frequency signal can be fed to the first end 511 of the second strip-shaped conductor 51 through the first ground part B. In this implementation, the first implementation is used as an example for description. The second implementation is described in detail below with reference to related accompanying drawings. Details are not described herein again.

In addition, the second end 512 of the second strip-shaped conductor 51 is an open end, that is, the second end 512 of the second strip-shaped conductor 51 is not grounded.

In another implementation, the second end 512 of the second strip-shaped conductor 51 is electrically connected to the first ground part B of the first strip-shaped conductor 41. The first end 511 of the second strip-shaped conductor 51 is an open end, that is, the first end 511 of the second strip-shaped conductor 51 is not grounded.

Refer to FIG. 8 again. The third strip-shaped conductor 52 includes a first end 521 and a second end 522 away from the first end 521. The first end 521 of the third strip-shaped conductor 52 is electrically connected to the second ground part C of the first strip-shaped conductor 41. It may be understood that, that the first end 521 of the third strip-shaped conductor 52 is electrically connected to the second ground part C of the first strip-shaped conductor 41 includes two implementations. In a first implementation, the third strip-shaped conductor 52 and the first strip-shaped conductor 41 are disposed at intervals, that is, in the Z-axis direction, there is a height difference between the third strip-shaped conductor 52 and the first strip-shaped conductor 41. In this case, a radio frequency signal can be fed to the first end 521 of the third strip-shaped conductor 52 at the second ground part C of the first strip-shaped conductor 41 through magnetic field coupling. In a second implementation, the third strip-shaped conductor 52 and the first strip-shaped conductor 41 are disposed on a same layer, and the first end 521 of the third strip-shaped conductor 52 is connected to the second ground part C of the first strip-shaped conductor 41. In this case, a radio frequency signal can be fed to the first end 521 of the third strip-shaped conductor 52 through the second ground part C. In this implementation, the first implementation is used as an example for description. The second implementation is described in detail below with reference to related accompanying drawings. Details are not described herein again.

In addition, the second end 522 of the third strip-shaped conductor 52 is an open end, that is, the second end 522 of the third strip-shaped conductor 52 is not grounded.

In another implementation, the second end 522 of the third strip-shaped conductor 52 is electrically connected to the second ground part C of the first strip-shaped conductor 41. The first end 521 of the third strip-shaped conductor 52 is an open end, that is, the first end 521 of the third strip-shaped conductor 52 is not grounded.

In another implementation, a location at which the first end 511 of the second strip-shaped conductor 51 is electrically connected to the first strip-shaped conductor 41 may be exchanged with a location at which the first end 521 of the third strip-shaped conductor 52 is electrically connected to the first strip-shaped conductor 41. Specifically, the first end 511 of the second strip-shaped conductor 51 is electrically connected to the second ground part C of the first strip-shaped conductor 41. The first end 521 of the third strip-shaped conductor 52 is electrically connected to the first ground part B of the first strip-shaped conductor 41.

Refer to FIG. 8 again. A length of the second strip-shaped conductor 51 is a first length L1. A length of the third strip-shaped conductor 52 is a second length L2. The first length L1 is equal to the second length L2. It may be understood that, when there is a tolerance and an error, within an allowable range, the first length L1 may be slightly greater than the second length L2, or slightly less than the second length L2. In other words, the first length L1 is approximately equal to the second length L2.

In another implementation, the second length L2 may alternatively be greater than or less than the first length L1. Specifically, the following describes in detail with reference to related accompanying drawings.

Figure 10:
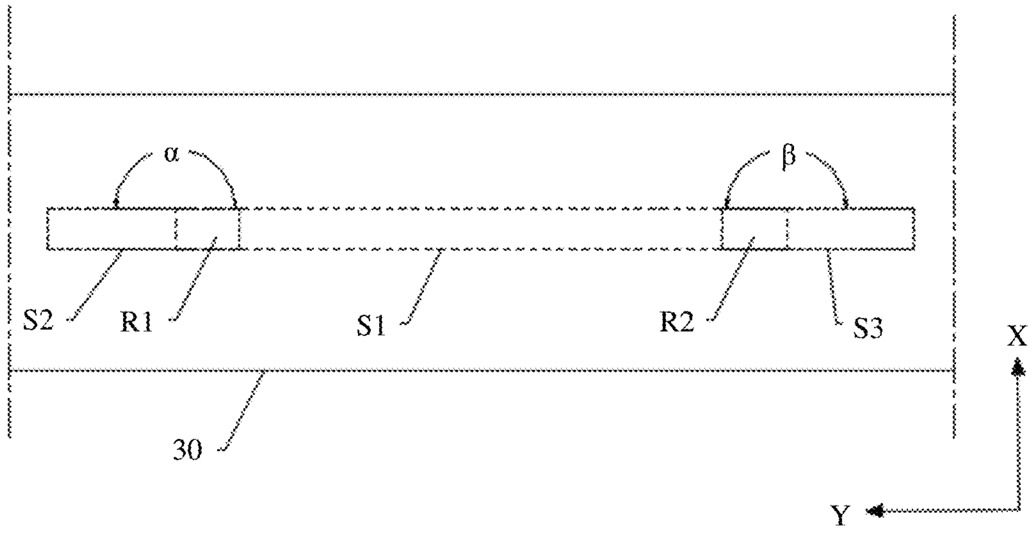
FIG. 10 is a schematic diagram of projections of an implementation of the first strip-shaped conductor, the second strip-shaped conductor, and the third strip-shaped conductor shown in FIG. 7 on a circuit board.

With reference to FIG. 7, FIG. 10 is a schematic diagram of projections of an implementation of the first strip-shaped conductor, the second strip-shaped conductor, and the third strip-shaped conductor shown in FIG. 7 on a circuit board. A projection of the first strip-shaped conductor 41 on a board surface of the circuit board 30 is a first projection S1. A projection of the second strip-shaped conductor 51 on a board surface of the circuit board 30 is a second projection S2. An included angle between the second projection S2 and the first projection S1 is α. In this implementation, a is equal to 180°. In another implementation, a may alternatively be equal to 40°, 90°, 100°, 125°, 152°, 200°, 270°, or 300°.

In an implementation, a is within a range from 90° to 270°. In this case, when receiving and sending electromagnetic wave signals, the first strip-shaped conductor 41 and the second strip-shaped conductor 51 do not easily interfere with each other and affect each other.

In addition, a projection of the third strip-shaped conductor 52 on a board surface of the circuit board 30 is a third projection S3. An included angle between the third projection S3 and the first projection S1 is β. In this implementation, β is equal to 180°. In another implementation, β may alternatively be equal to 40°, 90°, 100°, 125°, 150°, 200°, 270°, or 300°.

In an implementation, β is within a range from 90° to 270°. In this case, when receiving and sending electromagnetic wave signals, the first strip-shaped conductor 41 and the third strip-shaped conductor 52 do not easily interfere with each other and affect each other.

Therefore, in this implementation, the second strip-shaped conductor 51 and the third strip-shaped conductor 52 are symmetrical with respect to the feeding part A.

Refer to FIG. 10 again. An area of an overlapping region R1 between the first projection S1 and the second projection S2 is within a range from 0 square millimeters to 16 square millimeters. For example, the area of the overlapping region R1 is 0 millimeters, 3 millimeters, 7 millimeters, 10 millimeters, 12 millimeters, or the like. In this implementation, the area of the overlapping region R1 between the first projection S1 and the second projection S2 is 8 square millimeters. It may be understood that FIG. 10 merely schematically shows that the overlapping region R1 between the first projection S1 and the second projection S2 is in a rectangle shape. However, when shapes of the first strip-shaped conductor 41 and the second strip-shaped conductor 51 change, the overlapping region R1 between the first projection S1 and the second projection S2 may alternatively be in another shape, for example, an irregular pattern or a trapezoid. In addition, the first projection S1 and the second projection S2 in an X-axis direction are not limited to overlapping shown in FIG. 10, and the first projection S1 and the second projection S2 may alternatively be partially staggered in the X-axis direction. In addition, the first projection S1 and the second projection S2 in a Y-axis direction are not limited to overlapping shown in FIG. 10, and the first projection S1 and the second projection S2 may alternatively be partially staggered in the Y-axis direction.

In another implementation, the area of the overlapping region R1 between the first projection S1 and the second projection S2 may not be within a range from 0 square millimeters to 16 square millimeters.

In addition, an area of an overlapping region R2 between the first projection S1 and the third projection S3 is within a range from 0 square millimeters to 16 square millimeters. For example, the area of the overlapping region R2 is 0 millimeters, 3 millimeters, 7 millimeters, 10 millimeters, 16 millimeters, or the like. In this implementation, the area of the overlapping region R2 between the first projection S1 and the third projection S3 is 8 square millimeters. It may be understood that the overlapping region between the first projection S1 and the third projection S3 is in a rectangle shape. However, when shapes of the first strip-shaped conductor 41 and the third strip-shaped conductor 52 change, the overlapping region between the first projection S1 and the third projection S3 may alternatively in another shape, for example, an irregular pattern or a trapezoid. In addition, the first projection S1 and the third projection S3 in the X-axis direction are not limited to overlapping shown in FIG. 10, and the first projection S1 and the third projection S3 may alternatively be partially staggered in the X-axis direction. In addition, the first projection S1 and the third projection S3 in the Y-axis direction are not limited to overlapping shown in FIG. 10, and the first projection S1 and the third projection S3 may alternatively be partially staggered in the Y-axis direction.

In another implementation, the area of the overlapping region R2 between the first projection S1 and the third projection S3 may not be within a range from 0 square millimeters to 16 square millimeters.

The following describes simulation of the composite antenna provided in the first implementation with reference to the accompanying drawings.

Figure 11A:
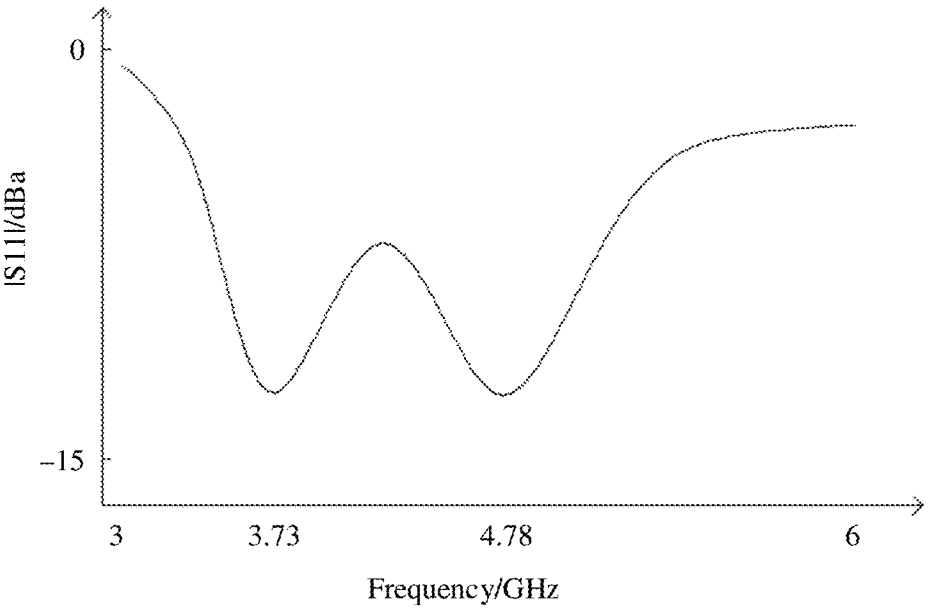
FIG. 11*a* is a diagram of a relationship between a reflection coefficient and a frequency of the composite antenna shown in FIG. 8 in a frequency band of 3 GHz to 6 GHz.

FIG. 11*a* is a diagram of a relationship between a frequency and a reflection coefficient (that is, a return loss) of the composite antenna shown in FIG. 8 in a frequency band of 3 GHz to 6 GHz. The composite antenna may generate two resonances at 3 GHz to 6 GHz: resonance "1" (3.73 GHz) and resonance "2" (4.78 GHz). Resonance "1" is generated by a slot antenna differential mode of the composite antenna. Resonance "2" is generated by a wire antenna common mode of the composite antenna. It may be understood that, in addition to a 3.73 GHz to 4.78 GHz frequency band shown in FIG. 11*a*, the composite antenna in this implementation may further generate a resonance in another frequency band (for example, 0 GHz to 3 GHz, 6 GHz to 8 GHz, or 8 GHz to 11 GHz). Specifically, another resonance may be set by adjusting a size of the first strip-shaped conductor 41, a size of the second strip-shaped conductor 51, a size of the third strip-shaped conductor 52, or adjusting sizes of the first strip-shaped conductor 41, the second strip-shaped conductor 51, and the third strip-shaped conductor 52 at the same time.

Figure 11B:
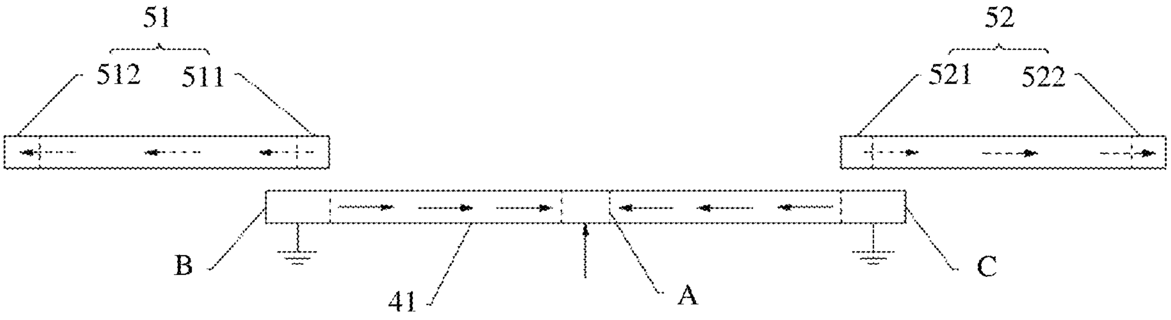
FIG. 11*b* is a schematic diagram of a flow direction of a current of the composite antenna shown in FIG. 8 under resonance "1"
Figure 11C:
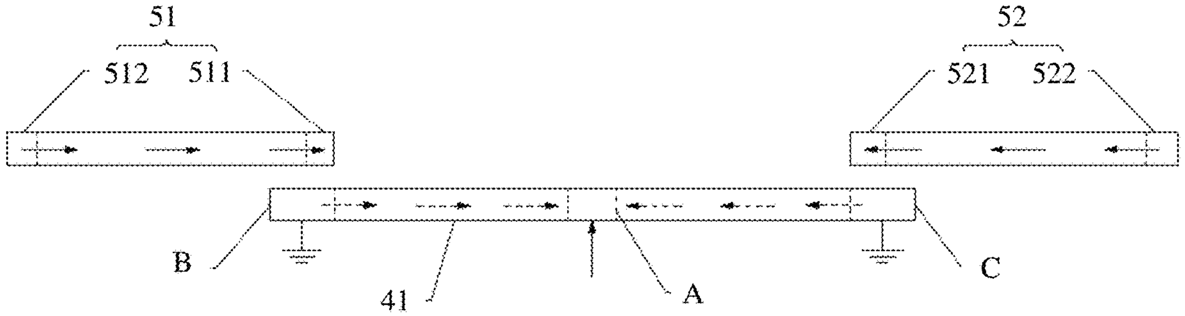
FIG. 11*c* is a schematic diagram of a flow direction of a current of the composite antenna shown in FIG. 8 under resonance "2"

With reference to FIG. 11*b* and FIG. 11*c*, the following specifically describe currents under the two resonances of the composite antenna: current distributions under resonance "1" (3.73 GHz) and resonance "2" (4.78 GHz). FIG. 11*b* is a schematic diagram of a flow direction of a current of the composite antenna shown in FIG. 8 under resonance "1". FIG. 11*c* is a schematic diagram of a flow direction of a current of the composite antenna shown in FIG. 8 under resonance "2".

Refer to FIG. 11*b*. Current distribution under resonance "1" (3.73 GHz) includes a first current flowing from the first ground part B to the feeding part A and a second current flowing from the second ground part C to the feeding part A on the first strip-shaped conductor 41, a third current flowing from the first end 511 of the second strip-shaped conductor 51 to the second end 512 of the second strip-shaped conductor 51 on the second strip-shaped conductor 51, and a fourth current flowing from the first end 521 of the third strip-shaped conductor 52 to the second end 522 of the third strip-shaped conductor 52 on the third strip-shaped conductor 52. Current intensity of the first strip-shaped conductor 41 is greater than current intensity of the second strip-shaped conductor 51 and the third strip-shaped conductor 52. In this way, the current under resonance "1" (3.73 GHz) is mainly a current on the first strip-shaped conductor 41. In addition, the current under resonance "1" (3.73 GHz) is a current in the slot antenna differential mode.

Refer to FIG. 11*c*. Current distribution under resonance "2" (4.78 GHz) includes a first current flowing from the first ground part B to the feeding part A and a second current flowing from the second ground part C to the feeding part A on the first strip-shaped conductor 41, a third current flowing from the second end 512 of the second strip-shaped conductor 51 to the first end 511 of the second strip-shaped conductor 51 on the second strip-shaped conductor 51, and a fourth current flowing from the second end 522 of the third strip-shaped conductor 52 to the first end 521 of the third strip-shaped conductor 52 on the third strip-shaped conductor 52. Current intensity of the first strip-shaped conductor 41 is less than current intensity of the second strip-shaped conductor 51 and the third strip-shaped conductor 52. In this way, the current under resonance "2" (4.78 GHz) is mainly a current on the second strip-shaped conductor 51 and the third strip-shaped conductor 52. The current under resonance "2" (4.78 GHz) is a current in the wire antenna common mode.

Figure 11D:
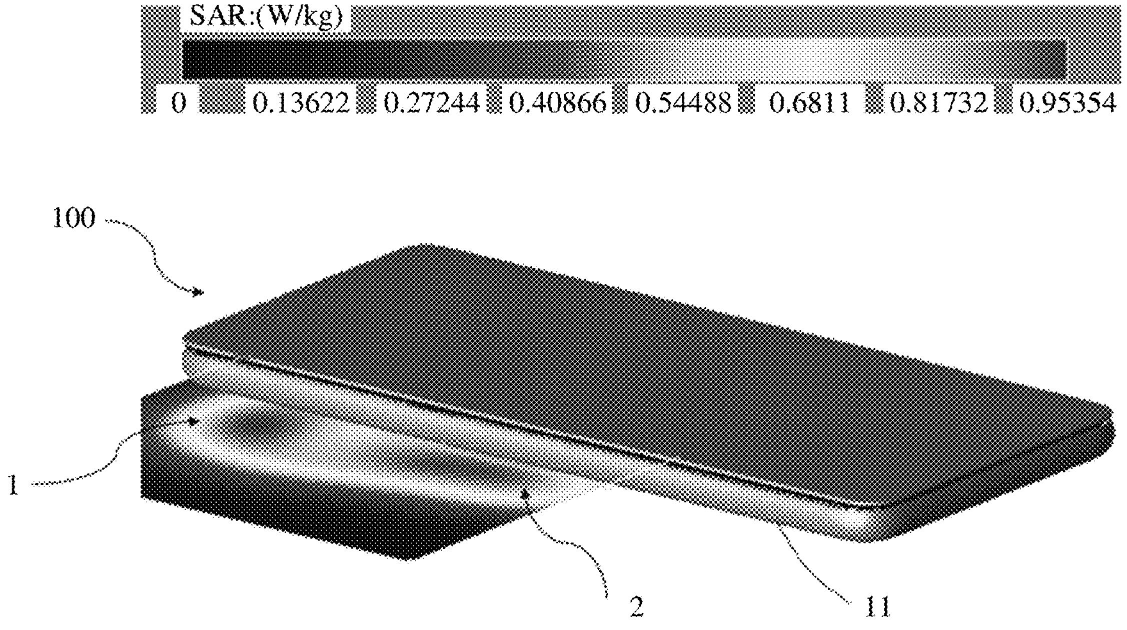
FIG. 11*d* is a schematic diagram of SAR hotspot distribution of the composite antenna shown in FIG. 8 under resonance "1"

FIG. 11*d* is a schematic diagram of SAR hotspot distribution of the composite antenna shown in FIG. 8 under resonance "1. FIG. 11*d* shows an SAR value measured at a distance of 5 mm from a human body tissue to the rear cover 11. For resonance "1" (3.73 GHz), two SAR hotspots appear at 5 mm away from the rear cover 11 (FIG. 11*d* simply shows the two SAR hotspots by using an arrow 1 and an arrow 2). It may be understood that the SAR hotspot means that a ratio of an average value of SAR values in a region to an average value of SAR values around the region is greater than or equal to 1.2. In this case, the region is referred to as an SAR hotspot. In other words, in an SAR value distribution region, a maximum SAR value appears. In this case, an SAR value region distributed around the maximum SAR value is called the SAR hotspot. In this case, in FIG. 11*d*, the SAR hotspot is relatively prominent compared with a surrounding SAR distribution region.

Under resonance "1" of the composite antenna, directions of the first current and the second current on the first strip-shaped conductor 41 are opposite. In addition, because the first strip-shaped conductor 41 is in a symmetric pattern shape, current intensity of the first current is the same as current intensity of the second current. It may be understood that, better symmetry of the first strip-shaped conductor indicates that the current intensity of the first current is closer to the current intensity of the second current. In this way, phases of magnetic fields at the feeding part A are opposite, and amplitudes of the magnetic fields are approximately offset. In this way, the magnetic fields are mainly distributed on two sides of the feeding part A, and two SAR hotspots are formed on the two sides of the feeding part A. In this case, energy of radiated electromagnetic waves is relatively dispersed, and an SAR value under resonance "1" (3.73 GHz) is relatively low. It may be understood that, when the current intensity of the first current is closer to the current intensity of the second current, the SAR value under resonance "1" (3.73 GHz) is lower.

Figure 11E:
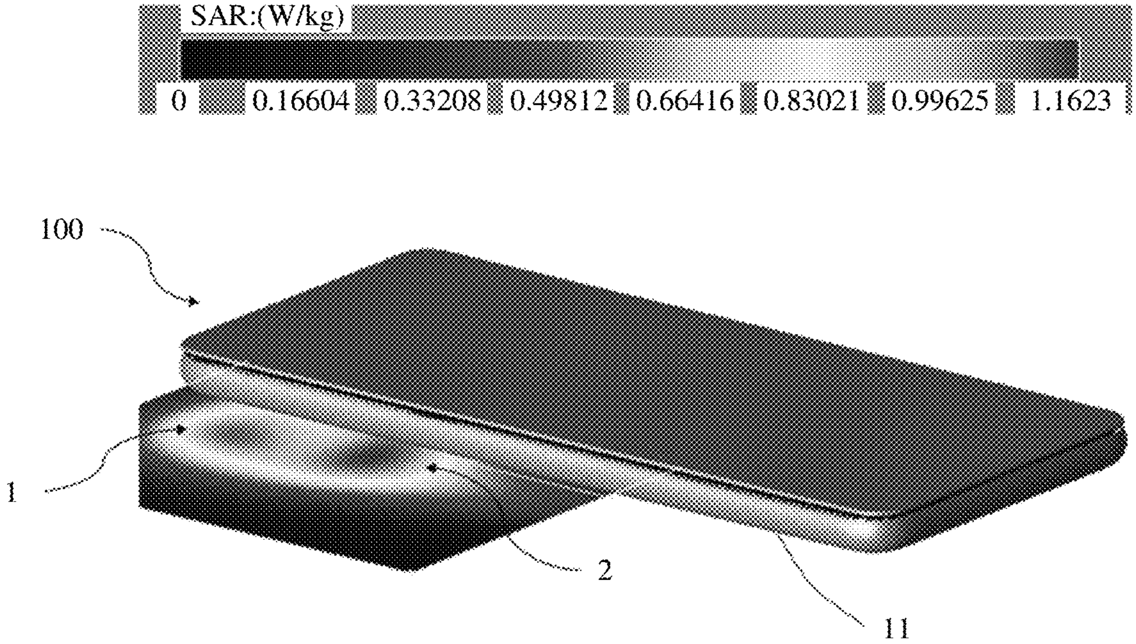
FIG. 11*e* is a schematic diagram of SAR hotspot distribution of the composite antenna shown in FIG. 8 under resonance "2"

FIG. 11*e* is a schematic diagram of SAR hotspot distribution of the composite antenna shown in FIG. 8 under resonance "2". FIG. 11*e* shows an SAR value measured at a distance of 5 mm from a human body tissue to the rear cover 11. For resonance "2" (4.78 GHz), two SAR hotspots also appear at 5 mm away from the rear cover 11 (FIG. 11*e* simply shows the two SAR hotspots by using an arrow 1 and an arrow 2).

When the composite antenna is under resonance "2" (4.78 GHz), a direction of a third current on the second strip-shaped conductor 51 is opposite to a direction of a fourth current on the third strip-shaped conductor 52. In addition, because the second strip-shaped conductor 51 and the third strip-shaped conductor 52 are symmetrical with respect to the feeding part A, current intensity of the third current is the same as current intensity of the fourth current. It may be understood that, better symmetry between the second strip-shaped conductor 51 and the third strip-shaped conductor 52 indicates that the current intensity of the third current is closer to the current intensity of the fourth current. In this case, phases of magnetic fields at the feeding part A are opposite, and amplitudes of the magnetic fields are approximately offset. In this way, the magnetic fields are mainly distributed on two sides of the feeding part A, and two SAR hotspots are formed on the two sides of the feeding part A. Energy of radiated electromagnetic waves is relatively dispersed, and an SAR value under resonance "2" (4.78 GHz) is relatively low. It may be understood that a closer current intensity between the third current and the fourth current indicates a lower SAR value under resonance "2" (4.78 GHz).

In this implementation, because the area of the overlapping region R1 between the first projection S1 and the second projection S2 is 8 square millimeters, feeding stability of the second strip-shaped conductor 51 through the first strip-shaped conductor 41 is better. In this case, the third current on the second strip-shaped conductor 51 can well flow into the circuit board 30 through the first ground part B. In addition, because the area of the overlapping region R2 between the first projection S1 and the third projection S3 is 8 square millimeters, feeding stability of the third strip-shaped conductor 52 through the first strip-shaped conductor 41 is better. The fourth current on the third strip-shaped conductor 52 can well flow into the circuit board 30 through the second ground part C. In this way, current intensity on the second strip-shaped conductor 51 and the third strip-shaped conductor 52 is greatly reduced. In this case, strength of magnetic fields generated by the second strip-shaped conductor 51 and the third strip-shaped conductor 52 is also relatively small, and an SAR value under resonance "2" (4.78 GHz) is relatively low.

In addition, Table 1a shows SAR values of the electronic device 100 using the composite antenna provided in the first implementation.

TABLE 1a

| Mode | Resonance "1" (3.73 GHz) | Resonance "2" (4.78 GHz) |
|---|---|---|
| SAR value at 5 mm away from the rear cover | 0.95 | 1.16 |
| SAR value at 5 mm away from the rear cover (normalized at −5 dB) | 0.37 | 0.4 |

Table 1a shows SAR values based on the (log, average) standard. It can be seen that, when output power is 24 dBm, the SAR value of the electronic device 100 using the composite antenna provided in the first implementation at 5 mm away from the rear cover, regardless of resonance "1" or resonance "2", is relatively low on the whole. Considering that antenna efficiency under resonance "i" is inconsistent with that under resonance "2", resonance "1" and resonance "2" are normalized, so that the antenna efficiency under resonance "i" is consistent with that under resonance "2". In this case, when efficiency is normalized to −5 dB, advantages of the composite antenna provided in the first implementation in terms of a low SAR value are more obvious. Regardless of resonance "1" or resonance "2", the SAR value at 5 mm away from the rear cover is less than 0.5.

In this implementation, according to the antenna design solution provided in the first implementation, a composite antenna of a slot antenna and a wire antenna is designed, so that under feeding, the composite antenna separately excites two resonance modes (a slot antenna differential mode and a wire antenna common mode). In addition to implementing wide-band coverage, two SAR hotspots can appear in both the modes, and SAR values of the two modes are relatively low.

Figure 11F:
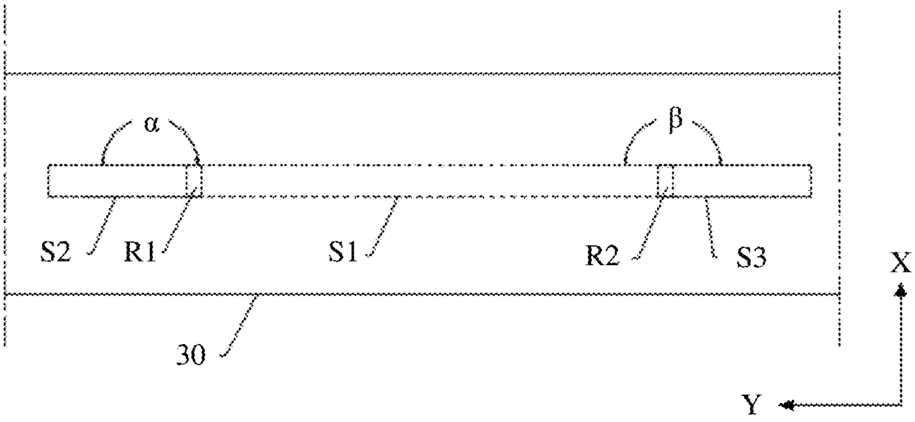
FIG. 11*f* is a schematic diagram of projections of another implementation of the first strip-shaped conductor, the second strip-shaped conductor, and the third strip-shaped conductor shown in FIG. 7 on a circuit board.

In an extended implementation 1, technical content that is the same as that in the first implementation is not described again. FIG. 11*f* is a schematic diagram of projections of another implementation of the first strip-shaped conductor, the second strip-shaped conductor, and the third strip-shaped conductor shown in FIG. 7 on a circuit board. The area of the overlapping region R1 between the first projection S1 and the second projection S2 is 4 square millimeters. The area of the overlapping region R2 between the first projection S1 and the third projection S3 is 4 square millimeters.

The following describes simulation of the composite antenna provided in the extended implementation 1 with reference to the accompanying drawings.

Figure 11G:
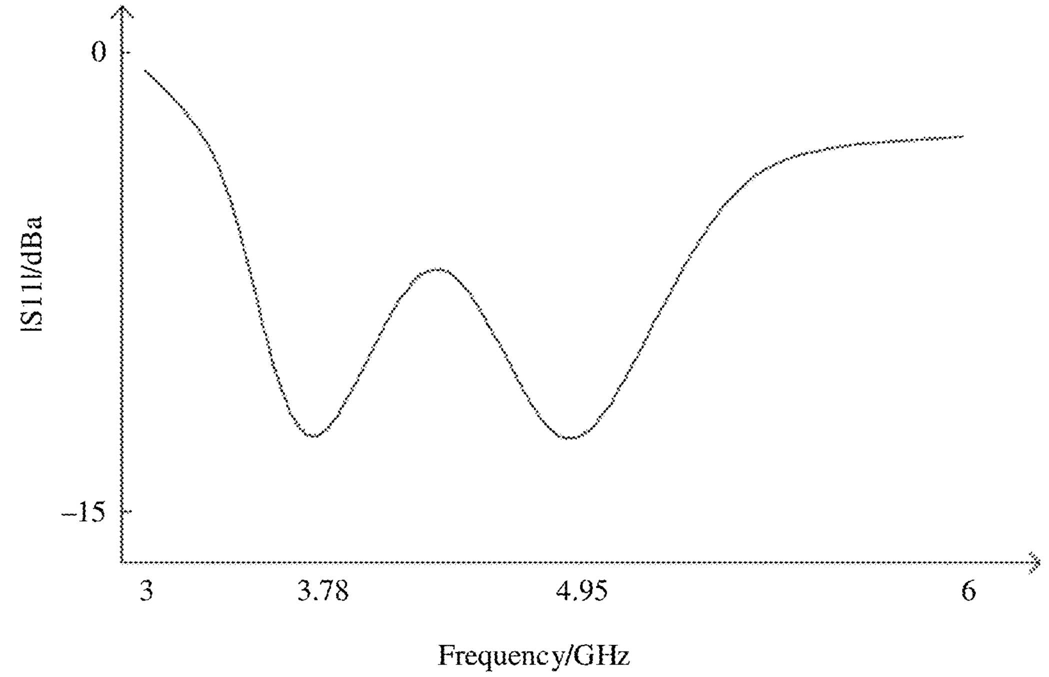
FIG. 11*g* is a diagram of a relationship between a reflection coefficient and a frequency of the composite antenna shown in FIG. 11*f* in a frequency band of 3 GHz to 6 GHz.

FIG. 11*g* is a diagram of a relationship between a reflection coefficient and a frequency of the composite antenna shown in FIG. 11*f* in a frequency band of 3 GHz to 6 GHz. The composite antenna may generate two resonances at 3 GHz to 6 GHz: resonance "1" (3.78 GHz) and resonance "2" (4.95 GHz). Resonance "1" is generated by a slot antenna differential mode of the composite antenna. Resonance "2" is generated by a wire antenna common mode of the composite antenna.

It may be understood that, current distribution of the composite antenna under resonance "1" (3.78 GHz) and current distribution of the composite antenna under resonance "2" (4.95 GHz) in this implementation are the same as current distribution of the composite antenna under resonance "1" (3.73 GHz) and current distribution of the composite antenna under resonance "2" (4.78 GHz) in the first implementation. Details are not described herein again.

In addition, for resonance “1” (3.78 GHz), two SAR hotspots can also appear at 5 mm away from the rear cover 11 of the composite antenna. For resonance “2” (4.95 GHz), two SAR hotspots also appear at 5 mm away from the rear cover 11.

In addition, Table 1b shows SAR values of the electronic device 100 using the composite antenna provided in the extended implementation 1.

TABLE 1b

| Mode | Resonance "1" (3.78 GHz) | Resonance "2" (4.95 GHz) |
| --- | --- | --- |
| SAR value at 5 mm away from the rear cover | 0.92 | 1.12 |
| SAR value at 5 mm away from the rear cover (normalized at −5 dB) | 0.37 | 0.46 |

Table 1b shows SAR values based on the (log, average) standard. It can be seen that, when output power is 24 dBm, the SAR value of the electronic device 100 using the composite antenna provided in the extended implementation 1 at 5 mm away from the rear cover, regardless of resonance “i” or resonance “2”, is relatively low on the whole. When efficiency is normalized to −5 dB, advantages of the composite antenna provided in the extended implementation 1 in terms of a low SAR value are more obvious. Regardless of resonance “1” or resonance “2”, the SAR value at 5 mm away from the rear cover is less than 0.5.

Figure 11H:
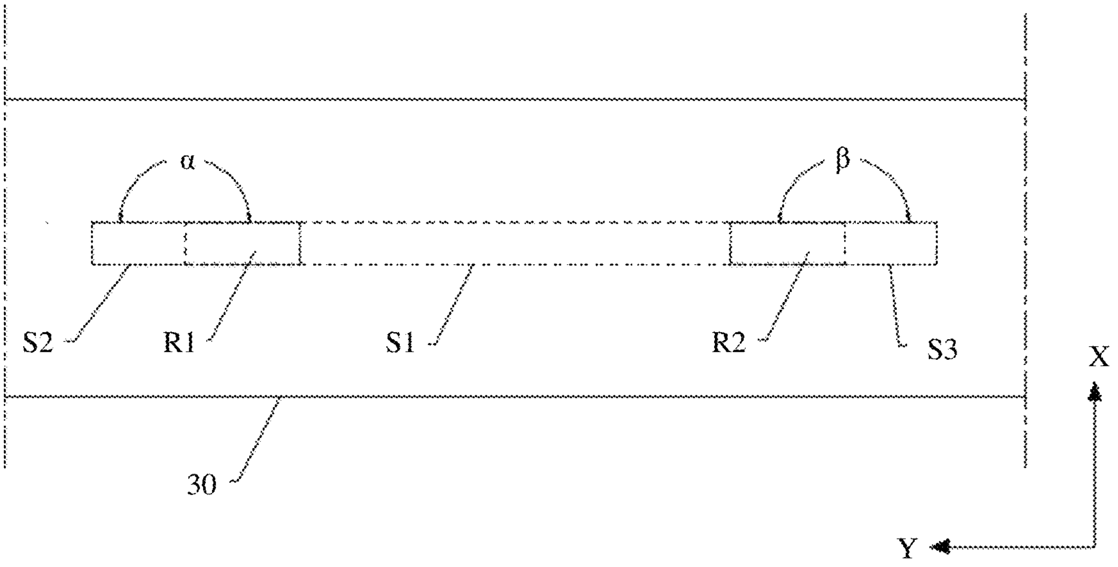
FIG. 11*h* is a schematic diagram of projections of still another implementation of the first strip-shaped conductor, the second strip-shaped conductor, and the third strip-shaped conductor shown in FIG. 7 on a circuit board.

In an extended implementation 2, technical content that is the same as that in the first implementation is not described again. FIG. 11*h* is a schematic diagram of projections of still another implementation of the first strip-shaped conductor, the second strip-shaped conductor, and the third strip-shaped conductor shown in FIG. 7 on a circuit board. The area of the overlapping region R1 between the first projection S1 and the second projection S2 is 16 square millimeters. The area of the overlapping region R2 between the first projection S1 and the third projection S3 is 16 square millimeters.

The following describes simulation of the composite antenna provided in the extended implementation 2 with reference to the accompanying drawings.

Figure 11I:
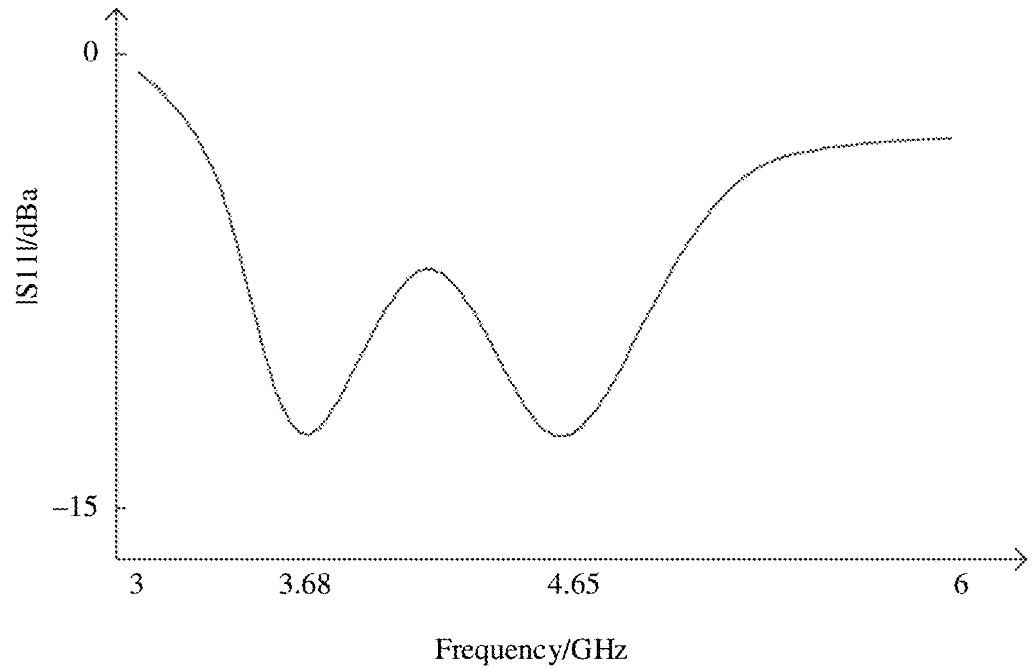
FIG. 11*i* is a diagram of a relationship between a reflection coefficient and a frequency of the composite antenna shown in FIG. 11*h* in a frequency band of 3 GHz to 6 GHz.

FIG. 11*i* is a diagram of a relationship between a reflection coefficient and a frequency of the composite antenna shown in FIG. 11*h* in a frequency band of 3 GHz to 6 GHz. The composite antenna may generate two resonances at 3 GHz to 6 GHz: resonance “1” (3.68 GHz) and resonance “2” (4.65 GHz). Resonance “1” is generated by a slot antenna differential mode of the composite antenna. Resonance “2” is generated by a wire antenna common mode of the composite antenna.

It may be understood that, current distribution of the composite antenna under resonance “1” (3.68 GHz) and current distribution of the composite antenna under resonance “2” (4.65 GHz) in this implementation are the same as current distribution of the composite antenna under resonance “1” (3.73 GHz) and current distribution of the composite antenna under resonance “2” (4.78 GHz) in the first implementation. Details are not described herein again.

In addition, for resonance “1” (3.68 GHz), two SAR hotspots can also appear at 5 mm away from the rear cover 11 of the composite antenna. For resonance “2” (4.65 GHz), two SAR hotspots also appear at 5 mm away from the rear cover 11.

In addition, Table 1c shows SAR values of the electronic device 100 using the composite antenna provided in the extended implementation 2.

TABLE 1c

| Mode | Resonance "1" (3.68 GHz) | Resonance "2" (4.65 GHz) |
| --- | --- | --- |
| SAR value at 5 mm away from the rear cover | 0.97 | 1.19 |
| SAR value at 5 mm away from the rear cover (normalized at −5 dB) | 0.37 | 0.39 |

Table 1c shows SAR values based on the (log, average) standard. It can be seen that, when output power is 24 dBm, the SAR value of the electronic device 100 using the composite antenna provided in extended implementation 2 at 5 mm away from the rear cover, regardless of resonance “1” or resonance “2”, is relatively low on the whole. When efficiency is normalized to −5 dB, advantages of the composite antenna provided in the extended implementation in terms of a low SAR value are more obvious. Regardless of resonance “1” or resonance “2”, the SAR value at 5 mm away from the rear cover is less than 0.5.

It may be understood that, according to the first implementation, the extended implementation 1, and the extended implementation 2, the area of the overlapping region R1 between the first projection S1 and the second projection S2 and the area of the overlapping region R2 between the first projection S1 and the third projection S3 have little impact on the SAR value generated by resonance “1”.

In addition, the area of the overlapping region R1 between the first projection S1 and the second projection S2 and the area of the overlapping region R2 between the first projection S1 and the third projection S3 have great impact on the SAR value generated by resonance “2”. When the area of the overlapping region R1 between the first projection S1 and the second projection S2 is within a range from 0 square millimeters to 16 square millimeters, and the area of the overlapping region R2 between the first projection S1 and the third projection S3 is within a range from 0 square millimeters to 16 square millimeters, the SAR value generated by resonance “2” is relatively small.

Figure 12:
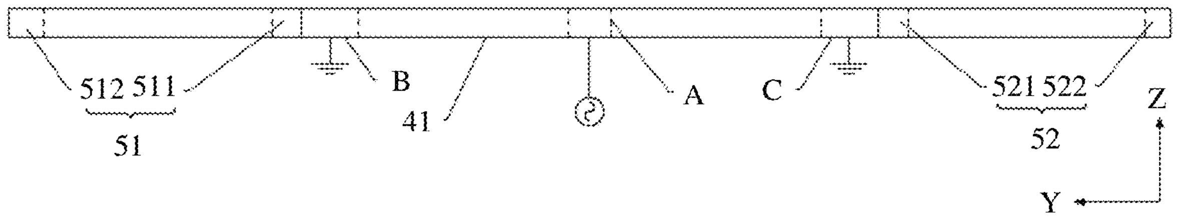
FIG. 12 is a schematic diagram of a partial structure of still another implementation of a composite antenna of the electronic device shown in FIG. 1.

In a second implementation, technical content that is the same as that in the first implementation is not described again. FIG. 12 is a schematic diagram of a partial structure of still another implementation of a composite antenna of the electronic device shown in FIG. 1. The first end 511 of the second strip-shaped conductor 51 is connected to the first ground part B of the first strip-shaped conductor 41. In this case, the first end 511 of the second strip-shaped conductor 51 is grounded. A radio frequency signal can be fed to the second strip-shaped conductor 51 through the first ground part B of the first strip-shaped conductor 41.

In addition, the second end 512 of the second strip-shaped conductor 51 is an open end, that is, the second end 512 of the second strip-shaped conductor 51 is not grounded.

The first end 521 of the third strip-shaped conductor 52 is connected to the second ground part C of the first strip-shaped conductor 41. In this case, the first end 521 of the third strip-shaped conductor 52 is grounded. A radio frequency signal can be fed to the third strip-shaped conductor 52 through the second ground part C of the first strip-shaped conductor 41. In addition, the second end 522 of the third strip-shaped conductor 52 is an open end, that is, the second end 522 of the third strip-shaped conductor 52 is not grounded.

Figure 13:
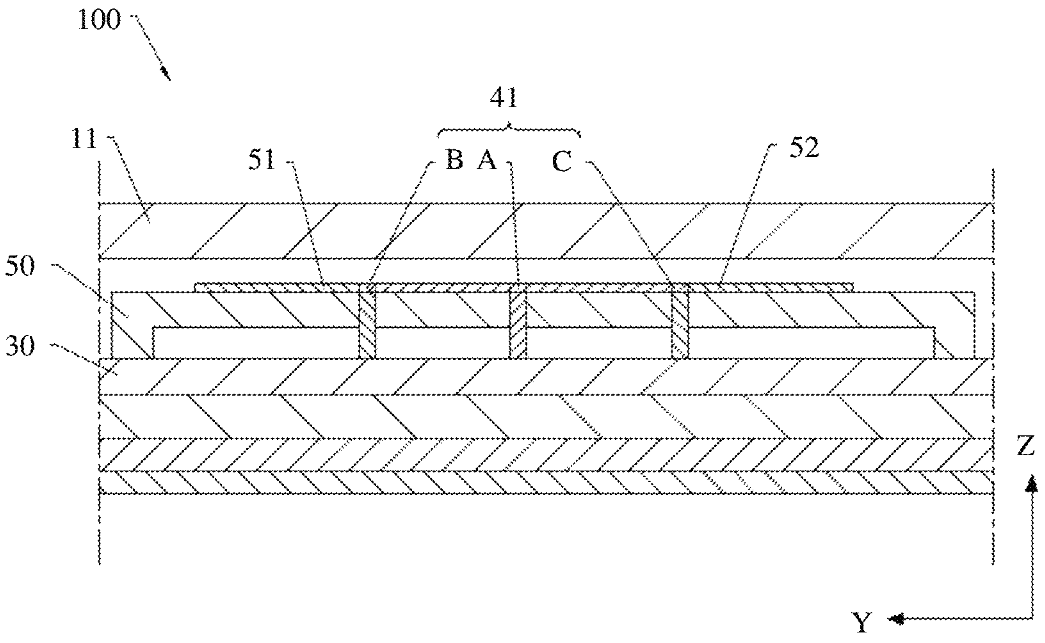
FIG. 13 is a partial schematic sectional view of another implementation of the electronic device shown in FIG. 1 at line N-N.

With reference to FIG. 12, FIG. 13 is a schematic sectional view of another implementation of the electronic device shown in FIG. 1 at line N-N. The first strip-shaped conductor 41, the second strip-shaped conductor 51, and the third strip-shaped conductor 52 are disposed on a same layer. FIG. 13 shows that the first strip-shaped conductor 41, the second strip-shaped conductor 51, and the third strip-shaped conductor 52 are all fastened on a surface that is of the support 50 and that faces the rear cover 11. In another implementation, the first strip-shaped conductor 41, the second strip-shaped conductor 51, and the third strip-shaped conductor 52 may alternatively be all fastened on a surface that is of the support 50 and that faces the circuit board 30, or all embedded into the support 50, or fastened on a surface that is of the rear cover 11 and that faces the circuit board 30, or embedded into the rear cover 11, or fastened on a surface that is of the rear cover 11 and that is away from the circuit board 30.

The following describes simulation of the composite antenna provided in the second implementation with reference to the accompanying drawings.

Figure 14A:
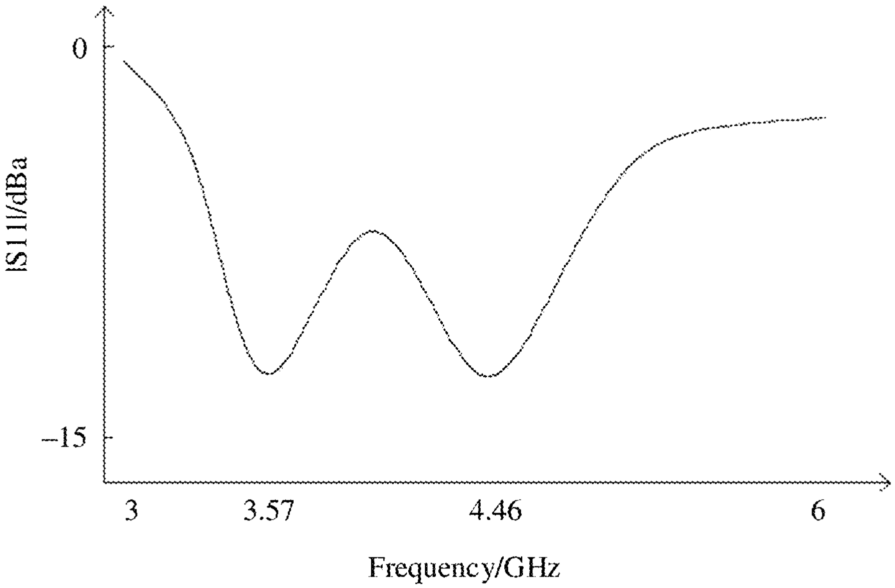
FIG. 14*a* is a diagram of a relationship between a reflection coefficient and a frequency of the composite antenna shown in FIG. 12 in a frequency band of 3 GHz to 6 GHz.

FIG. 14*a* is a diagram of a relationship between a reflection coefficient and a frequency of the composite antenna shown in FIG. 12 in a frequency band of 3 GHz to 6 GHz. The composite antenna may generate two resonances at 3 GHz to 6 GHz: resonance "1" (3.57 GHz) and resonance "2" (4.46 GHz). Resonance "1" is generated by a slot antenna differential mode of the composite antenna. Resonance "2" is generated by a wire antenna common mode of the composite antenna. It may be understood that, in addition to a 3.57 GHz to 4.46 GHz frequency band shown in FIG. 14*a*, the composite antenna in this implementation may further generate a resonance in another frequency band (for example, 0 GHz to 3 GHz, 6 GHz to 8 GHz, or 8 GHz to 11 GHz). Specifically, another resonance may be set by adjusting a size of the first strip-shaped conductor 41, a size of the second strip-shaped conductor 51, a size of the third strip-shaped conductor 52, or adjusting sizes of the first strip-shaped conductor 41, the second strip-shaped conductor 51, and the third strip-shaped conductor 52 at the same time.

Figure 14B:
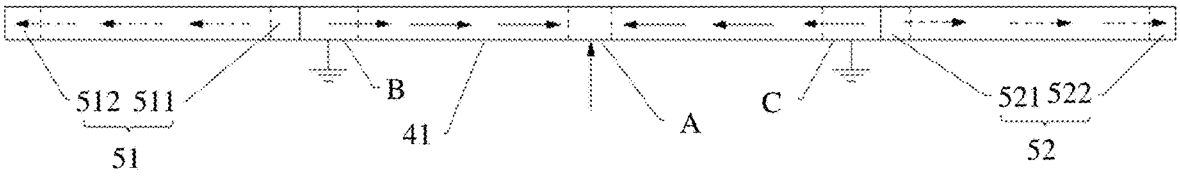
FIG. 14*b* is a schematic diagram of a flow direction of a current of the composite antenna shown in FIG. 12 under resonance "1"
Figure 14C:
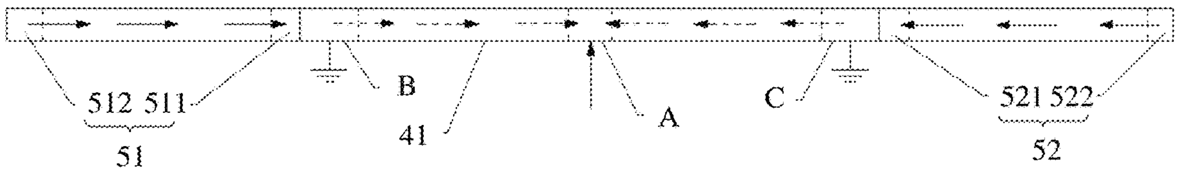
FIG. 14*c* is a schematic diagram of a flow direction of a current of the antenna shown in FIG. 12 under resonance "2"

With reference to FIG. 14*b* and FIG. 14*c*, the following specifically describes currents under two resonances of the composite antenna: current distributions under resonance "1" (3.57 GHz) and resonance "2" (4.46 GHz). FIG. 14*b* is a schematic diagram of a flow direction of a current of the composite antenna shown in FIG. 12 under resonance "1". FIG. 14*c* is a schematic diagram of a flow direction of a current of the antenna shown in FIG. 12 under resonance "2".

Refer to FIG. 14*b*. Current distribution under resonance "1" (3.57 GHz) includes a first current flowing from the first ground part B to the feeding part A and a second current flowing from the second ground part C to the feeding part A on the first strip-shaped conductor 41, a third current flowing from the first end 511 of the second strip-shaped conductor 51 to the second end 512 of the second strip-shaped conductor 51 on the second strip-shaped conductor 51, and a fourth current flowing from the first end 521 of the third strip-shaped conductor 52 to the second end 522 of the third strip-shaped conductor 52 on the third strip-shaped conductor 52. Current intensity of the first strip-shaped conductor 41 is greater than current intensity of the second strip-shaped conductor 51 and the third strip-shaped conductor 52. In this way, the current under resonance "1" (3.57 GHz) is mainly a current on the first strip-shaped conductor 41. In addition, the current under resonance "1" (3.57 GHz) is a current in the slot antenna differential mode.

Refer to FIG. 14*c*. Current distribution under resonance "2" (4.46 GHz) includes a first current flowing from the first ground part B to the feeding part A and a second current flowing from the second ground part C to the feeding part A on the first strip-shaped conductor 41, a third current flowing from the second end 512 of the second strip-shaped conductor 51 to the first end 511 of the second strip-shaped conductor 51 on the second strip-shaped conductor 51, and a fourth current flowing from the second end 522 of the third strip-shaped conductor 52 to the first end 521 of the third strip-shaped conductor 52 on the third strip-shaped conductor 52. Current intensity of the first strip-shaped conductor 41 is less than current intensity of the second strip-shaped conductor 51 and the third strip-shaped conductor 52. In this way, the current under resonance "2" (4.46 GHz) is mainly a current on the second strip-shaped conductor 51 and the third strip-shaped conductor 52. The current under resonance "2" (4.46 GHz) is a current in the wire antenna common mode.

Figure 14D:
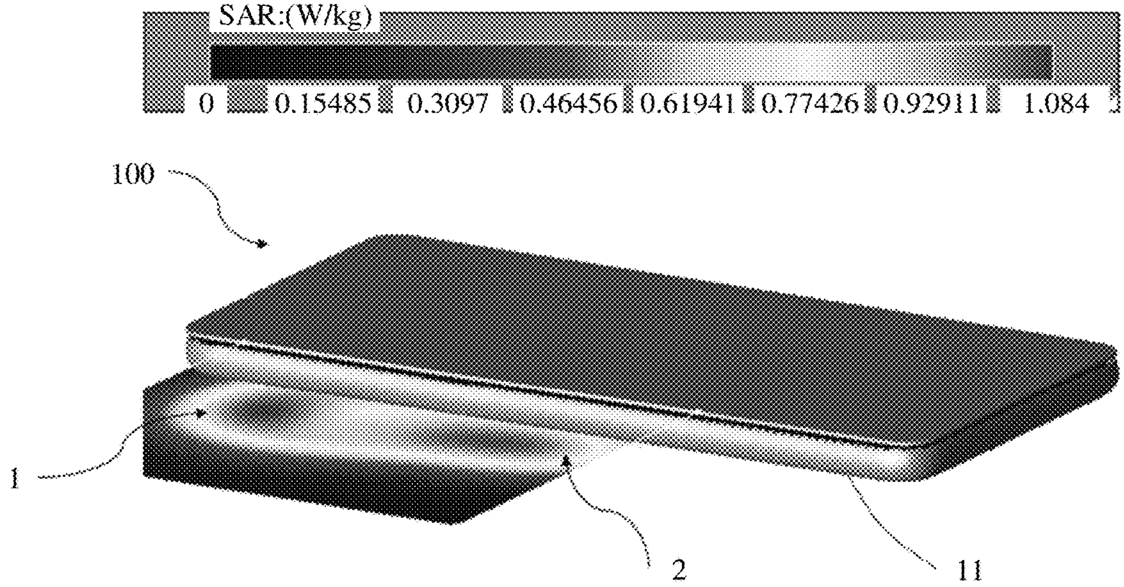
FIG. 14*d* is a schematic diagram of SAR hotspot distribution of the composite antenna shown in FIG. 12 under resonance "1"

FIG. 14*d* is a schematic diagram of SAR hotspot distribution of the composite antenna shown in FIG. 12 under resonance "i". FIG. 14*d* shows an SAR value measured at a distance of 5 mm from a human body tissue to the rear cover 11. For resonance "1" (3.57 GHz), two SAR hotspots appear at 5 mm away from the rear cover 11 (FIG. 14*d* simply shows the two SAR hotspots by using an arrow 1 and an arrow 2).

It may be understood that, under resonance "i" of the composite antenna, directions of the first current and the second current on the first strip-shaped conductor 41 are opposite. In addition, because the first strip-shaped conductor 41 is in a symmetric pattern shape, current intensity of the first current is the same as current intensity of the second current. In this case, phases of magnetic fields at the feeding part A are opposite, and amplitudes of the magnetic fields are approximately offset. In this way, the magnetic fields are mainly distributed on two sides of the feeding part A, and two SAR hotspots are formed on the two sides of the feeding part A. In this case, energy of radiated electromagnetic waves is relatively dispersed, and an SAR value under resonance "1" (3.57 GHz) is relatively low.

Figure 14E:
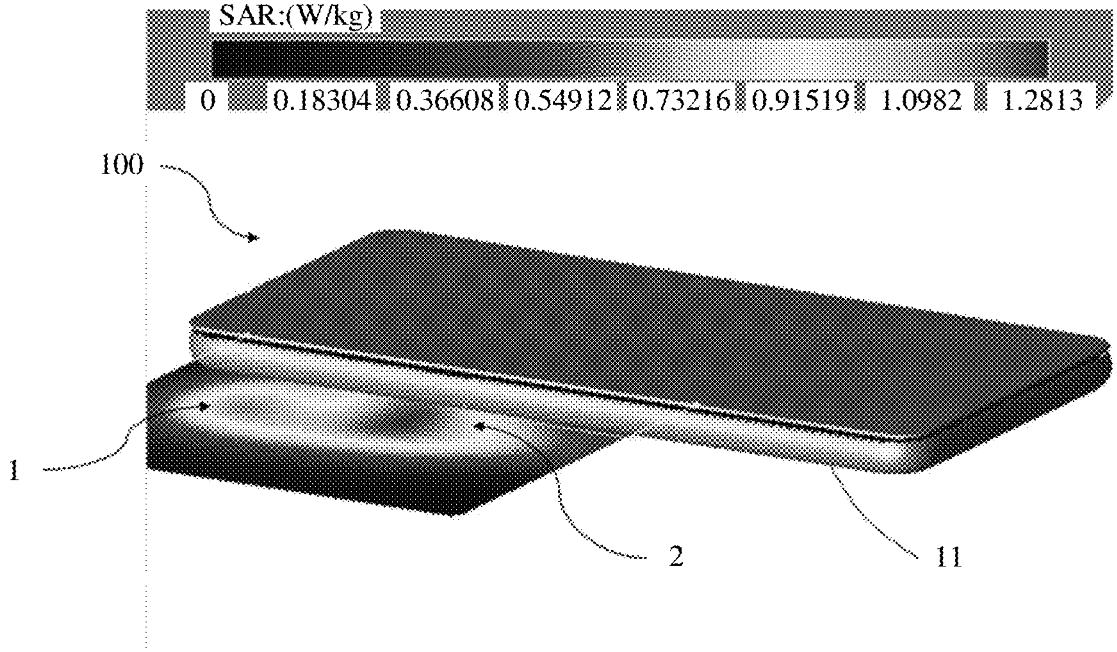
FIG. 14*e* is a schematic diagram of SAR hotspot distribution of the composite antenna shown in FIG. 12 under resonance "2"

FIG. 14*e* is a schematic diagram of SAR hotspot distribution of the composite antenna shown in FIG. 12 under resonance "2". FIG. 11*e* shows an SAR value measured at a distance of 5 mm from a human body tissue to the rear cover 11. For resonance "2" (4.46 GHz), two SAR hotspots also appear at 5 mm away from the rear cover 11 (FIG. 14*e* simply shows the two SAR hotspots by using an arrow 1 and an arrow 2).

It may be understood that a direction of the third current on the second strip-shaped conductor 51 is opposite to a direction of the fourth current on the third strip-shaped conductor 52. In addition, because the second strip-shaped conductor 51 and the third strip-shaped conductor 52 are symmetrical with respect to the feeding part A, current intensity of the third current is the same as current intensity of the fourth current. In this case, phases of magnetic fields at the feeding part A are opposite, and amplitudes of the magnetic fields are approximately offset. In this way, the magnetic fields are mainly distributed on two sides of the feeding part A, and two SAR hotspots are formed on the two sides of the feeding part A. In this case, energy of radiated electromagnetic waves is relatively dispersed, and an SAR value under resonance "2" (4.46 GHz) is relatively low.

In addition, because the first end 511 of the second strip-shaped conductor 51 is connected to the first ground part B of the first strip-shaped conductor 41, the third current on the second strip-shaped conductor 51 flows into the circuit board 30 through the first ground part B. In addition, because the first end 521 of the third strip-shaped conductor 52 is connected to the second ground part C of the first strip-shaped conductor 41, the fourth current on the third strip-shaped conductor 52 flows into the circuit board 30 through the second ground part C. Therefore, current intensity on the second strip-shaped conductor 51 and the third strip-shaped conductor 52 is greatly reduced. In this case, strength of magnetic fields generated by the second strip-shaped conductor 51 and the third strip-shaped conductor 52 is also relatively small, and an SAR value under resonance “2” (4.46 GHz) is relatively low.

In addition, Table 2 shows SAR values of the electronic device 100 using the composite antenna provided in the second implementation.

TABLE 2

| Mode | Resonance "1" (3.57 GHz) | Resonance "2" (4.46 GHz) |
|---|---|---|
| SAR value at 5 mm away from the rear cover | 1.08 | 1.28 |
| SAR value at 5 mm away from the rear cover (normalized at −5 dB) | 0.36 | 0.42 |

Table 2 shows SAR values based on the (log, average) standard. It can be seen that, when output power is 24 dBm, the SAR value of the electronic device 100 using the composite antenna provided in the second implementation at 5 mm away from the rear cover, regardless of resonance “1” or resonance “2”, is relatively low on the whole. When efficiency is normalized to −5 dB, advantages of the composite antenna provided in the second implementation in terms of a low SAR value are more obvious. Regardless of resonance “1” or resonance “2”, the SAR value at 5 mm away from the rear cover is less than 0.5.

In this implementation, according to the antenna design solution provided in the second implementation, a composite antenna of a slot antenna and a wire antenna is designed, so that under feeding, the composite antenna separately excites two resonance modes (a slot antenna differential mode and a wire antenna common mode). In addition to implementing wide-band coverage, two SAR hotspots can appear in both the modes, and SAR values of the two modes are both relatively low.

Figure 15:
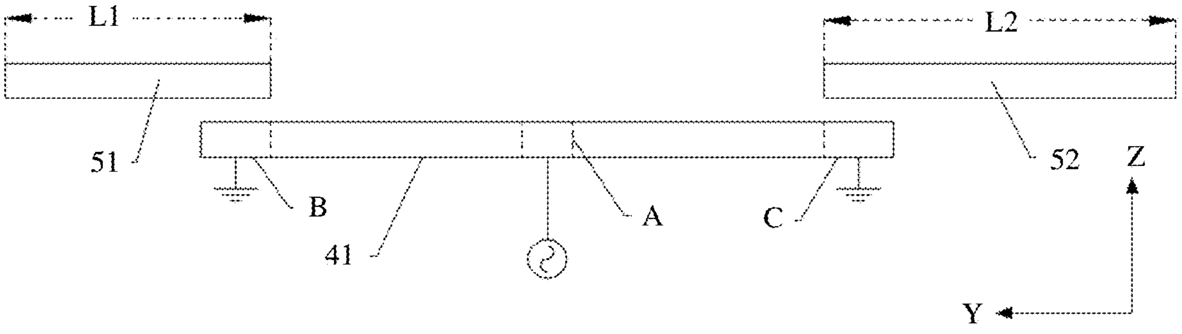
FIG. 15 is a schematic diagram of a partial structure of still another implementation of a composite antenna of the electronic device shown in FIG. 1.

In a third implementation, technical content that is the same as that in the first implementation is not described again. FIG. 15 is a schematic diagram of a partial structure of still another implementation of a composite antenna of the electronic device shown in FIG. 1. Different from the first implementation, in this implementation, a length L1 of the second strip-shaped conductor 51 is less than a length L2 of the third strip-shaped conductor 52.

The following describes simulation of the composite antenna provided in the third implementation with reference to the accompanying drawings.

Figure 16A:
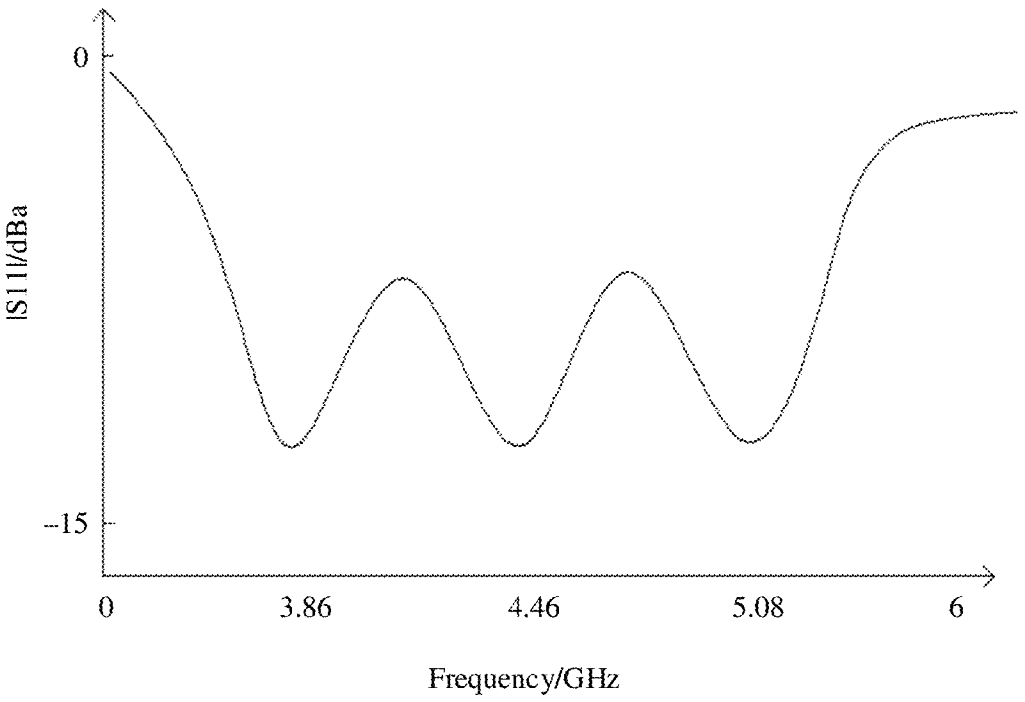
FIG. 16*a* is a diagram of a relationship between a reflection coefficient and a frequency of the composite antenna shown in FIG. 15 in a frequency band of 3 GHz to 6 GHz.

FIG. 16*a* is a diagram of a relationship between a reflection coefficient and a frequency of the composite antenna shown in FIG. 15 in a frequency band of 3 GHz to 6 GHz. The composite antenna may generate three resonances at 3 GHz to 6 GHz: resonance “1” (3.86 GHz), resonance “2” (4.46 GHz), and resonance “3” (5.08 GHz). Resonance “1” is generated by a slot antenna differential mode of the composite antenna. Both resonance “2” and resonance “3” are generated by a wire antenna common mode of the composite antenna. It may be understood that, in addition to a 3.86 GHz to 4.46 GHz to 5.08 GHz frequency band shown in FIG. 16*a*, the composite antenna in this implementation may further generate a resonance in another frequency band (for example, 0 GHz to 3 GHz, 6 GHz to 8 GHz, or 8 GHz to 11 GHz). Specifically, another resonance may be set by adjusting a size of the first strip-shaped conductor 41, a size of the second strip-shaped conductor 51, a size of the third strip-shaped conductor 52, or adjusting sizes of the first strip-shaped conductor 41, the second strip-shaped conductor 51, and the third strip-shaped conductor 52 at the same time.

Figure 16B:
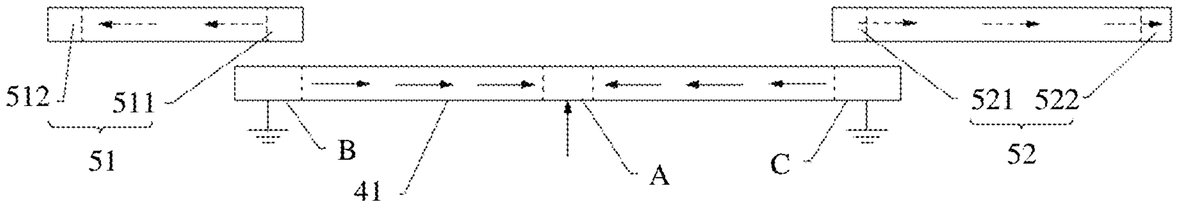
FIG. 16*b* is a schematic diagram of a flow direction of a current of the composite antenna shown in FIG. 15 under resonance "1"
Figure 16C:
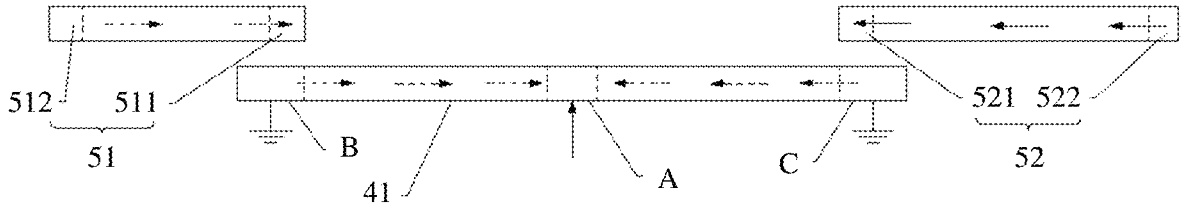
FIG. 16*c* is a schematic diagram of a flow direction of a current of the antenna shown in FIG. 15 under resonance "2"
Figure 16D:
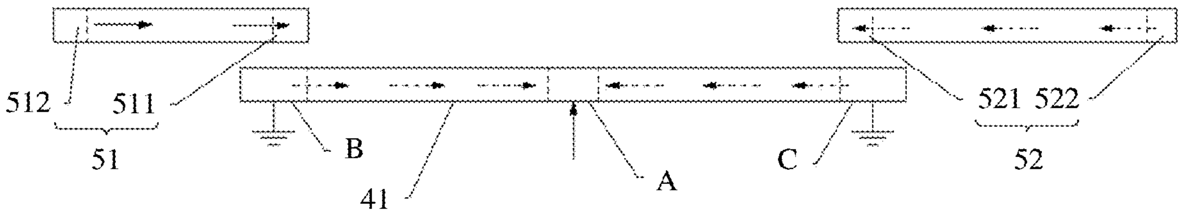
FIG. 16*d* is a schematic diagram of a flow direction of a current of the composite antenna shown in FIG. 15 under resonance "3"

With reference to FIG. 16*b*, FIG. 16*c*, and FIG. 16*d*, the following specifically describes currents under the three resonances of the composite antenna: current distributions under resonance “1” (3.86 GHz), resonance “2” (4.46 GHz), and resonance “3” (5.08 GHz). FIG. 16*b* is a schematic diagram of a flow direction of a current of the composite antenna shown in FIG. 15 under resonance “i”. FIG. 16*c* is a schematic diagram of a flow direction of a current of the antenna shown in FIG. 15 under resonance “2”. FIG. 16*d* is a schematic diagram of a flow direction of a current of the composite antenna shown in FIG. 15 under resonance “3”.

Refer to FIG. 16*b*. Current distribution under resonance “1” (3.86 GHz) includes a first current flowing from the first ground part B to the feeding part A and a second current flowing from the second ground part C to the feeding part A on the first strip-shaped conductor 41, a third current flowing from the first end 511 of the second strip-shaped conductor 51 to the second end 512 of the second strip-shaped conductor 51 on the second strip-shaped conductor 51, and a fourth current flowing from the first end 521 of the third strip-shaped conductor 52 to the second end 522 of the third strip-shaped conductor 52 on the third strip-shaped conductor 52. Current intensity of the first strip-shaped conductor 41 is greater than current intensity of the second strip-shaped conductor 51 and the third strip-shaped conductor 52. In this way, the current under resonance “1” (3.86 GHz) is mainly a current on the first strip-shaped conductor 41. In addition, the current under resonance “1” (3.86 GHz) is a current in the slot antenna differential mode.

Refer to FIG. 16*c*. Current distribution under resonance “2” (4.46 GHz) includes a first current flowing from the first ground part B to the feeding part A and a second current flowing from the second ground part C to the feeding part A on the first strip-shaped conductor 41, a third current flowing from the second end 512 of the second strip-shaped conductor 51 to the first end 511 of the second strip-shaped conductor 51 on the second strip-shaped conductor 51, and a fourth current flowing from the second end 522 of the third strip-shaped conductor 52 to the first end 521 of the third strip-shaped conductor 52 on the third strip-shaped conductor 52. Both current intensity of the first strip-shaped conductor 41 and current intensity of the second strip-shaped conductor 51 are less than current intensity of the third strip-shaped conductor 52. In this way, the current under resonance “2” (4.46 GHz) is mainly a current on the third strip-shaped conductor 52. The current under resonance “2” (4.46 GHz) is a current in the wire antenna common mode.

Refer to FIG. 16*d*. Current distribution under resonance “3” (5.08 GHz) includes a first current flowing from the first ground part B to the feeding part A and a second current flowing from the second ground part C to the feeding part A on the first strip-shaped conductor 41, a first current flowing from the second end 512 of the second strip-shaped conductor 51 to the first end 511 of the second strip-shaped conductor 51 on the second strip-shaped conductor 51, and a second current flowing from the second end 522 of the third strip-shaped conductor 52 to the first end 521 of the third strip-shaped conductor 52 on the third strip-shaped conductor 52. Both current intensity of the first strip-shaped conductor 41 and current intensity of the third strip-shaped conductor 52 are less than current intensity of the second strip-shaped conductor 51. In this way, the current under resonance "3" (5.08 GHz) is mainly a current on the second strip-shaped conductor 51. The current under resonance "3" (5.08 GHz) is a current in the wire antenna common mode.

Figure 16E:
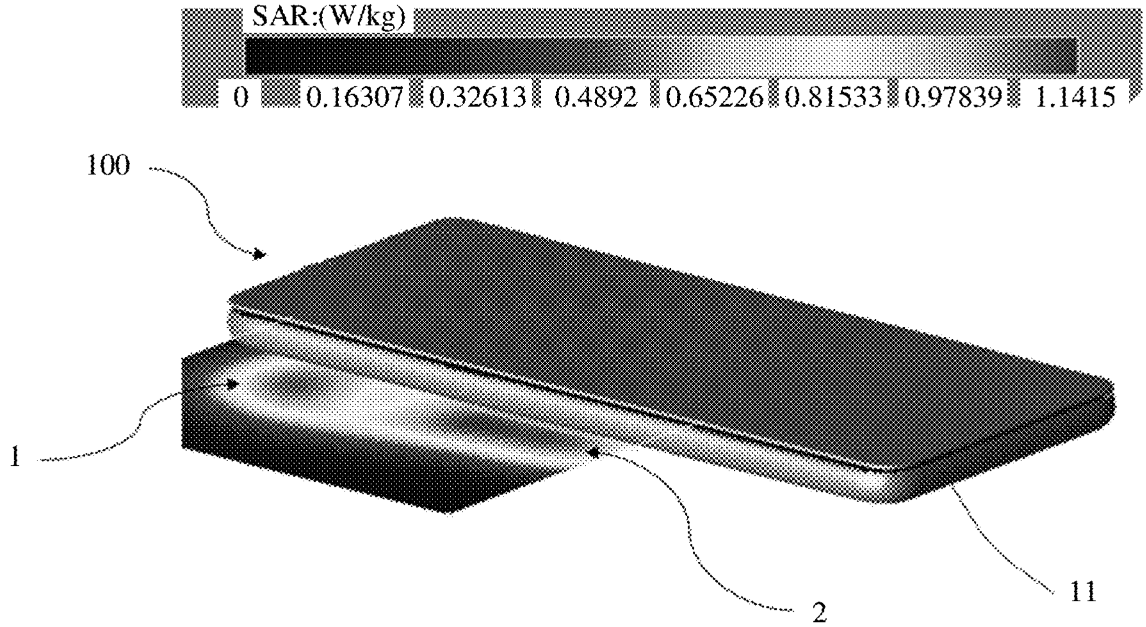
FIG. 16*e* is a schematic diagram of SAR hotspot distribution of the composite antenna shown in FIG. 15 under resonance "1"

FIG. 16*e* is a schematic diagram of SAR hotspot distribution of the composite antenna shown in FIG. 15 under resonance "1". FIG. 16*e* shows an SAR value measured at a distance of 5 mm from a human body tissue to the rear cover 11. For resonance "1" (3.86 GHz), two SAR hotspots appear at 5 mm away from the rear cover 11 (FIG. 16*e* simply shows the two SAR hotspots by using an arrow 1 and an arrow 2). It may be understood that, under resonance "1" of the composite antenna, directions of the first current and the second current on the first strip-shaped conductor 41 are opposite. In addition, because the first strip-shaped conductor 41 is in a symmetric pattern shape, current intensity of the first current is the same as current intensity of the second current. In this case, phases of magnetic fields at the feeding part A are opposite, and amplitudes of the magnetic fields are approximately offset. In this way, the magnetic fields are mainly distributed on two sides of the feeding part A, and two SAR hotspots are formed on the two sides of the feeding part A. In this case, energy of radiated electromagnetic waves is relatively dispersed, and therefore, an SAR value under resonance "1" (3.86 GHz) is relatively low.

Figure 16F:
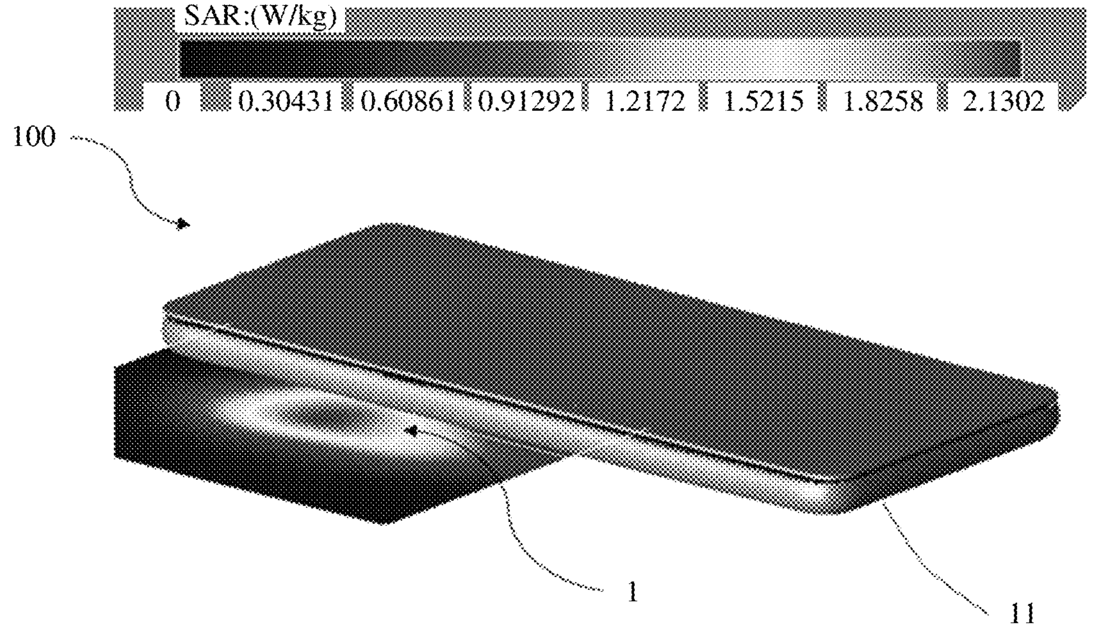
FIG. 16*f* is a schematic diagram of SAR hotspot distribution of the composite antenna shown in FIG. 15 under resonance "2"

FIG. 16*f* is a schematic diagram of SAR hotspot distribution of the composite antenna shown in FIG. 15 under resonance "2". FIG. 16*f* shows an SAR value measured at a distance of 5 mm from a human body tissue to the rear cover 11. For resonance "2" (4.46 GHz), an SAR hotspot appears at 5 mm away from the rear cover 11 (FIG. 16*f* simply shows the SAR hotspot by using an arrow 1). In addition, a fourth current on the third strip-shaped conductor 52 can well flow into the circuit board 30 through the second ground part C. In this way, current intensity on the third strip-shaped conductor 52 is reduced to a large extent, strength of a magnetic field generated by the third strip-shaped conductor 52 is also small, an SAR value under resonance "2" (4.46 GHz) is low. Therefore, even though the SAR hotspot appears under resonance "2" (4.46 GHz), the SAR value under resonance "2" (4.46 GHz) is also relatively low.

Figure 16G:
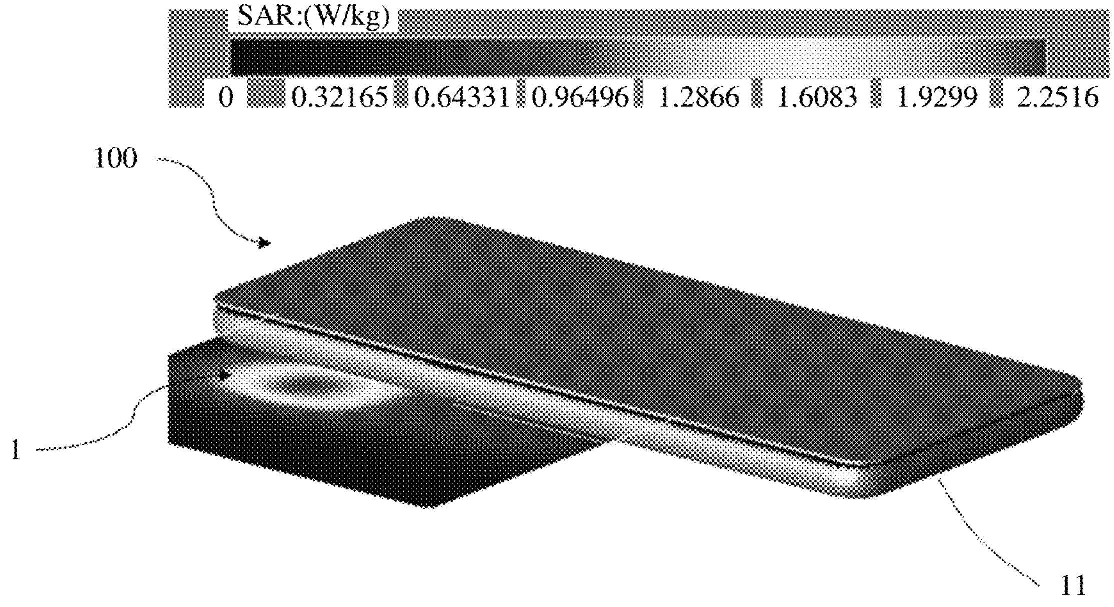
FIG. 16*g* is a schematic diagram of SAR hotspot distribution of the composite antenna shown in FIG. 15 under resonance "3"

FIG. 16*g* is a schematic diagram of SAR hotspot distribution of the composite antenna shown in FIG. 15 under resonance "3". FIG. 16*g* shows an SAR value measured at a distance of 5 mm from a human body tissue to the rear cover 11. For resonance "3" (5.08 GHz), an SAR hotspot also appears at 5 mm away from the rear cover 11 (FIG. 16*g* simply shows the SAR hotspot by using an arrow 1). In addition, a third current on the second strip-shaped conductor 51 can well flow into the circuit board 30 through the first ground part B. In this way, current intensity on the second strip-shaped conductor 51 is reduced to a large extent, strength of a magnetic field generated by the second strip-shaped conductor 51 is also small, and an SAR value under resonance "3" (5.08 GHz) is low. Therefore, even though the SAR hotspot appears under resonance "3" (5.08 GHz), the SAR value under resonance "3" (5.08 GHz) is also relatively low.

In addition, Table 3 shows SAR values of the electronic device 100 using the composite antenna provided in the third implementation.

TABLE 3

| Mode | Resonance "1" (3.86 GHz) | Resonance"2" (4.46 GHz) | Resonance"3" (5.08 GHz) |
|---|---|---|---|
| SAR value at 5 mm away from the rear cover | 1.14 | 2.13 | 2.25 |
| SAR value at 5 mm away from the rear cover (normalized at −5 dB) | 0.4 | 0.77 | 0.8 |

Table 3 shows SAR values based on the (10 g, average) standard. It can be seen that, when output power is 24 dBm, the SAR value of the electronic device 100 using the composite antenna provided in the third implementation at 5 mm away from the rear cover, regardless of resonance "1", resonance "2", or resonance "3", is relatively low on the whole. When efficiency is normalized to −5 dB, advantages of the composite antenna provided in the third implementation in terms of a low SAR value are more obvious. Regardless of resonance "1", resonance "2", or resonance "3", an SAR value at 5 mm away from the rear cover is less than 0.9.

In this implementation, according to the antenna design solution provided in the third implementation, a composite antenna of a slot antenna and a wire antenna is designed, so that under feeding, the composite antenna separately excites three resonance modes (a slot antenna differential mode and a wire antenna common mode). In addition to implementing wide-band coverage, SAR values of the three modes may be low, and one of the resonance modes can generate two SAR hotspots.

It may be understood that, for a disposing manner of the second strip-shaped conductor 51 in this implementation, refer to the disposing manner of the second strip-shaped conductor 51 in the second implementation. For a disposing manner of the third strip-shaped conductor 52 in this implementation, refer to the disposing manner of the third strip-shaped conductor 52 in the second implementation. Details are not described herein again.

Figure 17:
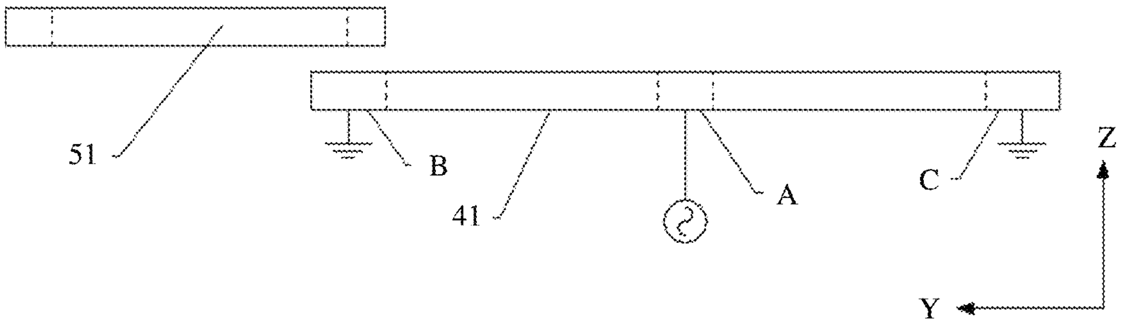
FIG. 17 is a schematic diagram of a partial structure of still another implementation of a composite antenna of the electronic device shown in FIG. 1.

In a fourth implementation, technical content that is the same as that in the first implementation is not described again. FIG. 17 is a schematic diagram of a partial structure of still another implementation of a composite antenna of the electronic device shown in FIG. 1. The electronic device 100 includes the second strip-shaped conductor 51. The electronic device 100 no longer includes the third strip-shaped conductor 52. For a forming manner and a disposing manner of the second strip-shaped conductor 51, refer to the forming manner and the disposing manner of the first strip-shaped conductor 51 in the first implementation. Details are not described herein again.

The following describes simulation of the composite antenna provided in the fourth implementation with reference to the accompanying drawings.

Figure 18A:
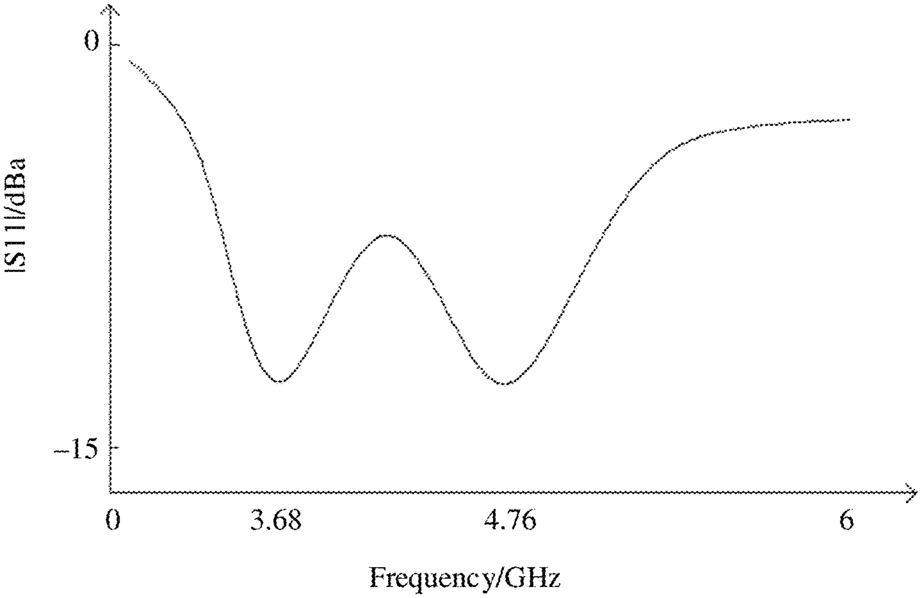
FIG. 18*a* is a diagram of a relationship between a reflection coefficient and a frequency of the composite antenna shown in FIG. 17 in a frequency band of 3 GHz to 6 GHz.

FIG. 18*a* is a diagram of a relationship between a reflection coefficient and a frequency of the composite antenna shown in FIG. 17 in a frequency band of 3 GHz to 6 GHz. The composite antenna may generate two resonances at 3 GHz to 6 GHz: resonance "1" (3.68 GHz) and resonance "2" (4.76 GHz). Resonance "1" is generated by a slot antenna differential mode of the composite antenna. Resonance "2" is generated by a wire antenna common mode of the composite antenna. It may be understood that, in addition to a 3.68 GHz to 4.76 GHz frequency band shown in FIG. 18*a*, the composite antenna in this implementation may further generate a resonance in another frequency band (for example, 0 GHz to 3 GHz, 6 GHz to 8 GHz, or 8 GHz to 11

GHz). Specifically, another resonance may be set by adjusting a size of the first strip-shaped conductor 41, a size of the second strip-shaped conductor 51, or adjusting sizes of the first strip-shaped conductor 41 and the second strip-shaped conductor 51 at the same time.

Figure 18B:
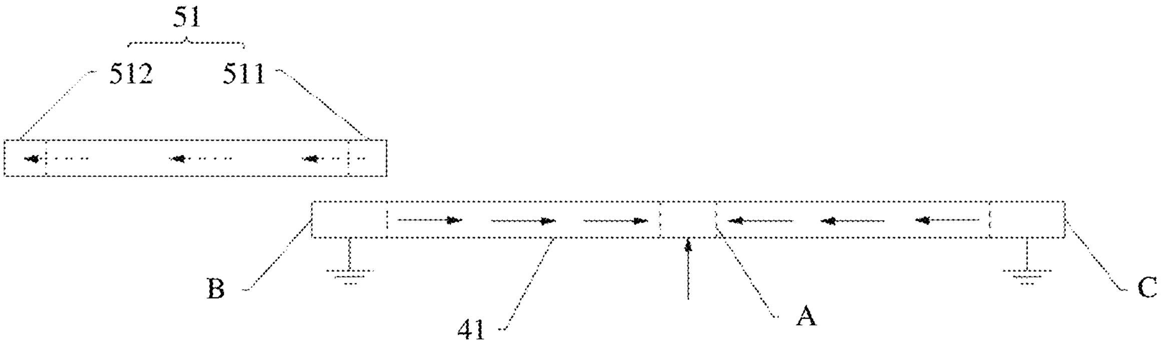
FIG. 18*b* is a schematic diagram of a flow direction of a current of the composite antenna shown in FIG. 17 under resonance "1"
Figure 18C:
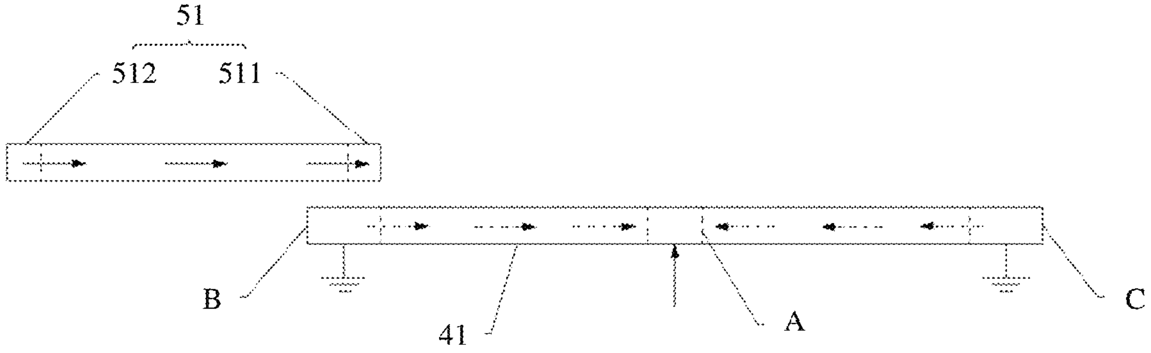
FIG. 18*c* is a schematic diagram of a flow direction of a current of the antenna shown in FIG. 17 under resonance "2"

With reference to FIG. 18*b* and FIG. 18*c*, the following specifically describes currents under the two resonances of the composite antenna: current distributions under resonance "1" (3.68 GHz) and resonance "2" (4.76 GHz). FIG. 18*b* is a schematic diagram of a flow direction of a current of the composite antenna shown in FIG. 17 under resonance "1". FIG. 18*c* is a schematic diagram of a flow direction of a current of the antenna shown in FIG. 17 under resonance "2".

Refer to FIG. 18*b*. Current distribution under resonance "1" (3.68 GHz) includes a first current flowing from the first ground part B to the feeding part A and a second current flowing from the second ground part C to the feeding part A on the first strip-shaped conductor 41, and a third current flowing from the first end 511 of the second strip-shaped conductor 51 to the second end 512 of the second strip-shaped conductor 51 on the second strip-shaped conductor 51. Current intensity of the first strip-shaped conductor 41 is greater than current intensity of the second strip-shaped conductor 51. In this way, the current under resonance "1" (3.68 GHz) is mainly a current on the first strip-shaped conductor 41. In addition, the current under resonance "1" (3.68 GHz) is a current in the slot antenna differential mode.

Refer to FIG. 18*c*. Current distribution under resonance "2" (4.76 GHz) includes a first current flowing from the first ground part B to the feeding part A and a second current flowing from the second ground part C to the feeding part A on the first strip-shaped conductor 41, and a third current flowing from the second end 512 of the second strip-shaped conductor 51 to the first end 511 of the second strip-shaped conductor 51 on second strip-shaped conductor 51. Current intensity of the first strip-shaped conductor 41 is less than current intensity of the second strip-shaped conductor 51. In this way, the current under resonance "2" (4.76 GHz) is mainly a current on the second strip-shaped conductor 51. The current under resonance "2" (4.76 GHz) is a current in the wire antenna common mode.

Figure 18D:
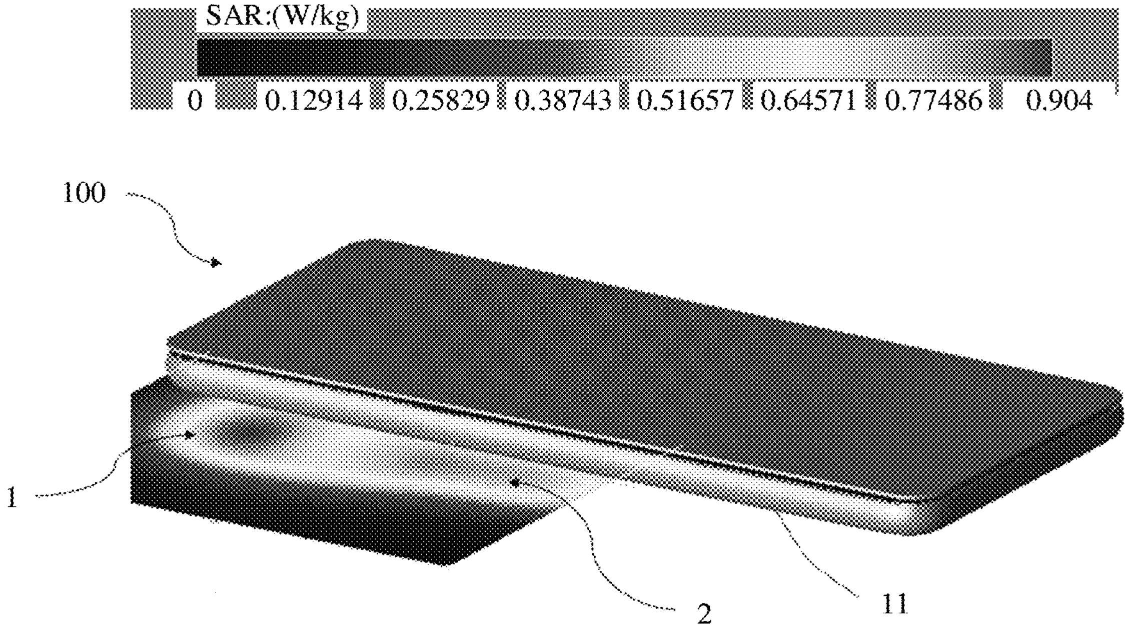
FIG. 18*d* is a schematic diagram of SAR hotspot distribution of the composite antenna shown in FIG. 17 under resonance "1"

FIG. 18*d* is a schematic diagram of SAR hotspot distribution of the composite antenna shown in FIG. 17 under resonance "i". FIG. 18*d* shows an SAR value measured at a distance of 5 mm from a human body tissue to the rear cover 11. For resonance "1" (3.68 GHz), two SAR hotspots appear at 5 mm away from the rear cover 11 (FIG. 18*d* simply shows the two SAR hotspots by using an arrow 1 and an arrow 2). It may be understood that, under resonance "1" of the composite antenna, directions of the first current and the second current on the first strip-shaped conductor 41 are opposite. In addition, because the first strip-shaped conductor 41 is in a symmetric pattern shape, current intensity of the first current is the same as current intensity of the second current. In this case, phases of magnetic fields at the feeding part A are opposite, and amplitudes of the magnetic fields are approximately offset. In this way, the magnetic fields are mainly distributed on two sides of the feeding part A, and two SAR hotspots are formed on the two sides of the feeding part A. In this case, energy of radiated electromagnetic waves is relatively dispersed, and therefore, an SAR value under resonance "1" (3.68 GHz) is relatively low.

Figure 18E:
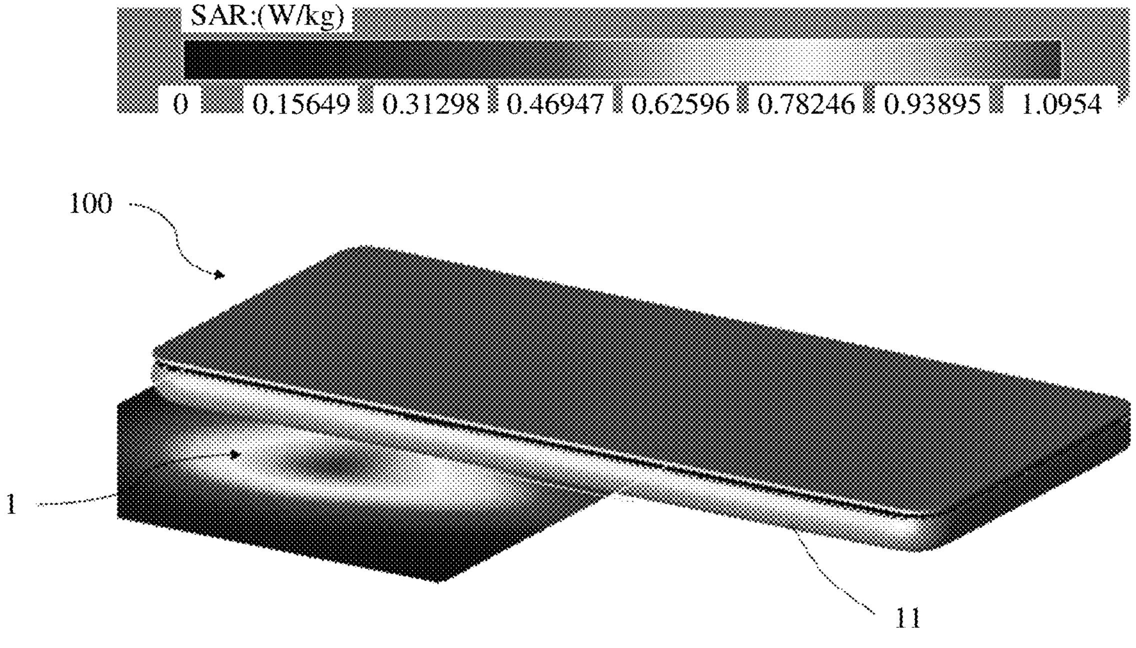
FIG. 18*e* is a schematic diagram of SAR hotspot distribution of the composite antenna shown in FIG. 17 under resonance "2"

FIG. 18*e* is a schematic diagram of SAR hotspot distribution of the composite antenna shown in FIG. 17 under resonance "2". FIG. 18*e* shows an SAR value measured at a distance of 5 mm from a human body tissue to the rear cover 11. For resonance "2" (4.76 GHz), an SAR hotspot appears at 5 mm away from the rear cover 11 (FIG. 18*e* simply shows the SAR hotspot by using an arrow 1). It may be understood that a third current on the second strip-shaped conductor 51 can flow into the circuit board 30 through the first ground part B. In this way, current intensity on the second strip-shaped conductor 51 can be reduced to a large extent. In this case, strength of a magnetic field generated by the second strip-shaped conductor 51 is also relatively small, and an SAR value under resonance "2" (4.76 GHz) is relatively low. Therefore, even though the SAR hotspot appears under resonance "2" (4.76 GHz), the SAR value under resonance "2" (4.76 GHz) is also relatively low.

In addition, Table 4 shows SAR values of the electronic device 100 using the composite antenna provided in the fourth implementation.

TABLE 4

| Mode | Resonance "1" (3.68 GHz) | Resonance "2" (4.76 GHz) |
|---|---|---|
| SAR value at 5 mm away from the rear cover | 0.90 | 1.09 |
| SAR value at 5 mm away from the rear cover (normalized at −5 dB) | 0.43 | 0.72 |

Table 4 shows SAR values based on the (log, average) standard. It can be seen that, when output power is 24 dBm, the SAR value of the electronic device 100 using the composite antenna provided in the fourth implementation at 5 mm away from the rear cover, regardless of resonance "1" or resonance "2", is relatively low on the whole. When efficiency is normalized to −5 dB, advantages of the composite antenna provided in the fourth implementation in terms of a low SAR value are more obvious. Regardless of resonance "1" or resonance "2", the SAR value at 5 mm away from the rear cover is less than 0.8.

In this implementation, according to the antenna design solution provided in the fourth implementation, a composite antenna of a slot antenna and a wire antenna is designed, so that under feeding, the composite antenna separately excites two resonance modes (a slot antenna differential mode and a wire antenna common mode). In addition to implementing wide-band coverage, SAR values of the two modes may be low, and one of the resonance modes can generate two SAR hotspots.

It may be understood that, for a disposing manner of the second strip-shaped conductor 51 in this implementation, refer to the disposing manner of the second strip-shaped conductor 51 in the second implementation. Details are not described herein again.

Figure 19:
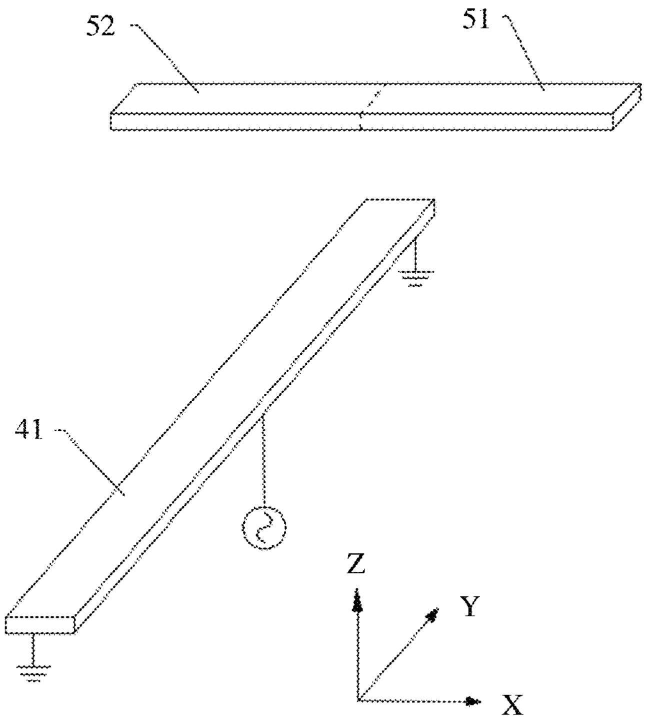
FIG. 19 is a schematic diagram of a partial structure of still another implementation of a composite antenna of the electronic device shown in FIG. 1.

In a fifth implementation, technical content that is the same as that in the first implementation is not described again. FIG. 19 is a schematic diagram of a partial structure of a still another implementation of a composite antenna of the electronic device shown in FIG. 1. The electronic device 100 includes the first strip-shaped conductor 41, the second strip-shaped conductor 51, and the third strip-shaped conductor 52. For forming manners and disposing manners of the first strip-shaped conductor 41, the second strip-shaped conductor 51, and the third strip-shaped conductor 52, refer to the forming manners and disposing manners of the first strip-shaped conductor 41, the second strip-shaped conductor 51, and the third strip-shaped conductor 52 in the first implementation. Details are not described herein again.

Figure 20:
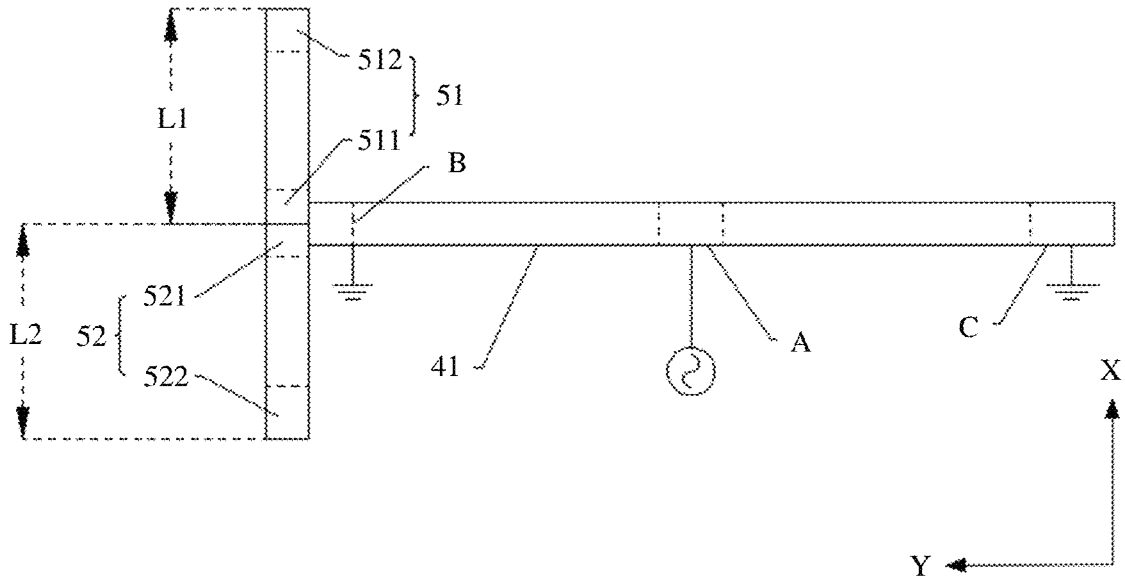
FIG. 20 is a schematic diagram of a structure of the composite antenna shown in FIG. 19 from another perspective.

FIG. 20 is a schematic diagram of a structure of the composite antenna shown in FIG. 19 from another perspective. The second strip-shaped conductor 51 includes the first end 511 and the second end 512 disposed away from the first end 511. The third strip-shaped conductor 52 includes the first end 521 and the second end 522 disposed away from the first end 521. The first end 511 of the second strip-shaped conductor 51 is connected to the first end 521 of the third strip-shaped conductor 52.

The first end 511 of the second strip-shaped conductor 51 and the first end 521 of the third strip-shaped conductor 52 are electrically connected to the first ground part B of the first strip-shaped conductor 41 together. It may be understood that, that the first end 511 of the second strip-shaped conductor 51 and the first end 521 of the third strip-shaped conductor 52 are electrically connected to the first ground part B together includes two implementations: In a first implementation, the first end 511 of the second strip-shaped conductor 51 and the first end 521 of the third strip-shaped conductor 52 are jointly disposed at an interval from the first ground part B, that is, in a Z-axis direction, there is a height difference between the second strip-shaped conductor 51 and the first strip-shaped conductor 41, and there is a height difference between the third strip-shaped conductor 52 and the first strip-shaped conductor 41. In this case, a radio frequency signal can be fed to the first end 511 of the second strip-shaped conductor 51 and the first end 521 of the third strip-shaped conductor 52 at the first ground part B of the first strip-shaped conductor 41 through magnetic field coupling. In a second implementation, the first end 511 of the second strip-shaped conductor 51 and the first end 521 of the third strip-shaped conductor 52 are jointly connected to the first ground part B of the first strip-shaped conductor 41, that is, in a Z-axis direction, the second strip-shaped conductor 51, the third strip-shaped conductor 52, and the first strip-shaped conductor 41 are disposed on a same layer. In this case, a radio frequency signal can be fed to the first end 511 of the second strip-shaped conductor 51 and the first end 521 of the third strip-shaped conductor 52 through the first ground part B. In this implementation, the first implementation is used as an example for description.

In addition, the second end 512 of the second strip-shaped conductor 51 is an open end, that is, the second end 512 of the second strip-shaped conductor 51 is not grounded. The second end 522 of the third strip-shaped conductor 52 is an open end, that is, the second end 522 of the third strip-shaped conductor 52 is not grounded.

In another implementation, the first end 511 of the second strip-shaped conductor 51 and the first end 521 of the third strip-shaped conductor 52 are electrically connected to the second ground part C of the first strip-shaped conductor 41 together.

In this implementation, for a center distance between the first ground part B and the feeding part A and a center distance between the second ground part C and the feeding part A, refer to a relationship between the first value d1 and the second value d2 in the first implementation.

Refer to FIG. 20 again. A length L1 of the second strip-shaped conductor 51 is equal to a length L2 of the third strip-shaped conductor 52. It may be understood that, when there is a tolerance and an error, within an allowable range, the length L1 of the second strip-shaped conductor 51 is slightly greater than or slightly less than the length L2 of the third strip-shaped conductor 52.

In another implementation, the length L1 of the second strip-shaped conductor 51 is greater than or less than the length L2 of the third strip-shaped conductor 52.

Figure 21:
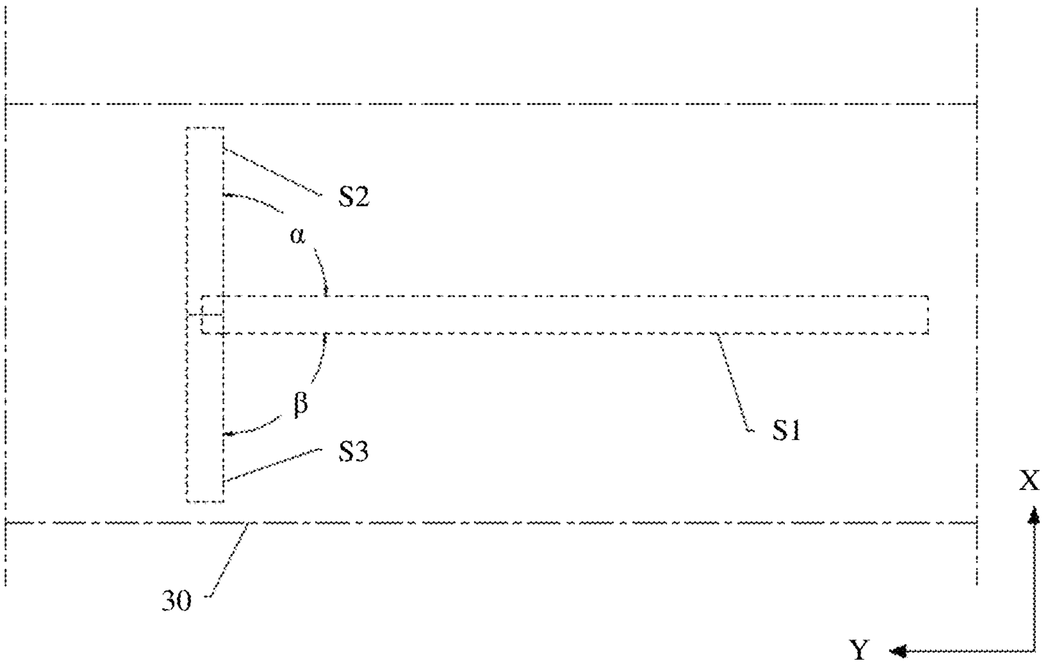
FIG. 21 is a schematic diagram of projections of the first strip-shaped conductor, the second strip-shaped conductor, and the third strip-shaped conductor shown in FIG. 19 on a circuit board.

With reference to FIG. 20, FIG. 21 is a schematic diagram of projections of the first strip-shaped conductor, the second strip-shaped conductor, and the third strip-shaped conductor shown in FIG. 19 on a circuit board. A projection of the first strip-shaped conductor 41 on a board surface of the circuit board 30 is a first projection S1. A projection of the second strip-shaped conductor 51 on a board surface of the circuit board 30 is a second projection S2. An included angle between the second projection S2 and the first projection S1 is α. In this implementation, α is equal to 90°. In another implementation, a may alternatively be equal to 10°, 60°, 125°, 150°, or 200°.

In an implementation, α is within a range from 0° to 180°.

In addition, a projection of the third strip-shaped conductor 52 on a board surface of the circuit board 30 is a third projection S3. An included angle between the third projection S3 and the first projection S1 is β. In this implementation, β is equal to 900. In another implementation, β may alternatively be equal to 30°, 60°, 125°, 150°, or 200°.

In an implementation, β may alternatively be within a range from 0° to 180°.

Therefore, in this implementation, the second strip-shaped conductor 51 and the third strip-shaped conductor 52 are symmetrical with respect to the first ground part B.

In addition, an area of an overlapping region among the first projection S1, the second projection S2, and the third projection S3 is within a range from 0 square millimeters to 16 square millimeters, for example, 0 millimeters, 3 millimeters, 7 millimeters, 10 millimeters, or 12 millimeters. In this implementation, the area of the overlapping region among the first projection S1, the second projection S2 and third projection S3 is 8 square millimeters. It may be understood that FIG. 21 merely schematically shows that an overlapping region among the first projection S1, the second projection S2, and the third projection S3 is in a rectangle shape. However, when shapes of the first strip-shaped conductor 41, the second strip-shaped conductor 51, and the third strip-shaped conductor 52 change, the overlapping region among the first projection S1, the second projection S2 and the third projection S3 may alternatively be in another shape, for example, an irregular pattern or a trapezoid. In another implementation, the area of the overlapping region among the first projection S1, the second projection S2, and the third projection S3 may not be within a range from 0 square millimeters to 16 square millimeters.

The following describes simulation of the composite antenna provided in the fifth implementation with reference to the accompanying drawings.

Figure 22A:
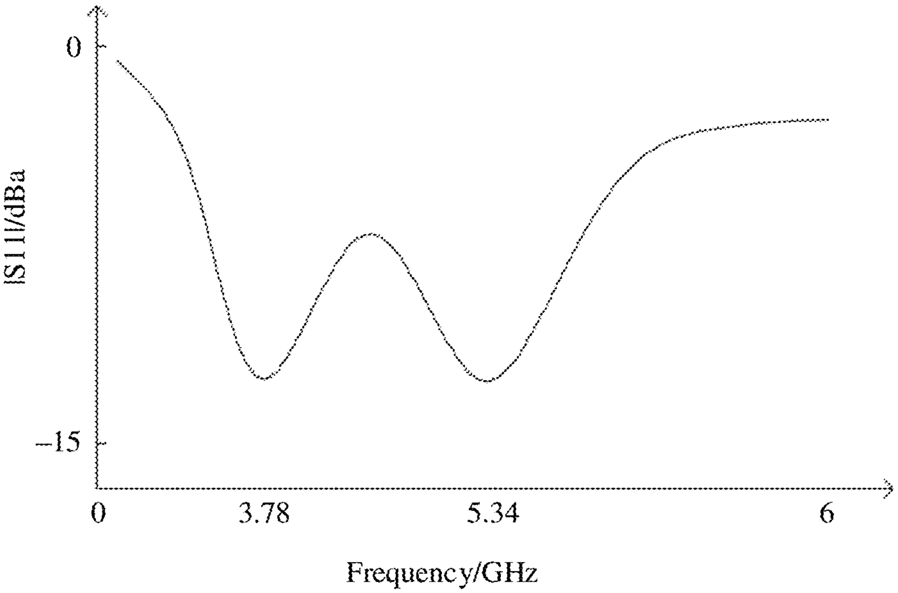
FIG. 22*a* is a diagram of a relationship between a reflection coefficient and a frequency of the composite antenna shown in FIG. 19 in a frequency band of 3 GHz to 6 GHz.

FIG. **22*a* is a diagram of a relationship between a reflection coefficient and a frequency of the composite antenna shown in FIG. 19 in a frequency band of 3 GHz to 6 GHz. The composite antenna may generate two resonances at 3 GHz to 6 GHz: resonance "1" (3.78 GHz) and resonance "2" (5.34 GHz). Resonance "1" is generated by a slot antenna differential mode of the composite antenna. Resonance "2" is generated by a wire antenna common mode of the composite antenna. It may be understood that, in addition to a 3.78 GHz to 5.34 GHz frequency band shown in FIG. 22*a*, the composite antenna in this implementation may further generate a resonance in another frequency band (for example, 0 GHz to 3 GHz, 6 GHz to 8 GHz, or 8 GHz to 11 GHz). Specifically, the another resonance may be set by adjusting a size of the first strip-shaped conductor 41, a size of the second strip-shaped conductor 51, a size of the third strip-shaped conductor 52, or adjusting sizes of the first strip-shaped conductor 41, the second strip-shaped conductor 51, and the third strip-shaped conductor 52** at the same time.

Figure 22B:
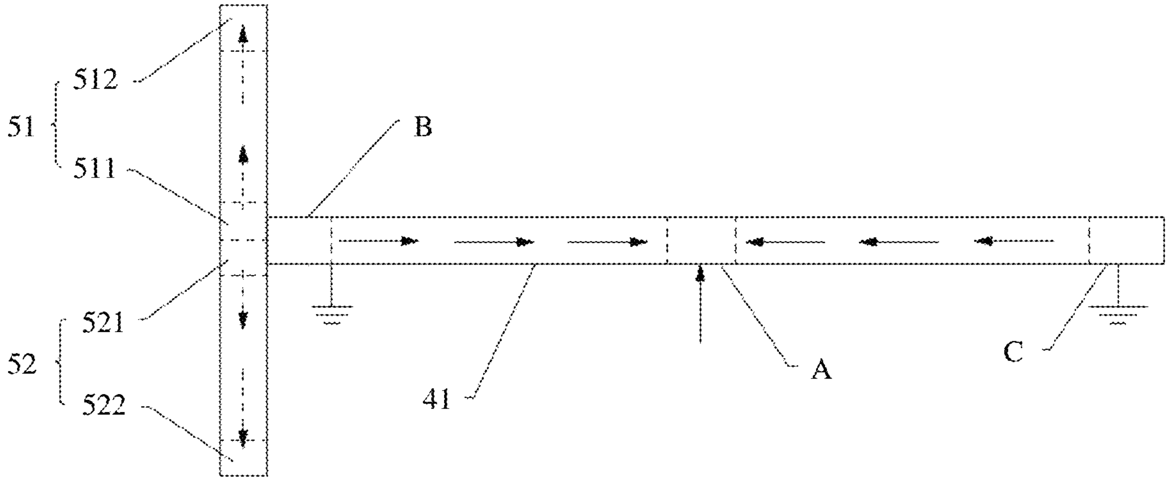
FIG. 22*b* is a schematic diagram of a flow direction of a current of the composite antenna shown in FIG. 19 under resonance "i"
Figure 22C:
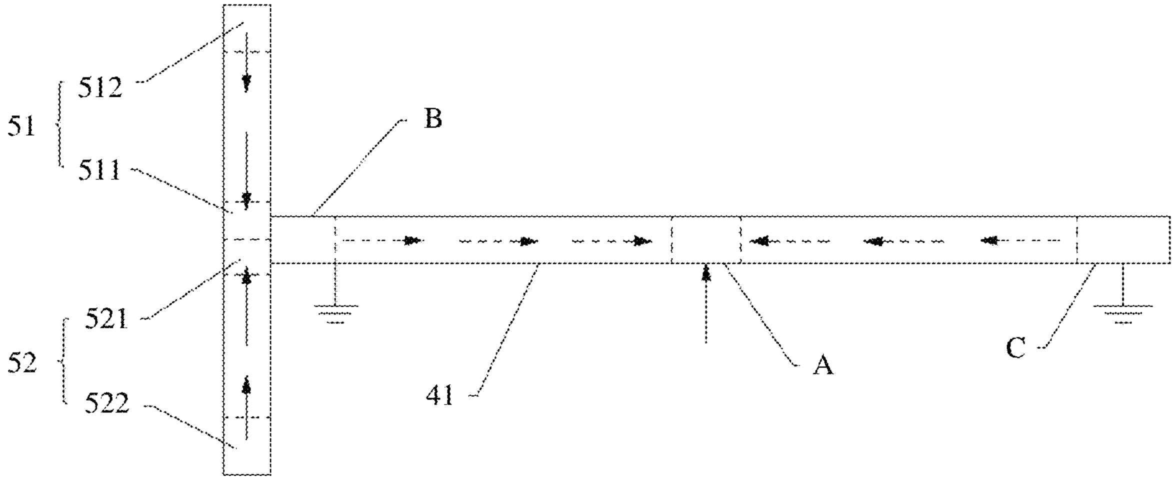
FIG. 22*c* is a schematic diagram of a flow direction of a current of the antenna shown in FIG. 19 under resonance "2"

With reference to FIG. 22*b* and FIG. 22*c*, the following specifically describes currents under the two resonances of the composite antenna: current distributions under resonance "1" (3.78 GHz) and resonance "2" (5.34 GHz). FIG. 22*b* is a schematic diagram of a flow direction of a current of the composite antenna shown in FIG. 19 under resonance "1". FIG. 22*c* is a schematic diagram of a flow direction of a current of the antenna shown in FIG. 19 under resonance "2".

Refer to FIG. 22*b*. Current distribution under resonance "1" (3.78 GHz) includes a first current flowing from the first ground part B to the feeding part A and a second current flowing from the second ground part C to the feeding part A on the first strip-shaped conductor 41, a third current flowing from the first end 511 of the second strip-shaped conductor 51 to the second end 512 of the second strip-shaped conductor 51 on the second strip-shaped conductor 51, and a fourth current flowing from the first end 521 of the third strip-shaped conductor 52 to the second end 522 of the third strip-shaped conductor 52 on the third strip-shaped conductor 52. Current intensity of the first strip-shaped conductor 41 is greater than current intensity of the second strip-shaped conductor 51 and the third strip-shaped conductor 52. In this way, the current under resonance "1" (3.78 GHz) is mainly a current on the first strip-shaped conductor 41. In addition, the current under resonance "1" (3.78 GHz) is a current in the slot antenna differential mode.

Refer to FIG. 22*c*. Current distribution of resonance "2" (5.34 GHz) includes a first current flowing from the first ground part B to the feeding part A and a second current flowing from the second ground part C to the feeding part A on the first strip-shaped conductor 41, a third current flowing from the second end 512 of the second strip-shaped conductor 51 to the first end 511 of the second strip-shaped conductor 51 on the second strip-shaped conductor 51, and a fourth current flowing from the second end 522 of the third strip-shaped conductor 52 to the first end 521 of the third strip-shaped conductor 52 on the third strip-shaped conductor 52. Current intensity of the first strip-shaped conductor 41 is less than current intensity of the second strip-shaped conductor 51 and the third strip-shaped conductor 52. In this way, the current under resonance "2" (5.34 GHz) is mainly a current on the second strip-shaped conductor 51 and the third strip-shaped conductor 52. The current under resonance "2" (5.34 GHz) is a current in the wire antenna common mode.

Figure 22D:
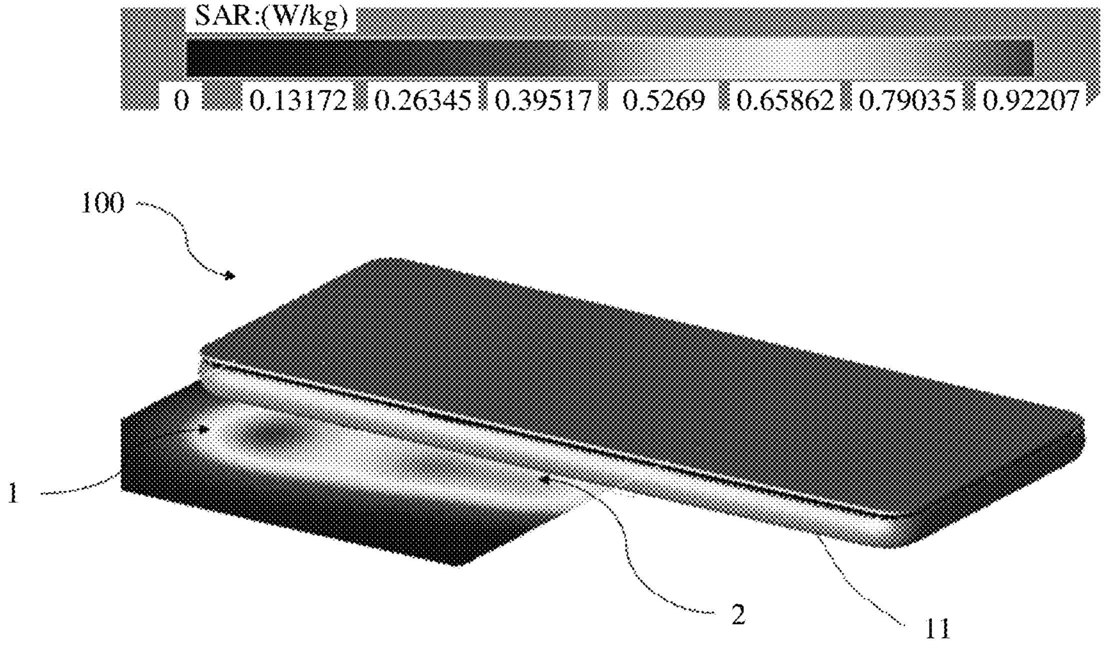
FIG. 22*d* is a schematic diagram of SAR hotspot distribution of the composite antenna shown in FIG. 19 under resonance "i"

FIG. 22*d* is a schematic diagram of SAR hotspot distribution of the composite antenna shown in FIG. 19 under resonance "1". FIG. 22*d* shows an SAR value measured at a distance of 5 mm from a human body tissue to the rear cover 11. For resonance "1" (3.78 GHz), two SAR hotspots appear at 5 mm away from the rear cover 11 (FIG. 22*d* simply shows the two SAR hotspots by using an arrow 1 and an arrow 2). It may be understood that, under resonance "1" of the composite antenna, directions of the first current and the second current on the first strip-shaped conductor 41 are opposite. In addition, because the first strip-shaped conductor 41 is in a symmetric pattern shape, current intensity of the first current is the same as current intensity of the second current. In this case, phases of magnetic fields at the feeding part A are opposite, and amplitudes of the magnetic fields are approximately offset. In this way, the magnetic fields are mainly distributed on two sides of the feeding part A, and two SAR hotspots are formed on the two sides of the feeding part A. In this case, energy of radiated electromagnetic waves is relatively dispersed, and therefore, an SAR value under resonance "1" (3.78 GHz) is relatively low.

Figure 22E:
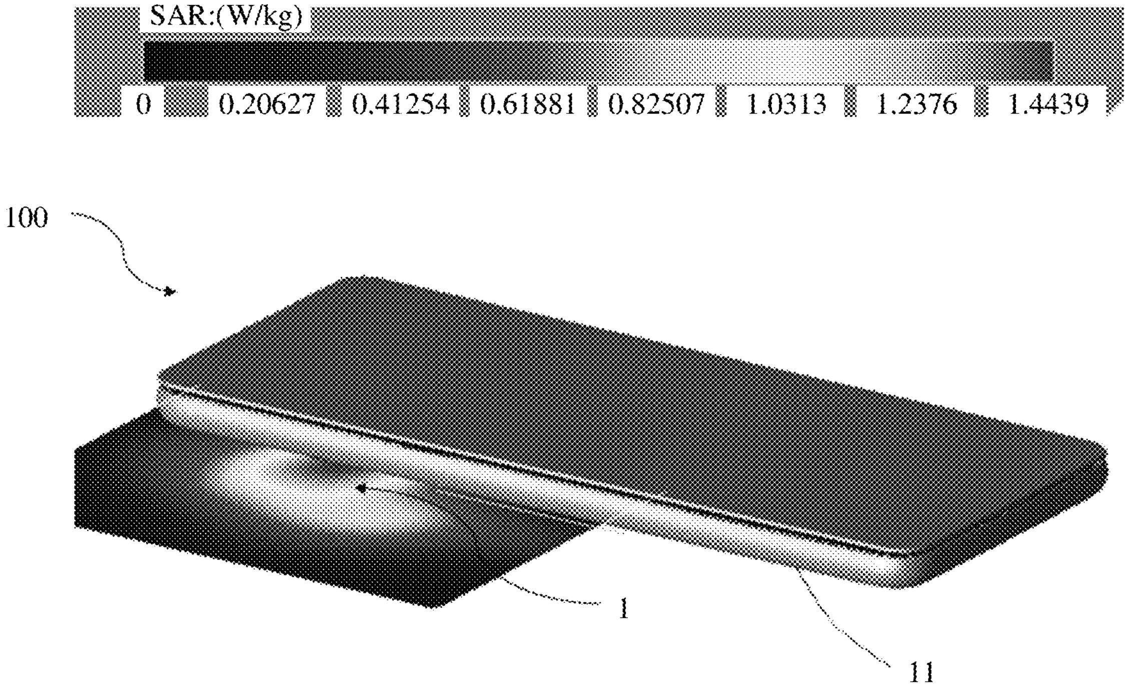
FIG. 22*e* is a schematic diagram of SAR hotspot distribution of the composite antenna shown in FIG. 19 under resonance "2"

FIG. 22*e* is a schematic diagram of SAR hotspot distribution of the composite antenna shown in FIG. 19 under resonance "2". FIG. 22*e* shows an SAR value measured at a distance of 5 mm from a human body tissue to the rear cover 11. For resonance "2" (5.34 GHz), an SAR hotspot appears at 5 mm away from the rear cover 11 (FIG. 22*e* simply shows the SAR hotspot by using an arrow 1).

It may be understood that, when the composite antenna is under resonance "2", a direction of a third current on the second strip-shaped conductor 51 is opposite to a direction of a fourth current on the third strip-shaped conductor 52. In addition, because the second strip-shaped conductor 51 and the third strip-shaped conductor 52 are symmetrical with respect to the first ground part B, current intensity of the third current is the same as current intensity of the fourth current. It may be understood that, better symmetry between the second strip-shaped conductor 51 and the third strip-shaped conductor 52 indicates that the current intensity of the third current is closer to the current intensity of the fourth current. In this case, magnetic fields on two sides of the first ground part B are mutually weakened, and energy of radiated electromagnetic waves is relatively dispersed. Therefore, even though the SAR hotspot appears in the composite antenna under resonance "2", an SAR value under resonance "2" (4.78 GHz) is also relatively low. It may be understood that a closer current intensity between the third current and the fourth current indicates a lower SAR value under resonance "2" (4.78 GHz).

In addition, in this implementation, an area of an overlapping region among the first projection S1, the second projection S2, and the third projection S3 is 8 square millimeters. Feeding of the second strip-shaped conductor 51 through the first strip-shaped conductor 41 is better, and feeding of the third strip-shaped conductor 52 through the first strip-shaped conductor 41 is better. In this case, the third current on the second strip-shaped conductor 51 can flow well into the circuit board 30 through the first ground part B, and the fourth current on the third strip-shaped conductor 52 can flow well into the circuit board 30 through the first ground part B. In this way, current intensity on the second strip-shaped conductor 51 and the third strip-shaped conductor 52 is greatly reduced. In this case, strength of magnetic fields generated by the second strip-shaped conductor 51 and the third strip-shaped conductor 52 is also relatively small, and an SAR value under resonance "2" (5.34 GHz) is relatively low.

In addition, Table 5 shows SAR values of the electronic device 100 using the composite antenna provided in the fifth implementation.

TABLE 5

| Mode | Resonance "1" (3.78 GHz) | Resonance "2" (5.34 GHz) |
|---|---|---|
| SAR value at 5 mm away from the rear cover | 0.92 | 1.44 |
| SAR value at 5 mm away from the rear cover (normalized at −5 dB) | 0.46 | 0.6 |

Table 5 shows SAR values based on the (10 g, average) standard. It can be seen that, when output power is 24 dBm, the SAR value of the electronic device 100 using the composite antenna provided in the fifth implementation at 5 mm away from the rear cover, regardless of resonance "1" or resonance "2", is relatively low on the whole. When efficiency is normalized to −5 dB, advantages of the composite antenna provided in the fifth implementation in terms of a low SAR value are more obvious. Regardless of resonance “1” or resonance “2”, the SAR value at 5 mm away from the rear cover is less than 0.7.

In this implementation, according to the antenna design solution provided in the fifth implementation, a composite antenna of a slot antenna and a wire antenna is designed, so that under feeding, the composite antenna separately excites two resonance modes (a slot antenna differential mode and a wire antenna common mode). In addition to implementing wide-band coverage, SAR values of the two modes may be low, and one of the resonance modes can generate two SAR hotspots.

It may be understood that, for a disposing manner of the second strip-shaped conductor 51 in this implementation, refer to the disposing manner of the second strip-shaped conductor 51 in the second implementation. For a disposing manner of the third strip-shaped conductor 52 in this implementation, refer to the disposing manner of the third strip-shaped conductor 52 in the second implementation. Details are not described herein again.

Figure 23:
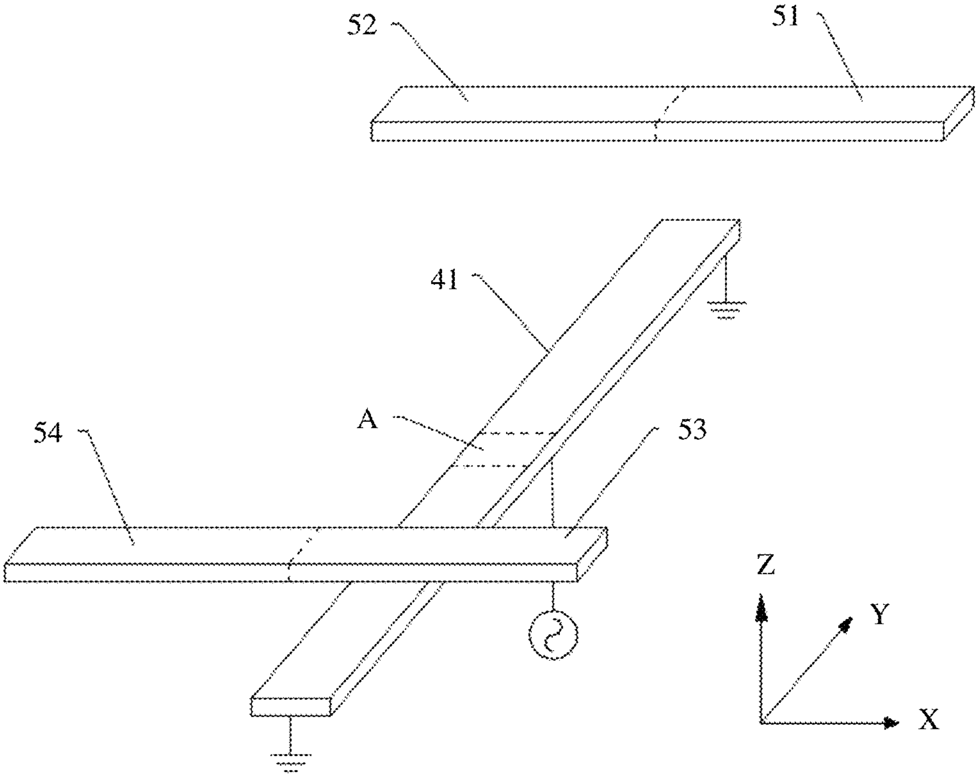
FIG. 23 is a schematic diagram of a partial structure of still another implementation of a composite antenna of the electronic device shown in FIG. 1.

In a sixth implementation, technical content that is the same as that in the first implementation to the fifth implementation is not described again. FIG. 23 is a schematic diagram of a partial structure of a still another implementation of a composite antenna of the electronic device shown in FIG. 1. The electronic device 100 further includes a fourth strip-shaped conductor 53 and a fifth strip-shaped conductor 54. The fourth strip-shaped conductor 53 is located on a side that is of the feeding part A and that is away from the second strip-shaped conductor 51. The fifth strip-shaped conductor 54 is located on a side that is of the feeding part A and that is away from the third strip-shaped conductor 52.

Figure 24:
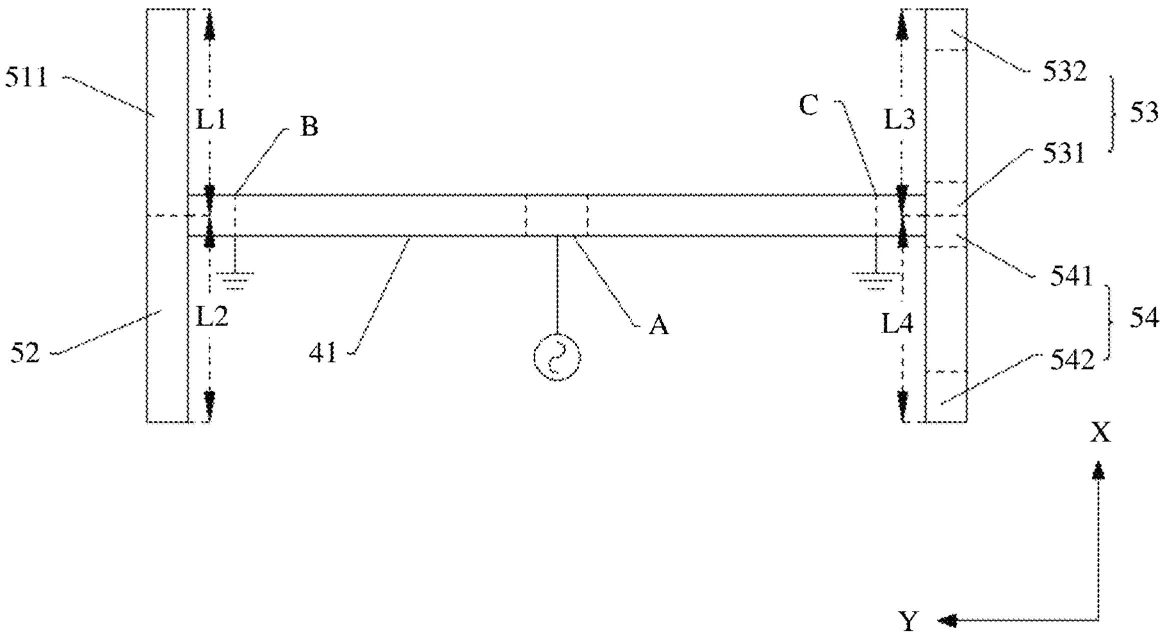
FIG. 24 is a schematic diagram of a structure of the composite antenna shown in FIG. 23 from another perspective.

FIG. 24 is a schematic diagram of a structure of the composite antenna shown in FIG. 23 from another perspective. The fourth strip-shaped conductor 53 includes a first end 531 and a second end 532 disposed away from the first end 531. In addition, the fifth strip-shaped conductor 54 includes a first end 541 and a second end 542 disposed away from the first end 541. The first end 531 of the fourth strip-shaped conductor 53 is connected to the first end 541 of the fifth strip-shaped conductor 54.

In addition, the first end 531 of the fourth strip-shaped conductor 53 and the first end 541 of the fifth strip-shaped conductor 54 are electrically connected to the second ground part C of the first strip-shaped conductor 41 together. It may be understood that, that the first end 531 of the fourth strip-shaped conductor 53 and the first end 541 of the fifth strip-shaped conductor 54 are electrically connected to the second ground part C together includes two implementations: In a first implementation, the first end 531 of the fourth strip-shaped conductor 53 and the first end 541 of the fifth strip-shaped conductor 54 are jointly disposed at an interval from the second ground part C, that is, in a Z-axis direction, there is a height difference between the fourth strip-shaped conductor 53 and the first strip-shaped conductor 41, and there is a height difference between the fifth strip-shaped conductor 54 and the first strip-shaped conductor 41. In this case, a radio frequency signal can be fed to the first end 531 of the fourth strip-shaped conductor 53 and the first end 541 of the fifth strip-shaped conductor 54 at the second ground part C of the first strip-shaped conductor 41 through magnetic field coupling. In a second implementation, the first end 531 of the fourth strip-shaped conductor 53 and the first end 541 of the fifth strip-shaped conductor 54 are jointly connected to the second ground part C of the first strip-shaped conductor 41, that is, in a Z-axis direction, the fourth strip-shaped conductor 53, the fifth strip-shaped conductor 54, and the first strip-shaped conductor 41 are disposed on a same layer. In this case, a radio frequency signal can be fed to the first end 531 of the fourth strip-shaped conductor 53 and the first end 541 of the fifth strip-shaped conductor 54 through the second ground part C. In this implementation, the first implementation is used as an example for description.

In addition, the second end 532 of the fourth strip-shaped conductor 53 is an open end, that is, the second end 532 of the fourth strip-shaped conductor 53 is not grounded. The second end 542 of the fifth strip-shaped conductor 54 is an open end, that is, the second end 542 of the fifth strip-shaped conductor 54 is not grounded.

In this implementation, for a center distance between the first ground part B and the feeding part A and a center distance between the second ground part C and the feeding part A, refer to a relationship between the first value d1 and the second value d2 in the first implementation. Details are not described herein again.

In addition, a length of the second strip-shaped conductor 51 is a first length L1. A length of the third strip-shaped conductor 52 is a second length L2. The first length L1 is equal to the second length L2. It may be understood that, when there is a tolerance and an error, within an allowable range, the first length L1 may be slightly greater than the second length L2, or slightly less than the second length L2. In other words, the first length L1 is approximately equal to the second length L2.

In addition, a length of the fourth strip-shaped conductor 53 is a third length L3. A length of the fifth strip-shaped conductor 54 is a fourth length L4. The third length L3 is equal to the fourth length L4. It may be understood that, when there is a tolerance and an error, within an allowable range, the third length L3 may be slightly greater than the fourth length L4, or slightly less than the fourth length L4. In other words, the third length L3 is approximately equal to the fourth length L4.

In this implementation, a sum of the first length L1 and the second length L2 is equal to a sum of the third length L3 and the fourth length L4.

Figure 25:
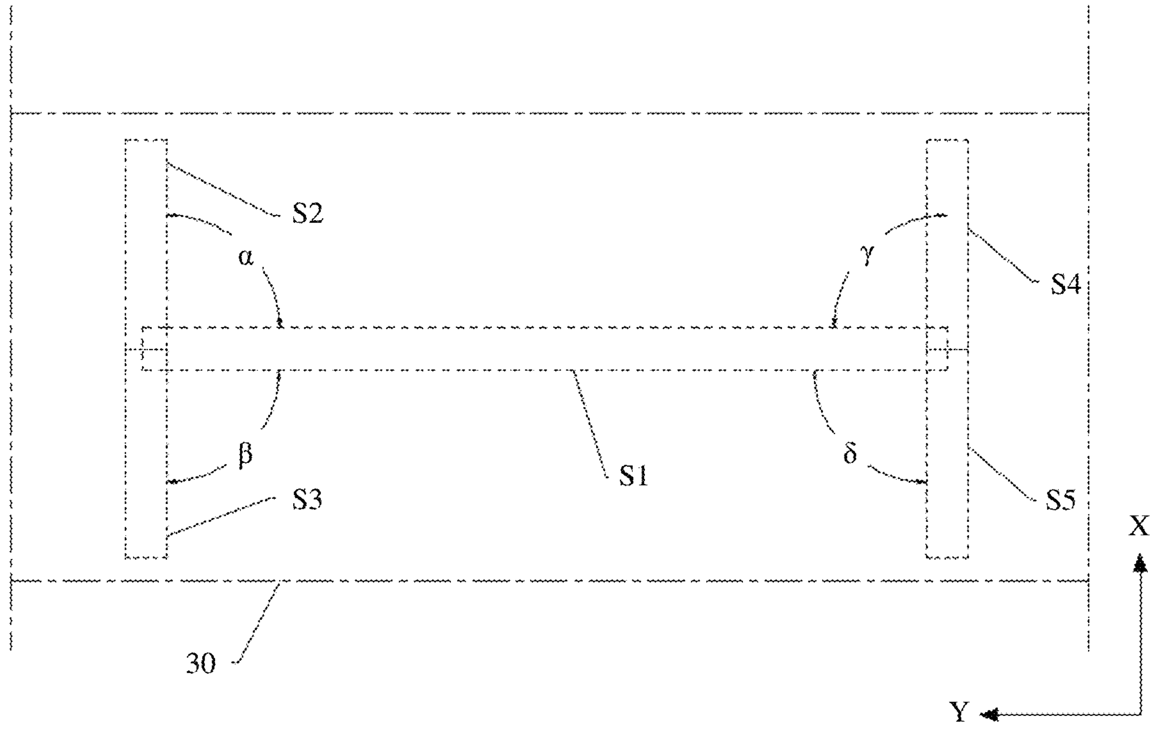
FIG. 25 is a schematic diagram of projections of the first strip-shaped conductor, the second strip-shaped conductor, and the third strip-shaped conductor shown in FIG. 23 on a circuit board.

With reference to FIG. 24, FIG. 25 is a schematic diagram of projections of the first strip-shaped conductor, the second strip-shaped conductor, and the third strip-shaped conductor shown in FIG. 23 on a circuit board. For disposing manners of the projection S1 of the first strip-shaped conductor 41 on the board surface of the circuit board 30, the projection S2 of the second strip-shaped conductor 51 on the board surface of the circuit board 30, and the projection S3 of the third strip-shaped conductor 52 on the board surface of the circuit board 30, refer to disposing manners of the first projection S1, the second projection S2, and the third projection S3 in the fifth implementation. Details are not described herein again.

In addition, a projection of the fourth strip-shaped conductor 53 on the board surface of the circuit board 30 is a fourth projection S4. An included angle between the fourth projection S4 and the first projection S1 is γ. In this implementation, γ is equal to 90°. In another implementation, γ may alternatively be equal to 30°, 60°, 125°, 150°, or 200°.

In an implementation, γ is within a range from 0° to 180°.

In addition, a projection of the fifth strip-shaped conductor 54 on the board surface of the circuit board 30 is a fifth projection S5. An included angle between the fifth projection S5 and the first projection S1 is δ. In this implementation, δ is equal to 90°. In another implementation, δ may alternatively be within a range from 0° to 180°. For example, 6 may alternatively be equal to 30°, 60°, 125°, 150°, or 170°.

In an implementation, δ is within a range from 0° to 180°.

In this way, in this implementation, the fourth strip-shaped conductor 53 and the fifth strip-shaped conductor 54 are symmetrical with respect to the second ground part C. In addition, the second strip-shaped conductor 51 and the third strip-shaped conductor 52 are symmetrical with respect to the feeding part A, the fourth strip-shaped conductor 53, and the fifth strip-shaped conductor 54.

In addition, an area of an overlapping region among the first projection S1, the fourth projection S4, and the fifth projection S5 is within a range from 0 square millimeters to 16 square millimeters. For example, the area of the overlapping region is 0 millimeters, 3 millimeters, 7 millimeters, 10 millimeters, or 12 millimeters. In this implementation, the area of the overlapping region among the first projection S1, the fourth projection S4, and the fifth projection S5 is 8 square millimeters. It may be understood that FIG. 25 merely schematically shows that the overlapping region among the first projection S1, the fourth projection S4, and the fifth projection S5 is in a rectangle shape. However, when shapes of the first strip-shaped conductor 41, the fourth strip-shaped conductor 53, and the fifth strip-shaped conductor 54 change, the overlapping region among the first projection S1, the fourth projection S4, and the fifth projection S5 may alternatively be in another shape, for example, an irregular pattern or a trapezoid.

In another implementation, the area of the overlapping region among the first projection S1, the fourth projection S4, and the fifth projection S5 may not be within a range from 0 square millimeters to 16 square millimeters.

The following describes simulation of the composite antenna provided in the sixth implementation with reference to the accompanying drawings.

Figure 26A:
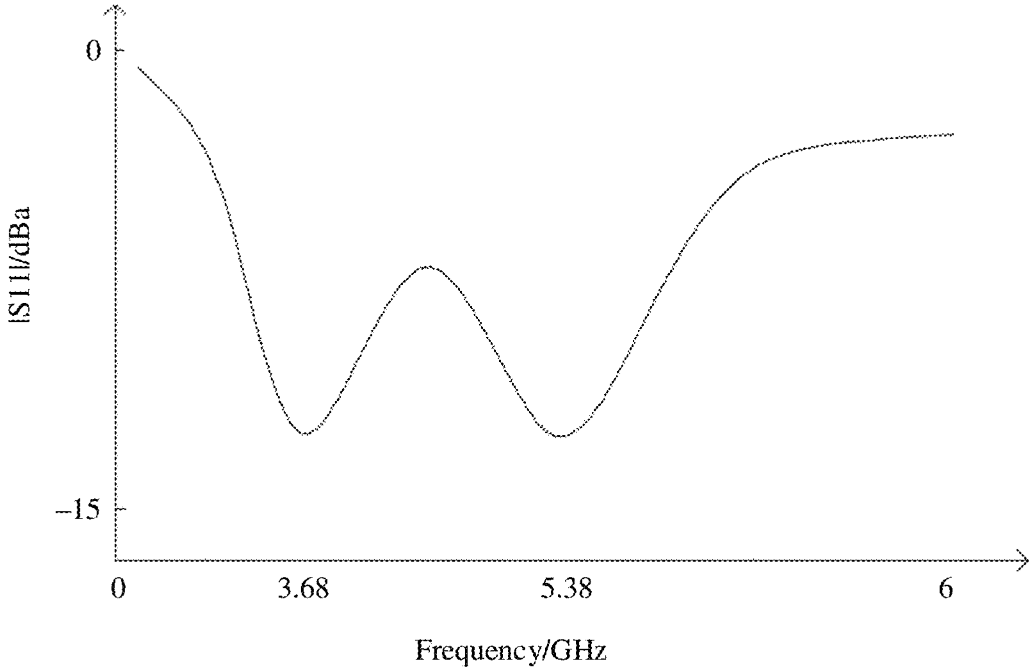
FIG. 26*a* is a diagram of a relationship between a reflection coefficient and a frequency of the composite antenna shown in FIG. 23 in a frequency band of 3 GHz to 6 GHz.

FIG. 26*a* is a diagram of a relationship between a reflection coefficient and a frequency of the composite antenna shown in FIG. 23 in a frequency band of 3 GHz to 6 GHz. The composite antenna may generate two resonances at 3 GHz to 6 GHz: resonance "1" (3.68 GHz) and resonance "2" (5.38 GHz). Resonance "1" is generated by a slot antenna differential mode of the composite antenna. Resonance "2" is generated by a wire antenna common mode of the composite antenna. It may be understood that, in addition to a 3.68 GHz to 5.38 GHz frequency band shown in FIG. 26*a*, the composite antenna in this implementation may further generate a resonance in another frequency band (for example, 0 GHz to 3 GHz, 6 GHz to 8 GHz, or 8 GHz to 11 GHz). Specifically, another resonance may be set by adjusting a size of the first strip-shaped conductor 41, a size of the second strip-shaped conductor 51, a size of the third strip-shaped conductor 52, a size of the fourth strip-shaped conductor 53, and a size of the fifth strip-shaped conductor 54, or adjusting the sizes of the first strip-shaped conductor 41, the second strip-shaped conductor 51, the third strip-shaped conductor 52, the fourth strip-shaped conductor 53, and the fifth strip-shaped conductor 54 at the same time.

Figure 26B:
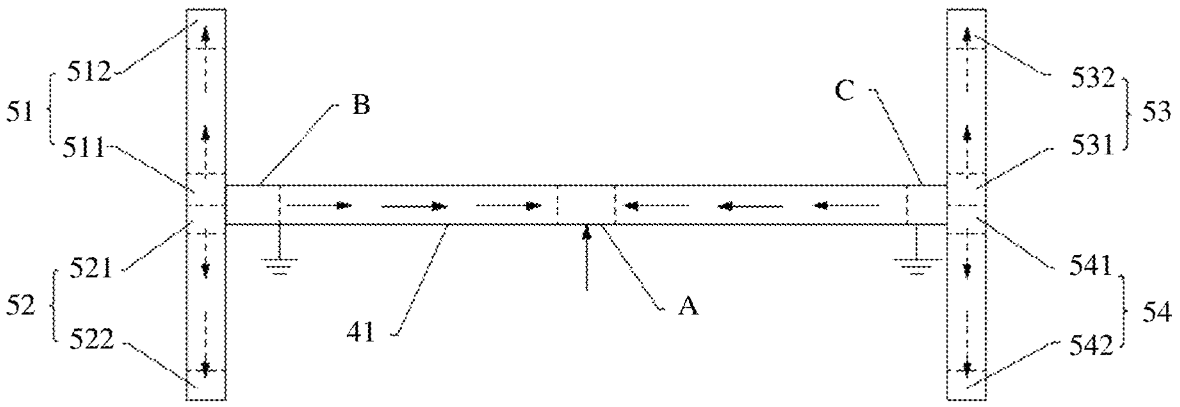
FIG. 26*b* is a schematic diagram of a flow direction of a current of the composite antenna shown in FIG. 23 under resonance "i"
Figure 26C:
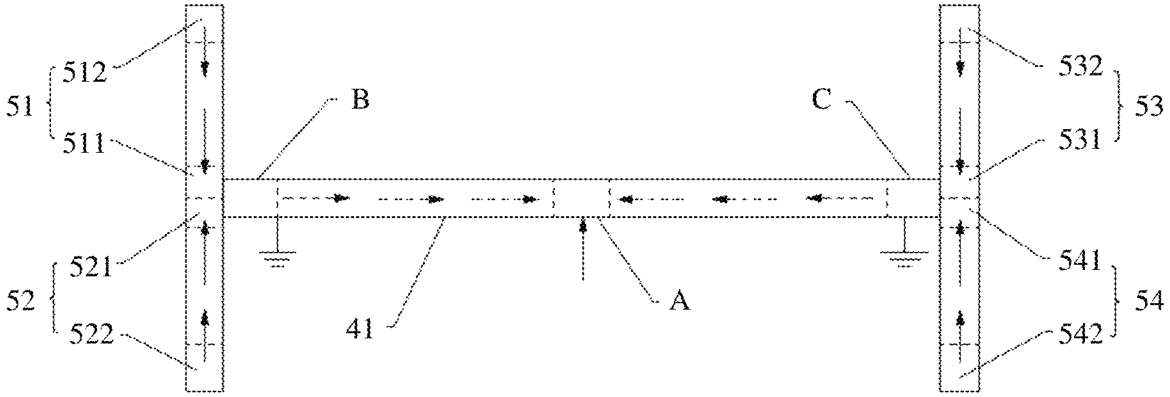
FIG. 26*c* is a schematic diagram of a flow direction of a current of the antenna shown in FIG. 23 under resonance "2"

With reference to FIG. 26*b* and FIG. 26*c*, the following specifically describes currents under the two resonances of the composite antenna: current distributions under resonance "1" (3.68 GHz) and resonance "2" (5.38 GHz). FIG. 26*b* is a schematic diagram of a flow direction of a current of the composite antenna shown in FIG. 23 under resonance "i". FIG. 26*c* is a schematic diagram of a flow direction of a current of the antenna shown in FIG. 23 under resonance "2".

Refer to FIG. 26*b*. Current distribution under resonance "1" (3.68 GHz) includes a first current flowing from the first ground part B to the feeding part A and a second current flowing from the second ground part C to the feeding part A on the first strip-shaped conductor 41, a third current flowing from the first end 511 of the second strip-shaped conductor 51 to the second end 512 of the second strip-shaped conductor 51 on the second strip-shaped conductor 51, a fourth current flowing from the first end 521 of the third strip-shaped conductor 52 to the second end 522 of the third strip-shaped conductor 52 on the third strip-shaped conductor 52, a fifth current flowing from the first end 531 of the fourth strip-shaped conductor 53 to the second end 532 of the fourth strip-shaped conductor 53 on the fourth strip-shaped conductor 53, and a sixth current flowing from the first end 541 of the fifth strip-shaped conductor 54 to the second end 542 of the fifth strip-shaped conductor 54 on the fifth strip-shaped conductor 54. Current intensity of the first strip-shaped conductor 41 is greater than current intensity of the second strip-shaped conductor 51, the third strip-shaped conductor 52, the fourth strip-shaped conductor 53, and the fifth strip-shaped conductor 54. In this way, the current under resonance "1" (3.68 GHz) is mainly a current on the first strip-shaped conductor 41. In addition, the current under resonance "1" (3.68 GHz) is a current in the slot antenna differential mode.

Refer to FIG. 26*c*. Current distribution under resonance "2" (5.38 GHz) includes a first current flowing from the first ground part B to the feeding part A and a second current flowing from the second ground part C to the feeding part A on the first strip-shaped conductor 41, a third current flowing from the second end 512 of the second strip-shaped conductor 51 to the first end 511 of the second strip-shaped conductor 51 on the second strip-shaped conductor 51, a fourth current flowing from the second end 522 of the third strip-shaped conductor 52 to the first end 521 of the third strip-shaped conductor 52 on the third strip-shaped conductor 52, a fifth current flowing from the second end 532 of the fourth strip-shaped conductor 53 to the first end 531 of the fourth strip-shaped conductor 53 on the fourth strip-shaped conductor 53, and a sixth current flowing from the second end 542 of the fifth strip-shaped conductor 54 to the first end 541 of the fifth strip-shaped conductor 54 on the fifth strip-shaped conductor 54. Current intensity of the first strip-shaped conductor 41 is less than current intensity of the second strip-shaped conductor 51, the third strip-shaped conductor 52, the fourth strip-shaped conductor 53, and the fifth strip-shaped conductor 54. In this way, the current under resonance "2" (5.38 GHz) is mainly currents on the second strip-shaped conductor 51, the third strip-shaped conductor 52, the fourth strip-shaped conductor 53, and the fifth strip-shaped conductor 54. The current under resonance "2" (5.38 GHz) is a current in the wire antenna common mode.

Figure 26D:
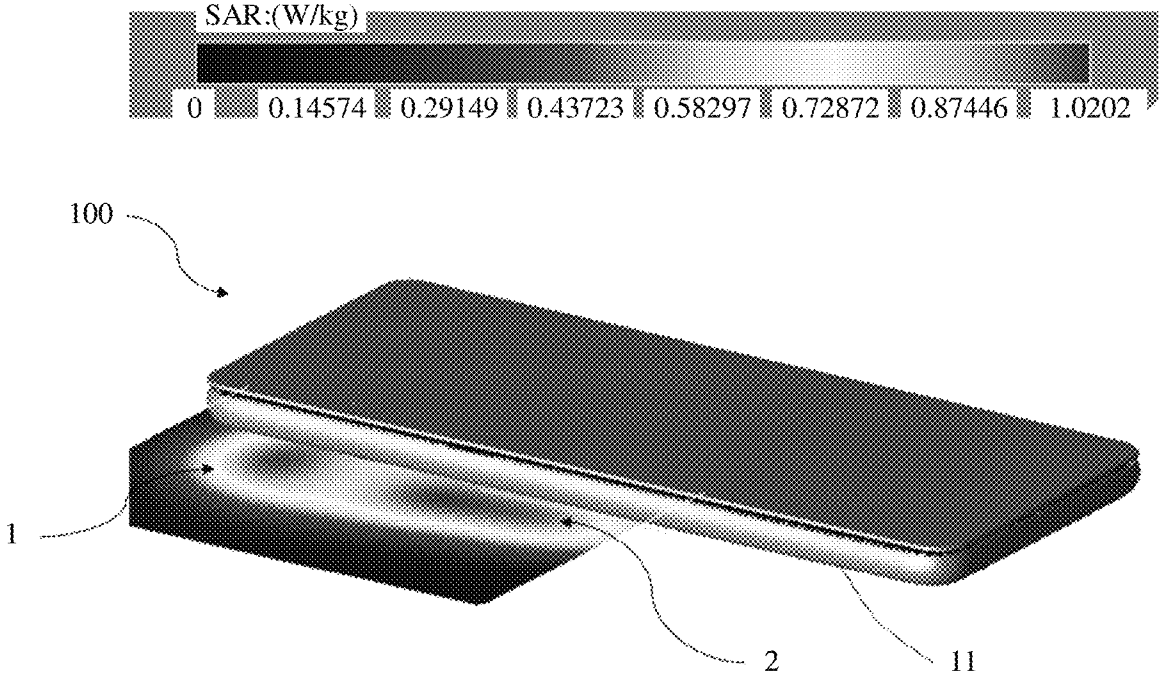
FIG. 26*d* is a schematic diagram of SAR hotspot distribution of the composite antenna shown in FIG. 23 under resonance "1"

FIG. 26*d* is a schematic diagram of SAR hotspot distribution of the composite antenna shown in FIG. 23 under resonance "1". FIG. 26*d* shows an SAR value measured at a distance of 5 mm from a human body tissue to the rear cover 11. For resonance "1" (3.68 GHz), two SAR hotspots appear at 5 mm away from the rear cover 11 (FIG. 26*d* simply shows the two SAR hotspots by using an arrow 1 and an arrow 2).

It may be understood that, under resonance "1" of the composite antenna, directions of the first current and the second current on the first strip-shaped conductor 41 are opposite. In addition, because the first strip-shaped conductor 41 is in a symmetric pattern shape, current intensity of the first current is the same as current intensity of the second current. In this way, phases of magnetic fields at the feeding part A are opposite, and amplitudes of the magnetic fields are approximately offset. In this way, the magnetic fields are mainly distributed on two sides of the feeding part A, and two SAR hotspots are formed on the two sides of the feeding part A. In this case, energy of radiated electromagnetic waves is relatively dispersed, and therefore, an SAR value under resonance "1" (3.68 GHz) is relatively low.

Figure 26E:
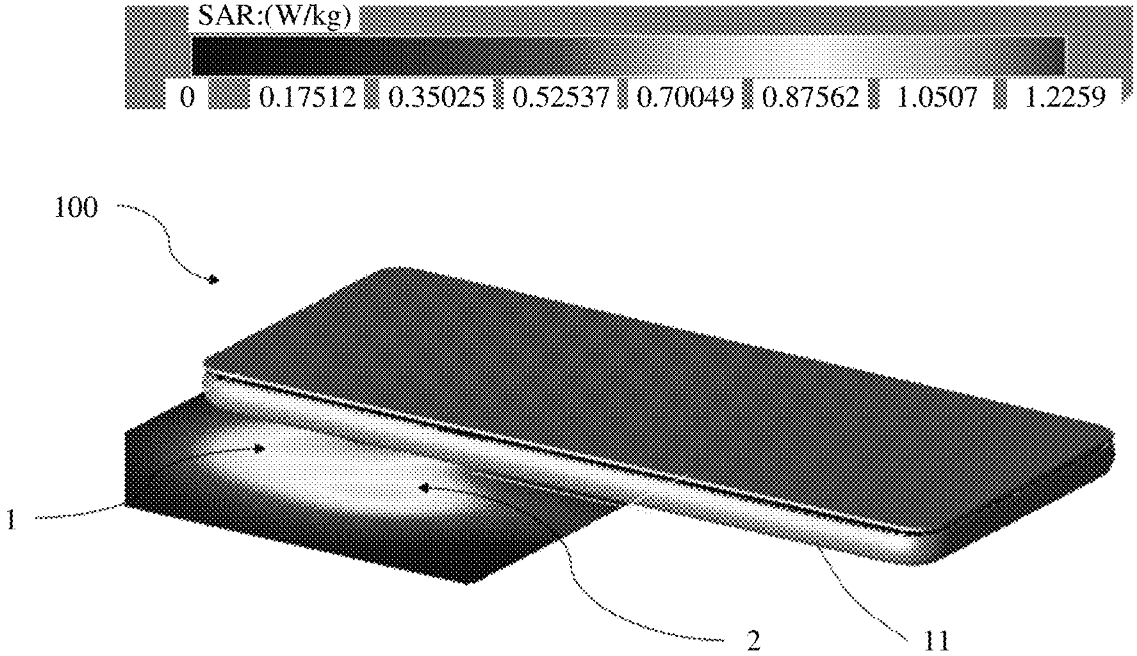
FIG. 26*e* is a schematic diagram of SAR hotspot distribution of the composite antenna shown in FIG. 23 under resonance "2"

FIG. 26e is a schematic diagram of SAR hotspot distribution of the composite antenna shown in FIG. 23 under resonance "2". FIG. 26e shows an SAR value measured at a distance of 5 mm from a human body tissue to the rear cover 11. For resonance "2" (5.38 GHz), two SAR hotspots also appear at 5 mm away from the rear cover 11 (FIG. 26e simply shows the two SAR hotspots by using an arrow 1 and an arrow 2).

It may be understood that, when the composite antenna is under resonance "2", a direction of a third current on the second strip-shaped conductor 51 is opposite to a direction of a fourth current on the third strip-shaped conductor 52, and a direction of a fifth current on the fourth strip-shaped conductor 53 is opposite to a direction of a sixth current on the fifth strip-shaped conductor 54. In addition, because the second strip-shaped conductor 51 and the third strip-shaped conductor 54 are symmetrical with respect to the first ground part B, current intensity of the third current is the same as current intensity of the fourth current. In addition, because the fourth strip-shaped conductor 53 and the fifth strip-shaped conductor 54 are symmetrical with respect to the second ground part C, current intensity of the fifth current is the same as current intensity of the sixth current. In addition, the second strip-shaped conductor 51 and the third strip-shaped conductor 52 are symmetrical with respect to the feeding part A, the fourth strip-shaped conductor 53, and the fifth strip-shaped conductor 54. In this case, phases of magnetic fields at the feeding part A are opposite, and amplitudes of the magnetic fields are approximately offset. In this way, the magnetic fields are mainly distributed on two sides of the feeding part A, and two SAR hotspots are formed on the two sides of the feeding part A. In this case, energy of radiated electromagnetic waves is relatively dispersed, and an SAR value under resonance "2" (5.38 GHz) is also relatively low.

In addition, an area of an overlapping region among the first projection S1, the second projection S2, and the third projection S3 is 8 square millimeters. Feeding of the second strip-shaped conductor 51 through the first strip-shaped conductor 41 is better, and feeding of the third strip-shaped conductor 52 through the first strip-shaped conductor 41 is better. In this case, both the third current and the fourth current can well flow into the circuit board 30 through the first ground part B. In addition, an area of an overlapping region among the first projection S1, the fourth projection S4, and the fifth projection S5 is 8 square millimeters. Feeding of the fourth strip-shaped conductor 53 through the first strip-shaped conductor 41 is better, and feeding of the fifth strip-shaped conductor 54 through the first strip-shaped conductor 41 is better. In this case, both the fifth current and the sixth current can well flow into the circuit board through the second ground part C. In this way, current intensity on the second strip-shaped conductor 51, the third strip-shaped conductor 52, the fourth strip-shaped conductor 53, and the fifth strip-shaped conductor 54 is greatly reduced. In this case, strength of magnetic fields generated by the second strip-shaped conductor 51, the third strip-shaped conductor 52, the fourth strip-shaped conductor 53, and the fifth strip-shaped conductor 54 is also relatively small, and an SAR value under resonance "2" (5.38 GHz) is also relatively low.

In addition, Table 6 shows SAR values of the electronic device 100 using the composite antenna provided in the sixth implementation.

TABLE 6

| Mode | Resonance "1" (3.68 GHz) | Resonance "2" (5.38 GHz) |
|---|---|---|
| SAR value at 5 mm away from the rear cover | 1.02 | 1.23 |
| SAR value at 5 mm away from the rear cover (normalized at −5 dB) | 0.41 | 0.42 |

Table 1 shows SAR values based on the (log, average) standard. It can be seen that, when output power is 24 dBm, the SAR value of the electronic device 100 using the composite antenna provided in the sixth implementation at 5 mm away from the rear cover, regardless of resonance "1" or resonance "2", is relatively low on the whole. When efficiency is normalized to −5 dB, advantages of the composite antenna provided in the sixth implementation in terms of a low SAR value are more obvious. Regardless of resonance "1" or resonance "2", the SAR value at 5 mm away from the rear cover is less than 0.5.

In this implementation, according to the antenna design solution provided in the sixth implementation, a composite antenna of a slot antenna and a wire antenna is designed, so that under feeding, the composite antenna separately excites two resonance modes (a slot antenna differential mode and a wire antenna common mode). In addition to implementing wide-band coverage, two SAR hotspots can appear in both the modes, and SAR values of the two modes are relatively low.

It may be understood that, for a disposing manner of the second strip-shaped conductor 51 in this implementation, refer to the disposing manner of the second strip-shaped conductor 51 in the second implementation. For a disposing manner of the third strip-shaped conductor 52 in this implementation, refer to the disposing manner of the third strip-shaped conductor 52 in the second implementation. Details are not described herein again.

In another implementation, the first end 531 of the fourth strip-shaped conductor 53 is connected to the second ground part C of the first strip-shaped conductor 41. The first end 541 of the fifth strip-shaped conductor 54 is connected to the second ground part C of the first strip-shaped conductor 41.

Figure 27:
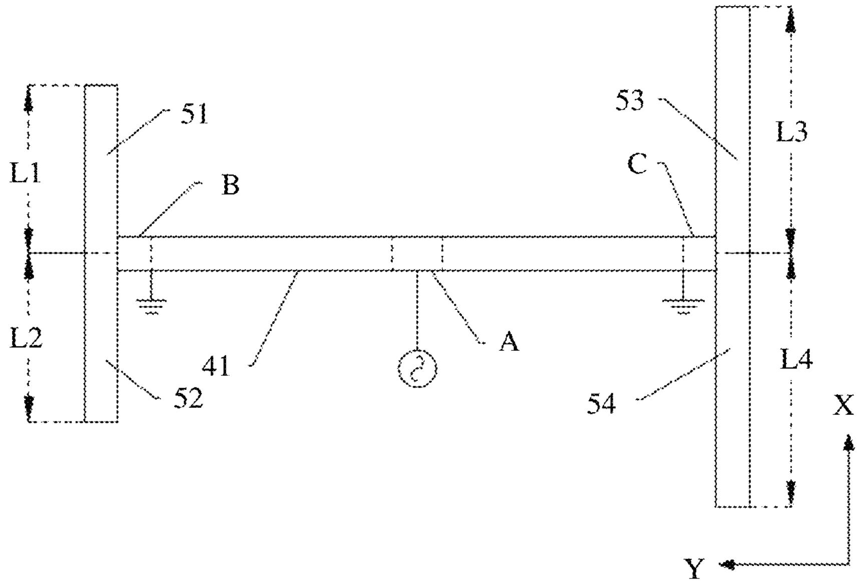
FIG. 27 is a schematic diagram of a partial structure of still another implementation of a composite antenna of the electronic device shown in FIG. 1.

In a seventh implementation, technical content that is same as that in the first implementation to the sixth implementation is not described again. FIG. 27 is a schematic diagram of a partial structure of a still another implementation of a composite antenna of the electronic device shown in FIG. 1. A length of the second strip-shaped conductor 51 is a first length L1. A length of the third strip-shaped conductor 52 is a second length L2. The first length L1 is equal to the second length L2. A length of the fourth strip-shaped conductor 53 is a third length L3. A length of the fifth strip-shaped conductor 54 is a fourth length L4. The third length L3 is equal to the fourth length L4. In addition, a sum of the first length L1 and the second length L2 is less than a sum of the third length L3 and the fourth length L4.

The following describes simulation of the composite antenna provided in the seventh implementation with reference to the accompanying drawings.

Figure 28A:
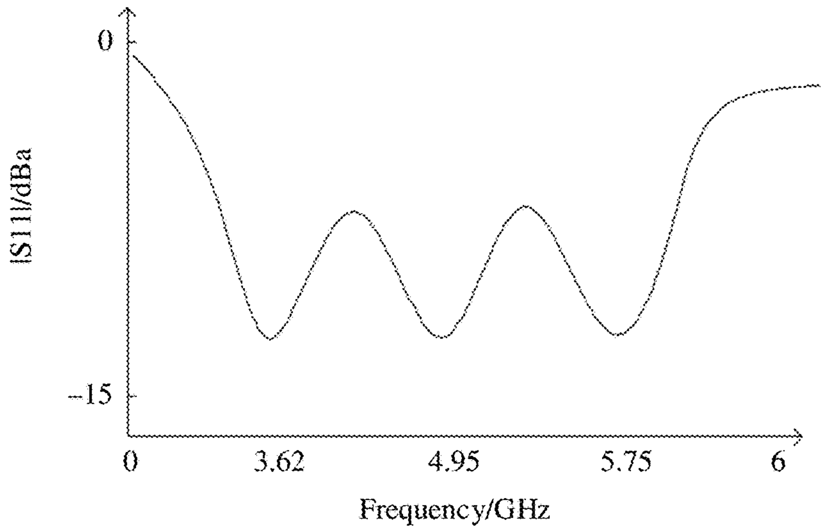
FIG. 28*a* is a diagram of a relationship between a reflection coefficient and a frequency of the composite antenna shown in FIG. 27 in a frequency band of 3 GHz to 6 GHz.

FIG. 28*a* is a diagram of a relationship between a reflection coefficient and a frequency of the composite antenna shown in FIG. 27 in a frequency band of 3 GHz to 6 GHz. The composite antenna may generate three resonances at 3 GHz to 6 GHz: resonance "1" (3.62 GHz), resonance "2" (4.95 GHz), and resonance "3" (5.75 GHz). Resonance "1" is generated by a slot antenna differential mode of the composite antenna. Both resonance "2" and resonance "3" are generated by a wire antenna common mode of the composite antenna. It may be understood that, in addition to a 3.62 GHz to 4.95 GHz to 5.75 GHz frequency band shown in FIG. 28*a*, the composite antenna in this implementation may further generate a resonance in another frequency band (for example, 0 GHz to 3 GHz, 6 GHz to 8 GHz, or 8 GHz to 11 GHz). Specifically, another resonance may be set by adjusting a size of the first strip-shaped conductor 41, a size of the second strip-shaped conductor 51, a size of the third strip-shaped conductor 52, a size of the fourth strip-shaped conductor 53, and a size of the fifth strip-shaped conductor 54, or adjusting the sizes of the first strip-shaped conductor 41, the second strip-shaped conductor 51, the third strip-shaped conductor 52, the fourth strip-shaped conductor 53, and the fifth strip-shaped conductor 54 at the same time.

Figure 28B:
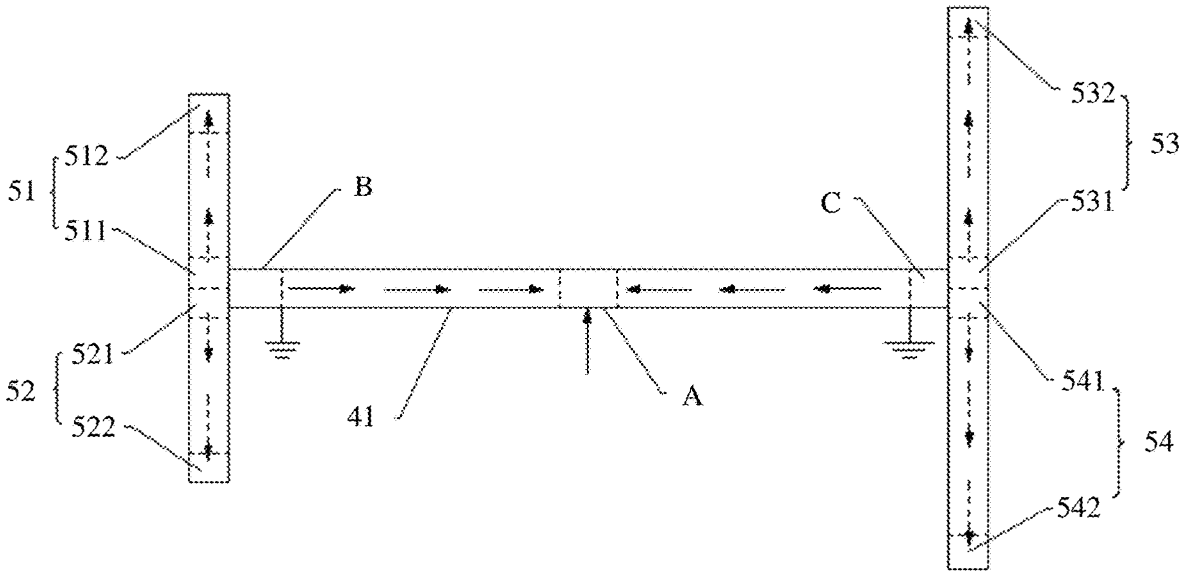
FIG. 28*b* is a schematic diagram of a flow direction of a current of the composite antenna shown in FIG. 27 under resonance "1"
Figure 28C:
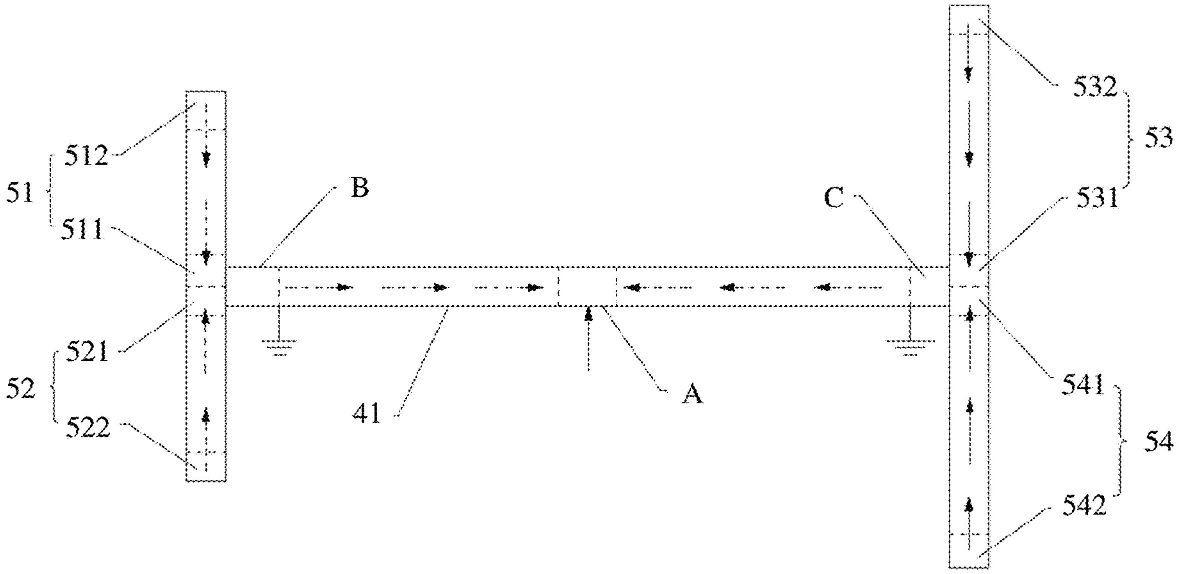
FIG. 28*c* is a schematic diagram of a flow direction of a current of the antenna shown in FIG. 27 under resonance "2"
Figure 28D:
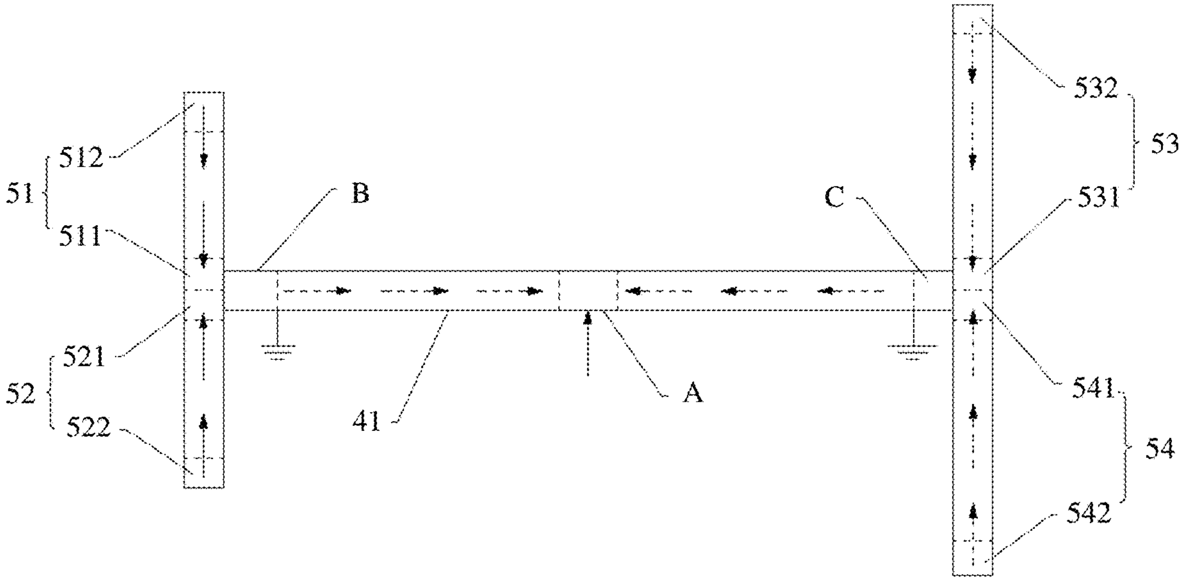
FIG. 28*d* is a schematic diagram of a flow direction of a current of the composite antenna shown in FIG. 27 under resonance "3".

With reference to FIG. 28*b*, FIG. 28*c*, and FIG. 28*d*, the following specifically describes currents under the two resonances of the composite antenna: current distributions under resonance "1" (3.62 GHz), resonance "2" (4.95 GHz), and resonance "3" (5.75 GHz). FIG. 28*b* is a schematic diagram of a flow direction of a current of the composite antenna shown in FIG. 27 under resonance "1". FIG. 28*c* is a schematic diagram of a flow direction of a current of the antenna shown in FIG. 27 under resonance "2". FIG. 28*d* is a schematic diagram of a flow direction of a current of the composite antenna shown in FIG. 27 under resonance "3".

Refer to FIG. 28*b*. Current distribution under resonance "1" (3.62 GHz) includes a first current flowing from the first ground part B to the feeding part A and a second current flowing from the second ground part C to the feeding part A on the first strip-shaped conductor 41, a third current flowing from the first end 511 of the second strip-shaped conductor 51 to the second end 512 of the second strip-shaped conductor on the second strip-shaped conductor 51, a fourth current flowing from the first end 521 of the third strip-shaped conductor 52 to the second end 522 of the third strip-shaped conductor 52 on the third strip-shaped conductor 52, a fifth current flowing from the first end 531 of the fourth strip-shaped conductor 53 to the second end 532 of the fourth strip-shaped conductor 53 on the fourth strip-shaped conductor 53, and a sixth current flowing from the first end 541 of the fifth strip-shaped conductor 54 to the second end 542 of the fifth strip-shaped conductor 54 on the fifth strip-shaped conductor 54. Current intensity of the first strip-shaped conductor 41 is greater than current intensity of the second strip-shaped conductor 51, the third strip-shaped conductor 52, the fourth strip-shaped conductor 53, and the fifth strip-shaped conductor 54. In this way, the current under resonance "1" (3.62 GHz) is mainly a current on the first strip-shaped conductor 41. In addition, the current under resonance "1" (3.62 GHz) is a current in the slot antenna differential mode.

Refer to FIG. 28*c*. Current distribution under resonance "2" (4.95 GHz) includes a first current flowing from the first ground part B to the feeding part A and a second current flowing from the second ground part C to the feeding part A on the first strip-shaped conductor 41, a third current flowing from the second end 512 of the second strip-shaped conductor 51 to the first end 511 of the second strip-shaped conductor 51 on the second strip-shaped conductor 51, a fourth current flowing from the second end 522 of the third strip-shaped conductor 52 to the first end 521 of the third strip-shaped conductor 52 on the third strip-shaped conductor 52, a fifth current flowing from the second end 532 of the fourth strip-shaped conductor 53 to the first end 531 of the fourth strip-shaped conductor 53 on the fourth strip-shaped conductor 53, and a sixth current flowing from the second end 542 of the fifth strip-shaped conductor 54 to the first end 541 of the fifth strip-shaped conductor 54 on the fifth strip-shaped conductor 54. Current intensity of the first strip-shaped conductor 41, the second strip-shaped conductor 51, and the third strip-shaped conductor 52 is less than current intensity of the fourth strip-shaped conductor 53 and the fifth strip-shaped conductor 54. In this way, the current under resonance "2" (4.95 GHz) is mainly a current on the fourth strip-shaped conductor 53 and the fifth strip-shaped conductor 54. The current under resonance "2" (4.95 GHz) is a current in the wire antenna common mode.

Refer to FIG. 28*d*. Current distribution under resonance "3" (5.75 GHz) includes a first current flowing from the first ground part B to the feeding part A and a second current flowing from the second ground part C to the feeding part A on the first strip-shaped conductor 41, a third current flowing from the second end 512 of the second strip-shaped conductor 51 to the first end 511 of the second strip-shaped conductor 51 on the second strip-shaped conductor 51, a fourth current flowing from the second end 522 of the third strip-shaped conductor 52 to the first end 521 of the third strip-shaped conductor 52 on the third strip-shaped conductor 52, a fifth current flowing from the second end 532 of the fourth strip-shaped conductor 53 to the first end 531 of the fourth strip-shaped conductor 53 on the fourth strip-shaped conductor 53, and a sixth current flowing from the second end 542 of the fifth strip-shaped conductor 54 to the first end 541 of the fifth strip-shaped conductor 54 on the fifth strip-shaped conductor 54. Current intensity of the first strip-shaped conductor 41, the fourth strip-shaped conductor 53, and the fifth strip-shaped conductor 54 is less than current intensity of the second strip-shaped conductor 51 and the third strip-shaped conductor 52. In this way, the current under resonance "3" (5.75 GHz) is mainly a current on the second strip-shaped conductor 51 and the third strip-shaped conductor 52. The current under resonance "3" (5.75 GHz) is a current in the wire antenna common mode.

Figure 28E:
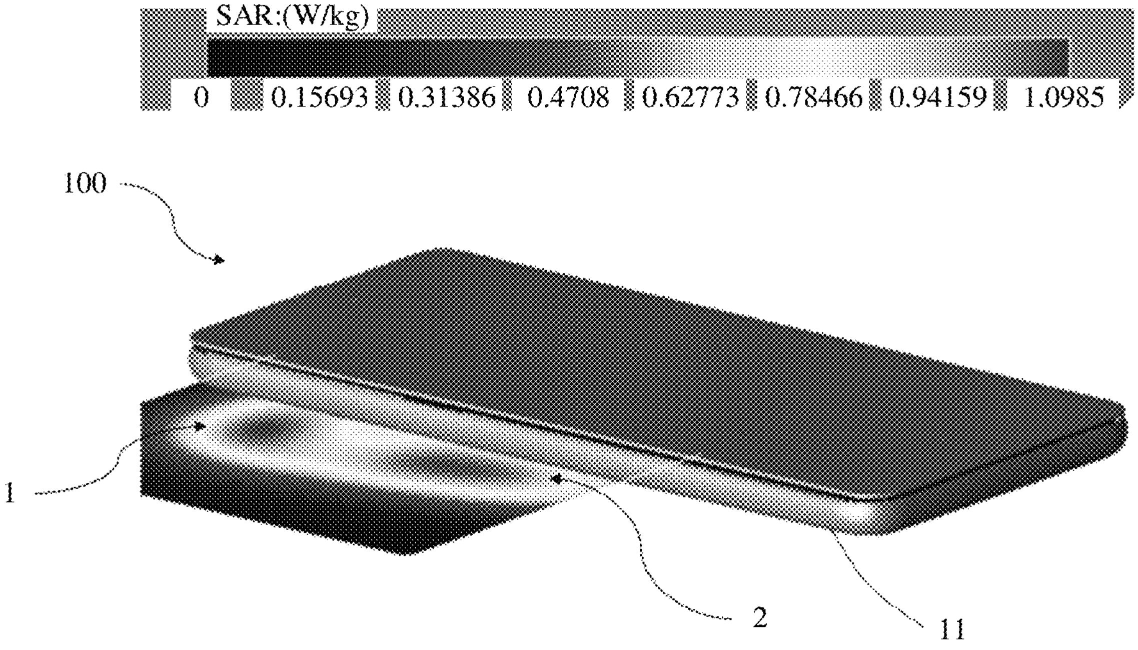
FIG. 28*e* is a schematic diagram of SAR hotspot distribution of the composite antenna shown in FIG. 27 under resonance "1"

FIG. 28*e* is a schematic diagram of SAR hotspot distribution of the composite antenna shown in FIG. 27 under resonance "1". FIG. 28*e* shows an SAR value measured at a distance of 5 mm from a human body tissue to the rear cover 11. For resonance "1" (3.62 GHz), two SAR hotspots appear at 5 mm away from the rear cover 11 (FIG. 28*e* simply shows the two SAR hotspots by using an arrow 1 and an arrow 2). It may be understood that, under resonance "1" of the composite antenna, directions of the first current and the second current on the first strip-shaped conductor 41 are opposite. In addition, because the first strip-shaped conductor 41 is in a symmetric pattern shape, current intensity of the first current is the same as current intensity of the second current. In this case, phases of magnetic fields at the feeding part A are opposite, and amplitudes of the magnetic fields are approximately offset. In this way, the magnetic fields are mainly distributed on two sides of the feeding part A, and two SAR hotspots are formed on the two sides of the feeding part A. In this case, energy of radiated electromagnetic waves is relatively dispersed, and therefore, an SAR value under resonance "1" (3.62 GHz) is relatively low.

Figure 28F:
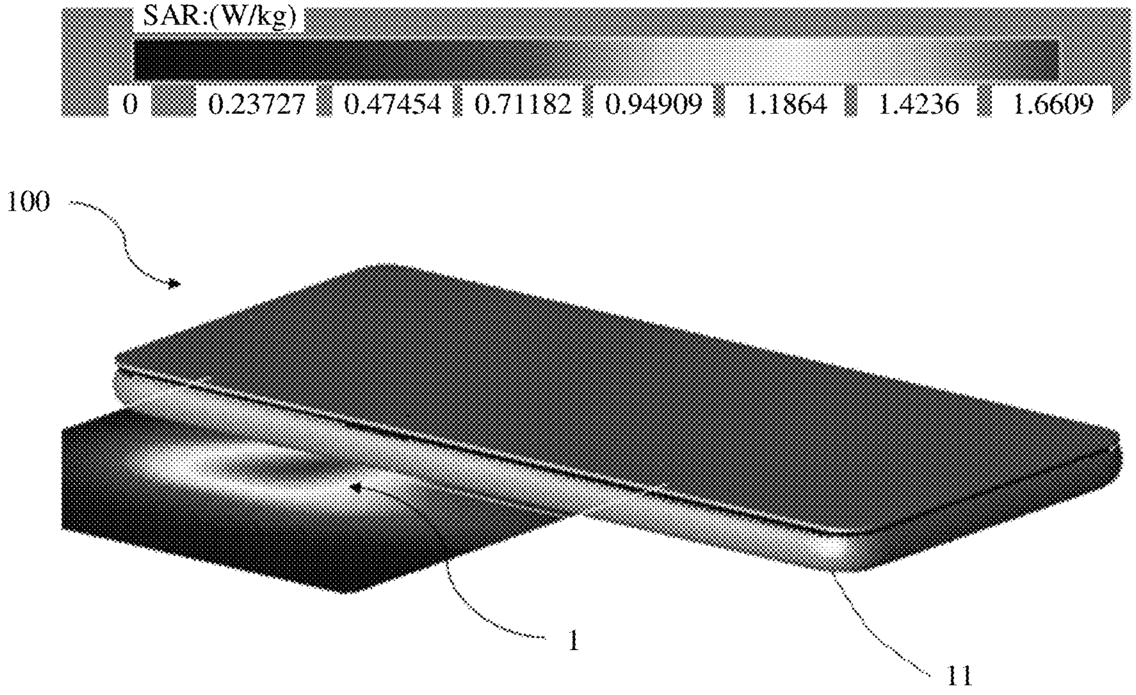
FIG. 28*f* is a schematic diagram of SAR hotspot distribution of the composite antenna shown in FIG. 27 under resonance "2"

FIG. 28*f* is a schematic diagram of SAR hotspot distribution of the composite antenna shown in FIG. 27 under resonance "2". FIG. 28*f* shows an SAR value measured at a distance of 5 mm from a human body tissue to the rear cover 11. For resonance "2" (4.95 GHz), an SAR hotspot also appears at 5 mm away from the rear cover 11 (FIG. 28*f* simply shows the SAR hotspot by using an arrow 1). However, both the fifth current on the fourth strip-shaped conductor 53 and the sixth current on the fifth strip-shaped conductor 54 can well flow into the circuit board 30 through the second ground part C. In this way, current intensity on the fourth strip-shaped conductor 53 and the fifth strip-shaped conductor 54 is greatly reduced. In this case, strength of magnetic fields generated by the fourth strip-shaped conductor 53 and the fifth strip-shaped conductor 54 is also relatively small. Therefore, even though the SAR hotspot appears under resonance "2" (4.95 GHz), an SAR value under resonance "2" is also relatively low.

Figure 28G:
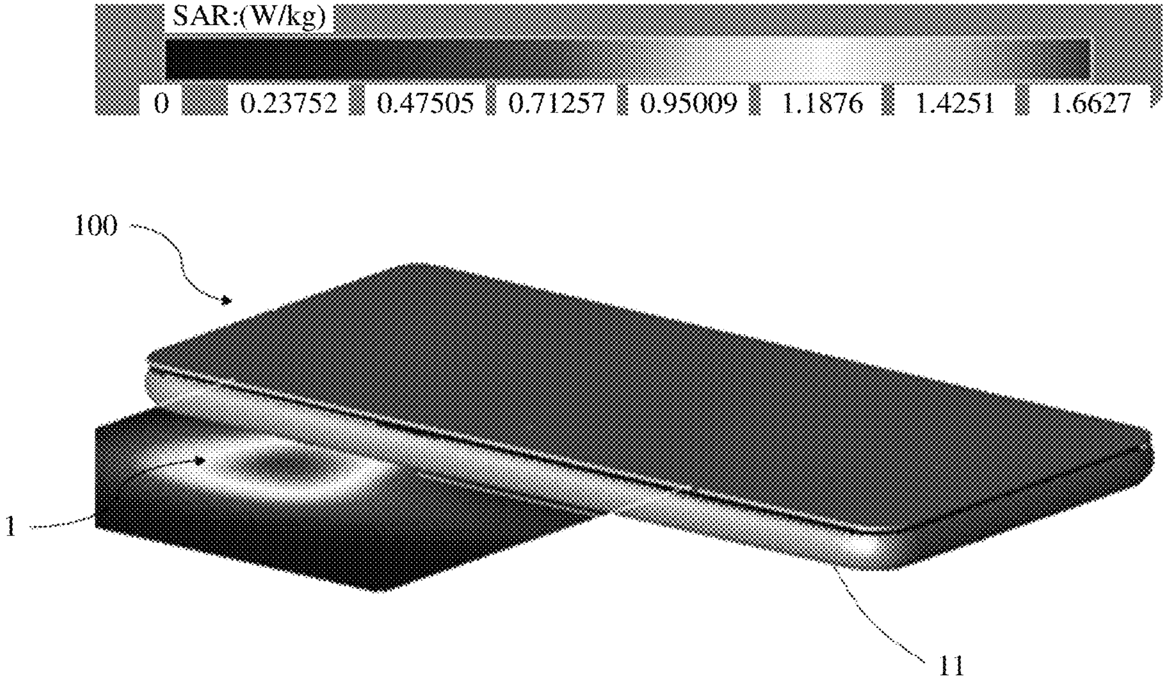
FIG. 28*g* is a schematic diagram of SAR hotspot distribution of the composite antenna shown in FIG. 27 under resonance "3".

FIG. 28*g* is a schematic diagram of SAR hotspot distribution of the composite antenna shown in FIG. 27 under resonance "3". FIG. 28*g* shows an SAR value measured at a distance of 5 mm from a human body tissue to the rear cover 11. For resonance "3" (5.75 GHz), an SAR hotspot also appears at 5 mm away from the rear cover 11 (FIG. 28*g* simply shows the SAR hotspot by using an arrow 1). However, both the third current on the second strip-shaped conductor 51 and the fourth current on the third strip-shaped conductor 52 can well flow into the circuit board 30 through the first ground part B. In this way, current intensity on the second strip-shaped conductor 51 and the third strip-shaped conductor 52 is greatly reduced. In this case, strength of magnetic fields generated by the second strip-shaped conductor 51 and the third strip-shaped conductor 52 is also relatively small. Therefore, even though the SAR hotspot appears under resonance "S" (5.75 GHz), an SAR value under resonance "3" (5.75 GHz) is relatively low.

In addition, Table 7 shows SAR values of the electronic device 100 using the composite antenna provided in the seventh implementation.

TABLE 7

| Mode | Resonance "1" (3.62 GHz) | Resonance"2" (4.95 GHz) | Resonance"3" (5.75 GHz) |
|---|---|---|---|
| SAR value at 5 mm away from the rear cover | 1.10 | 1.66 | 1.66 |
| SAR value at 5 mm away from the rear cover (normalized at −5 dB) | 0.44 | 0.65 | 0.6 |

Table 7 shows SAR values based on the (log, average) standard. It can be seen that, when output power is 24 dBm, the SAR value of the electronic device 100 using the composite antenna provided in the seventh implementation at 5 mm away from the rear cover, regardless of resonance "1", resonance "2", or resonance "3", is relatively low on the whole. When efficiency is normalized to −5 dB, advantages of the composite antenna provided in the seventh implementation in terms of a low SAR value are more obvious. Regardless of resonance "1", resonance "2", or resonance "3", an SAR value at 5 mm away from the rear cover is less than 0.7.

In this implementation, according to the antenna design solution provided in the seventh implementation, a composite antenna of a slot antenna and a wire antenna is designed, so that under feeding, the composite antenna separately excites three resonance modes (a slot antenna differential mode and a wire antenna common mode). In addition to implementing wide-band coverage, SAR values of the three modes may be low, and one of the resonance modes can generate two SAR hotspots.

The foregoing specifically describes seven implementations of a structure of the composite antenna including the slot antenna and the wire antenna. It may be understood that each of the foregoing implementations can be implemented. The composite antenna separately excites a plurality of resonance modes (including a slot antenna differential mode and a wire antenna common mode). While wide-band coverage is implemented, the SAR values under the plurality of modes are relatively low.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising a rear cover, a circuit board, a radio frequency transceiver circuit, a first antenna, and a second antenna, wherein the circuit board and the radio frequency transceiver circuit are located on a same side of the rear cover;

the first antenna comprises a first strip-shaped conductor, the first strip-shaped conductor comprising a first ground part, a second ground part, and a feeding part, and a first gap being formed between the circuit board and the first strip-shaped conductor, wherein the first ground part and the second ground part are respectively two ends of the first strip-shaped conductor, both the first ground part and the second ground part are grounded through the circuit board, and wherein the feeding part is located between the first ground part and the second ground part, and is electrically connected to the radio frequency transceiver circuit; and the second antenna comprises a second strip-shaped conductor, the second strip-shaped conductor comprises a first end and a second end, the first end of the second strip-shaped conductor is electrically connected to the first ground part, the second end of the second strip-shaped conductor is an open end, and a second gap is formed between the circuit board and the second strip-shaped conductor, the electronic device further comprising a support fastened between the circuit board and the rear cover, wherein:

the first strip-shaped conductor is fastened on the support;

the second strip-shaped conductor is fastened on the rear cover or the support;

the support includes a first end portion, a second end portion, and a middle portion between the first end portion and the second end portion;

the first end portion and the second end portion contact the circuit board; and a gap is formed between the middle portion of the support and the circuit board.

2. The electronic device according to claim 1, wherein the second antenna further comprises a third strip-shaped conductor, the third strip-shaped conductor comprises a first end and a second end, the first end of the third strip-shaped conductor is electrically connected to the second ground part, and the second end of the third strip-shaped conductor is an open end; and a third gap is formed between the circuit board and the third strip-shaped conductor.

3. The electronic device according to claim 2, wherein the third strip-shaped conductor is fastened on the rear cover or the support.

4. The electronic device according to claim 3, wherein:

the first gap is formed between the first strip-shaped conductor and a board surface that is of the circuit board and that faces the rear cover;

the second gap is formed between the second strip-shaped conductor and the board surface that is of the circuit board and that faces the rear cover; and the third gap is formed between the third strip-shaped conductor and the board surface that is of the circuit board and that faces the rear cover.

5. The electronic device according to claim 2, wherein a projection of the first strip-shaped conductor on a board surface of the circuit board is a first projection, a projection of the second strip-shaped conductor on the board surface of the circuit board is a second projection, an included angle between the second projection and the first projection is a first angle, and the first angle is within a range from 90° to 270°; and a projection of the third strip-shaped conductor on the board surface of the circuit board is a third projection, and an included angle between the third projection and the first projection is a second angle, and the second angle is within the range from 90° to 270°.

6. The electronic device according to claim 5, wherein both the first angle and the second angle are equal to 180°, and a length of the second strip-shaped conductor is equal to a length of the third strip-shaped conductor.

7. The electronic device according to claim 1, wherein the second antenna further comprises a third strip-shaped conductor, the third strip-shaped conductor is fastened on the rear cover or a support that is fastened between the circuit board and the rear cover, the third strip-shaped conductor comprises a first end and a second end, the first end of the third strip-shaped conductor is connected to the first end of the second strip-shaped conductor, the first end of the third strip-shaped conductor is electrically connected to the first ground part, and the second end of the third strip-shaped conductor is an open end; and a clearance area of the second antenna is formed between the third strip-shaped conductor and a board surface that is of the circuit board and that faces the rear cover.

8. The electronic device according to claim 7, wherein the second antenna further comprises a fourth strip-shaped conductor and a fifth strip-shaped conductor, both the fourth strip-shaped conductor and the fifth strip-shaped conductor are fastened on the rear cover or the support, a first clearance area of the second antenna is formed between the fourth strip-shaped conductor and the board surface that is of the circuit board and that faces the rear cover, and a second clearance area of the second antenna is formed between the fifth strip-shaped conductor and the board surface that is of the circuit board and that faces the rear cover; and an end of the fourth strip-shaped conductor is connected to an end of the fifth strip-shaped conductor, connected ends of the fourth strip-shaped conductor and the fifth strip-shaped conductor are both electrically connected to the second ground part, and an end of the fourth strip-shaped conductor away from the fifth strip-shaped conductor and an end of the fifth strip-shaped conductor away from the fourth strip-shaped conductor are open ends.

9. The electronic device according to claim 8, wherein a sum of a length of the fourth strip-shaped conductor and a length of the fifth strip-shaped conductor is equal to a sum of a length of the second strip-shaped conductor and a length of the third strip-shaped conductor.

10. The electronic device according to claim 1, wherein a center distance between the feeding part and the first ground part is a first value, a center distance between the feeding part and the second ground part is a second value, and a ratio of the first value to the second value is within a range from 0.8 to 1.2.

11. The electronic device according to claim 1, wherein the first antenna and the second antenna are configured to generate a plurality of resonance modes, and a resonance mode of the first antenna generates two specific absorption ratio (SAR) hotspots.

12. The electronic device according to claim 1, wherein the first antenna and the second antenna are configured to generate a plurality of resonance modes, and a specific absorption ratio (SAR) value of each resonance mode is less than 1.

13. The electronic device according to claim 1, wherein currents excited by the first strip-shaped conductor comprise a first current flowing from the first ground part to the feeding part, and a second current flowing from the second ground part to the feeding part.

14. The electronic device according to claim 1, wherein a current excited by the second strip-shaped conductor comprises a current flowing from the second end of the second strip-shaped conductor to the first end of the second strip-shaped conductor.

15. The electronic device according to claim 1, wherein the first end of the second strip-shaped conductor and the first ground part are directly connected or indirectly connected through coupling; or the second antenna further comprises a third strip-shaped conductor, a first end of the third strip-shaped conductor and the first ground part are directly connected or indirectly connected through coupling.

16. The electronic device according to claim 1, wherein the first antenna is above the circuit board, a bottom surface of the second antenna is above and a top surface of the first antenna, and the first antenna does not contact the second antenna.

17. The electronic device according to claim 1, wherein the first antenna is a slot antenna, and the second antenna is a wire antenna.

18. The electronic device according to claim 1, wherein the first antenna and the second antenna are configured to resonate at different frequencies.

19. The electronic device according to claim 1, wherein the first and second antennas are configured to excite multiple resonance modes, the multiple resonance modes including a slot antenna differential mode and a wire antenna common mode.

* * * * *